US010419890B2

(12) United States Patent
Edge et al.

(10) Patent No.: US 10,419,890 B2
(45) Date of Patent: Sep. 17, 2019

(54) CLIENT ACCESS TO MOBILE LOCATION SERVICES

(71) Applicant: QUALCOMM Incorporated, San Diego, CA (US)

(72) Inventors: Stephen William Edge, Escondido, CA (US); Andreas Klaus Wachter, Menlo Park, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/292,100

(22) Filed: May 30, 2014

(65) Prior Publication Data

US 2014/0274136 A1 Sep. 18, 2014

Related U.S. Application Data

(63) Continuation-in-part of application No. 13/917,616, filed on Jun. 13, 2013.
(Continued)

(51) Int. Cl.
H04W 4/02 (2018.01)
H04W 4/04 (2009.01)
(Continued)

(52) U.S. Cl.
CPC ............. *H04W 4/04* (2013.01); *H04L 67/18* (2013.01); *H04W 4/021* (2013.01); *H04W 4/02* (2013.01);
(Continued)

(58) Field of Classification Search
CPC ....... H04W 4/02; H04W 4/021; H04W 4/023; H04W 4/025
See application file for complete search history.

(56) References Cited

U.S. PATENT DOCUMENTS 6,650,902 B1   11/2003  Richton
6,785,542 B1    8/2004  Blight et al.
(Continued)

FOREIGN PATENT DOCUMENTS

CN   101194526 A    6/2008
CN   101873524 A   10/2010
(Continued)

OTHER PUBLICATIONS

International Search Report and Written Opinion—PCT/US2014/040419—ISA/EPO—dated Oct. 6, 2014, 15 pgs.
(Continued)

*Primary Examiner* — Charles N Appiah
*Assistant Examiner* — Xiang Zhang
(74) *Attorney, Agent, or Firm* — Hunter Clark PLLC

(57) ABSTRACT

A method of providing location services at a location server for a venue includes: receiving a request for location service for one or more mobile devices, where the request for location service comprises a trigger condition and at least one of a group condition or a persistence condition; determining the occurrence of the trigger condition and at least one of the group condition or the persistence condition; and sending a response, where the response indicates the occurrence of the trigger condition and at least one of the group condition or the persistence condition.

31 Claims, 32 Drawing Sheets

Related U.S. Application Data

(60) Provisional application No. 61/689,926, filed on Jun. 15, 2012, provisional application No. 61/732,883, filed on Dec. 3, 2012, provisional application No. 61/735,511, filed on Dec. 10, 2012, provisional application No. 61/801,591, filed on Mar. 15, 2013, provisional application No. 61/829,464, filed on May 31, 2013, provisional application No. 61/905,709, filed on Nov. 18, 2013, provisional application No. 61/940,229, filed on Feb. 14, 2014.

(51) Int. Cl.
*H04W 4/021* (2018.01)
*H04L 29/08* (2006.01)
*H04W 4/029* (2018.01)
*H04W 4/90* (2018.01)

(52) U.S. Cl.
CPC .......... *H04W 4/027* (2013.01); *H04W 4/029* (2018.02); *H04W 4/90* (2018.02)

(56) References Cited

U.S. PATENT DOCUMENTS

| | | | |
|---|---|---|---|
| 7,454,192 B1 | 11/2008 | Zhu | |
| 7,761,101 B1* | 7/2010 | Qu | G01S 19/03 455/404.2 |
| 8,019,347 B2 | 9/2011 | Razdan et al. | |
| 8,145,769 B2 | 3/2012 | Edge et al. | |
| 8,200,247 B1 | 6/2012 | Starenky et al. | |
| 8,229,389 B2 | 7/2012 | Bharatia et al. | |
| 8,320,931 B2 | 11/2012 | Ward et al. | |
| 8,463,295 B1 | 6/2013 | Caralis et al. | |
| 8,489,669 B2 | 7/2013 | Johnson | |
| 8,493,206 B2 | 7/2013 | Richey et al. | |
| 8,498,807 B2 | 7/2013 | Moore et al. | |
| 8,700,063 B2 | 4/2014 | Jagetiya et al. | |
| 2003/0060214 A1 | 3/2003 | Hendrey et al. | |
| 2004/0015537 A1 | 1/2004 | Doerksen et al. | |
| 2004/0100937 A1 | 5/2004 | Chen | |
| 2004/0137918 A1* | 7/2004 | Varonen | H04W 8/10 455/456.2 |
| 2004/0198397 A1* | 10/2004 | Weiss | H04W 4/02 455/456.5 |
| 2004/0254724 A1* | 12/2004 | Mattila | H04L 67/04 701/533 |
| 2005/0043037 A1* | 2/2005 | Ioppe | H04W 4/02 455/456.1 |
| 2005/0136942 A1 | 6/2005 | Timiri et al. | |
| 2006/0014531 A1 | 1/2006 | Nam et al. | |
| 2006/0099960 A1* | 5/2006 | Duan | H04W 8/10 455/456.2 |
| 2006/0120320 A1 | 6/2006 | Shim | |
| 2007/0032247 A1 | 2/2007 | Shaffer et al. | |
| 2007/0168524 A1 | 7/2007 | Chao et al. | |
| 2007/0229546 A1 | 10/2007 | Klassen et al. | |
| 2007/0298757 A1 | 12/2007 | Ahn | |
| 2008/0113671 A1 | 5/2008 | Ghozati et al. | |
| 2008/0160985 A1 | 7/2008 | Variyath et al. | |
| 2008/0280600 A1 | 11/2008 | Zhou | |
| 2008/0315990 A1 | 12/2008 | Komatsu | |
| 2009/0036116 A1 | 2/2009 | Kim et al. | |
| 2009/0088180 A1 | 4/2009 | Lamance et al. | |
| 2009/0111438 A1 | 4/2009 | Chan | |
| 2009/0119762 A1 | 5/2009 | Thomson et al. | |
| 2009/0319306 A1 | 12/2009 | Chanick | |
| 2010/0039315 A1 | 2/2010 | Malkos et al. | |
| 2010/0093380 A1 | 4/2010 | Gustafsson | |
| 2010/0167760 A1 | 7/2010 | Kim | |
| 2010/0234022 A1 | 9/2010 | Winterbottom | |
| 2010/0240398 A1 | 9/2010 | Hotes et al. | |
| 2010/0241496 A1 | 9/2010 | Gupta et al. | |
| 2010/0323715 A1 | 12/2010 | Winters | |
| 2011/0018349 A1 | 1/2011 | Rockenfeller et al. | |
| 2011/0021212 A1 | 1/2011 | Chen et al. | |
| 2011/0039576 A1* | 2/2011 | Prakash | G01S 5/0236 455/456.1 |
| 2011/0077021 A1 | 3/2011 | Mizikovsky et al. | |
| 2011/0086646 A1 | 4/2011 | Gupta et al. | |
| 2011/0098059 A1 | 4/2011 | Qiu et al. | |
| 2011/0105092 A1 | 5/2011 | Felt et al. | |
| 2011/0142016 A1 | 6/2011 | Chatterjee | |
| 2011/0143774 A1 | 6/2011 | McNamara et al. | |
| 2011/0201347 A1 | 8/2011 | Abraham et al. | |
| 2011/0201349 A1 | 8/2011 | Castillo et al. | |
| 2011/0294506 A1 | 12/2011 | Claussen et al. | |
| 2011/0296184 A1 | 12/2011 | Tran et al. | |
| 2012/0100874 A1 | 4/2012 | You et al. | |
| 2012/0122487 A1 | 5/2012 | Holm et al. | |
| 2012/0130794 A1 | 5/2012 | Strieder | |
| 2012/0139781 A1 | 6/2012 | Jeong et al. | |
| 2012/0158297 A1 | 6/2012 | Kim et al. | |
| 2012/0170560 A1 | 7/2012 | Han et al. | |
| 2012/0200411 A1 | 8/2012 | Best | |
| 2012/0215637 A1 | 8/2012 | Hermann | |
| 2012/0322462 A1* | 12/2012 | Moeller | H04W 4/046 455/456.1 |
| 2013/0023284 A1 | 1/2013 | Stanger | |
| 2013/0045751 A1 | 2/2013 | Chao et al. | |
| 2013/0059608 A1* | 3/2013 | Cuff | H04W 64/006 455/456.5 |
| 2013/0150050 A1 | 6/2013 | Ueda et al. | |
| 2013/0267224 A1 | 10/2013 | Krishnaswamy et al. | |
| 2013/0316740 A1 | 11/2013 | Scarafia et al. | |
| 2013/0324166 A1 | 12/2013 | Mian et al. | |
| 2013/0339478 A1 | 12/2013 | Edge et al. | |
| 2014/0129336 A1* | 5/2014 | Bailey | G06Q 30/0261 705/14.58 |
| 2014/0135037 A1 | 5/2014 | Dave et al. | |
| 2014/0162693 A1 | 6/2014 | Wachter et al. | |
| 2017/0118213 A1 | 4/2017 | Edge et al. | |

FOREIGN PATENT DOCUMENTS

| | | |
|---|---|---|
| CN | 102308607 A | 1/2012 |
| CN | 101198149 B | 5/2012 |
| EP | 1111951 A2 | 6/2001 |
| EP | 2424317 A1 | 2/2012 |
| GB | 2474865 A | 5/2011 |
| JP | 2000184431 A | 6/2000 |
| JP | 2002163285 A | 6/2002 |
| JP | 2004535744 A | 11/2004 |
| JP | 2006166421 A | 6/2006 |
| JP | 2007535831 A | 12/2007 |
| JP | 2008077465 A | 4/2008 |
| JP | 2009065701 A | 3/2009 |
| JP | 2009517916 A | 4/2009 |
| JP | 2009105882 A | 5/2009 |
| JP | 2010086425 A | 4/2010 |
| WO | 03009605 A2 | 1/2003 |
| WO | 2005064981 A2 | 7/2005 |
| WO | 2006011628 A1 | 2/2006 |
| WO | 2006104352 A1 | 10/2006 |
| WO | 2009022857 A2 | 2/2009 |
| WO | 2009036497 A1 | 3/2009 |
| WO | 2009042938 A1 | 4/2009 |
| WO | 2009067447 A1 | 5/2009 |
| WO | 2012026086 A1 | 3/2012 |
| WO | 2012114304 A1 | 8/2012 |

OTHER PUBLICATIONS

Partial International Search Report—PCT/US2014/040418—ISA/EPO—dated Aug. 1, 2014, 7 pgs.
International Search Report and Written Opinion—PCT/US2014/040418—ISA/EPO—dated Oct. 1, 2014, 18 pgs.
Partial International Search Report—PCT/US2014/040419—ISA/EPO—dated Jul. 25, 2014, 6 pgs.
Co-pending U.S. Appl. No. 14/292,041, filed May 30, 2014.

(56) References Cited

OTHER PUBLICATIONS

International Preliminary Report on Patentability—PCT/US2014/040418, The International Bureau of WIPO—Geneva, Switzerland, dated Jan. 12, 2015, 12 pgs.
International Preliminary Report on Patentability—PCT/US2014/040419, The International Bureau of WIPO—Geneva, Switzerland, dated Dec. 1, 2015, 9 pgs.
Burroughs K., et al., "Discussion of Indoor Location Standards", May 7, 2012 (May 7, 2012), 11 Pages, XP055378389, Retrieved from the Internet: URL: http://www.cwins.wpi.edu/workshop12/presentation/Standardization_panel/kirk.pdf.
Tcs Systems: "SLP Discovery Models and Mechanisms", Dec. 15, 2010 (Dec. 15, 2010), pp. 1-11, XP55026932, Retrieved from the Internet: URL:http://member.openmobilealliance.org/ftp/Public documents/LOC/2010/OMA-LOC-2010-0316-INP_SUPL_3_0_TCS_SLP_Models_and_Discovery_Mechanisms.zip [retrieved on May 11, 2012] pp. 1-6, 10.
Thompson P., et al., "SLP Discovery Models and Mechanisms; OMA-LOC-2010-0316-INP_SUPL_3_0_TCS_SLP_Models_and_Discovery_Mechanisms", OMA-LOC-2010-0316-INP_SUPL_3_0_TCS_SLP_MODELS_AND_DISCOVERY_MECHANISMS, Open Mobile Alliance (OMA), Dec. 15, 2010, XP064090861.
"3rd Generation Partnership Project; Technical Specification Group GSM/EDGE Radio Access Network; Functional stage 2 description of Location Services (LCS) in GERAN (Release 10)", 3GPP Standard; 3GPP TS 43.059, 3rd Generation Partnership Project (3GPP), Mobile Competence Centre ; 650, Route Des Lucioles ; F-06921 Sophia-Antipolis Cedex; France, No. V10.0.0, Apr. 1, 2011 (Apr. 1, 2011), pp. 1-69, XP050476661, [retrieved on Apr. 1, 2011], ¶ [0004]-¶ [0005] ¶ [0007], ¶ [09.1]-¶ [09.2].
LOC WG: "SUPL V3.0; OMA-TP-2010-0521-SUPL_V3.0_AD_Presentation", OMA-TP-2010-0521-SUPL_V3.0_AD_Presentation, Open Mobile Alliance (OMA), 4330 La Jolla Village Dr., Suite 110 San Diego, CA 92122; USA, Dec. 2, 2010 (Dec. 2, 2010), pp. 1-15, XP064124150, [retrieved on Dec. 2, 2010] slide 9.
"User Plane Location Protocol; OMA-TS-ULP-V3_0-20110630-D", OMA-TS-ULP-V3_0-20110630-D, Open Mobile Alliance (OMA), 4330 La Jolla Village Dr., Suite 110 San Diego, CA 92122; USA, No. 3.0, Jun. 30, 2011 (Jun. 30, 2011), pp. 1-266, XP064125234, [retrieved on Jul. 4, 2011] sections 5.1.2.7-5.1.2.8; p. 34-p. 40 section 10.2; p. 145 sections 10.34-10.35; p. 176-p. 182.

\* cited by examiner

CLIENT ACCESS TO MOBILE LOCATION SERVICES

CROSS-REFERENCE TO RELATED APPLICATIONS

This application is a continuation-in-part of prior application Ser. No. 13/917,616, filed Jun. 13, 2013, entitled "Methods and Systems for Providing Location Based Services in a Venue," which claims the benefit of U.S. Provisional Application No. 61/689,926, filed Jun. 15, 2012, entitled "Optimized Indoor Location Server Provision and Discovery," U.S. Provisional Application No. 61/732,883, filed Dec. 3, 2012, entitled "Methods and Systems for Providing Location Based Services in an Indoor Venue," U.S. Provisional Application No. 61/735,511, filed Dec. 10, 2012, entitled "Methods and Systems for Providing Location Based Services in an Indoor Venue," and U.S. Provisional Application No. 61/801,591, filed Mar. 15, 2013, entitled "Methods and Systems for Providing Location Based Services in an Indoor Venue," each of which is incorporated herein by reference in its entirety for all purposes. Further, this application claims the benefit of U.S. Provisional Application No. 61/829,464, filed May 31, 2013, entitled "Indoor Mobile Location Services," U.S. Provisional Application No. 61/905,709, filed Nov. 18, 2013, entitled "Indoor Mobile Location Services," and U.S. Provisional Application No. 61/940,229, filed Feb. 14, 2014, entitled "Indoor Mobile Location Services," each of which is incorporated herein in its entirety for all purposes. Also, this application is related to U.S. application Ser. No. 14/292,041, filed May 30, 2014, entitled "Client Access to Mobile Location Services."

BACKGROUND

The global positioning system (GPS) and other like satellite and terrestrial positioning systems have enabled navigation services for mobile handsets in outdoor environments. Likewise, particular techniques for obtaining estimates of positions of a mobile device in indoor environments may enable enhanced location based services in particular indoor venues such as residential, governmental or commercial venues. Locating mobile devices in indoor environments presents challenges. While indoors, satellite positioning systems are usually of limited use in determining a mobile device's position. Thus, other techniques have emerged for determining mobile device location indoors, e.g., using signals from access points and/or other devices using WiFi and/or short-range wireless protocols such as BLUETOOTH®. In association with locating a mobile device in an indoor environment, a client (e.g. an application, a server or a user) who needs the location of one or more mobile devices, may require more flexible location services from a network or a location server than are currently defined and supported for mobile devices that are typically located only outdoors.

SUMMARY

An example of a method of providing location services at a location server for a venue includes: receiving a request for location service, where the request for location service comprises at least one of a first identification of at least one mobile device or an identification of a target area; and sending a response, where the response comprises at least one of a second identification of at least one mobile device or an identification of a geographic area, where at least one of the first identification of at least one mobile device, the second identification of at least one mobile device, the identification of the target area, or the identification of the geographic area comprises a venue-specific identification.

Implementations of such a method may include one or more of the following features. The identification of the target area or the identification of the geographic area comprises the venue-specific identification and the venue-specific identification comprises a civic location. The civic location comprises a venue-specific portion and a global portion. At least one of the first identification of at least one mobile device or the second identification of at least one mobile device comprises the venue-specific identification and the venue-specific identification comprises a venue-specific name. The venue-specific name identifies an individual mobile device or a group of mobile devices. The method further includes sending an analytics report comprising at least one of a starting number of mobile devices, a number of entering mobile devices, a number of leaving mobile devices, a mean number of mobile devices, or a mean dwell time.

An example of a location server includes: a transceiver configured to send communications to, and receive communications from, a location services client; and a processor communicatively coupled to the transceiver and configured to receive a request for location service received from the location services client through the transceiver to form a response, and to send the response toward the location services client through the transceiver, where the request for location service comprises at least one of a first identification of at least one mobile device or an identification of a target area, where the response comprises at least one of a second identification of at least one mobile device or an identification of a geographic area, and where at least one of the first identification of at least one mobile device, the second identification of at least one mobile device, the identification of the target area, or the identification of the geographic area comprises a venue-specific identification.

Implementations of such a server may include one or more of the following features. The identification of the target area or the identification of the geographic area comprises the venue-specific identification and the venue-specific identification comprises a civic location. The civic location comprises a venue-specific portion and a global portion. At least one of the first identification of at least one mobile device or the second identification of at least one mobile device comprises the venue-specific identification and the venue-specific identification comprises a venue-specific name. The venue-specific name identifies an individual mobile device or a group of mobile devices. The processor is further configured to prepare and send an analytics report toward the location services client through the transceiver, the analytics report comprising at least one of a starting number of mobile devices, a number of entering mobile devices, a number of leaving mobile devices, a mean number of mobile devices, or a mean dwell time.

An example of a method of providing location services at a location services client includes: sending a request for location service, where the request for location service comprises at least one of a first identification of at least one mobile device or an identification of a target area; receiving a response, where the response comprises at least one of a second identification of at least one mobile device or an identification of a geographic area; and providing the location service using the response, where at least one of the first identification of at least one mobile device, the second identification of at least one mobile device, the identification of the target area, or the identification of the geographic area comprises a venue-specific identification.

Implementations of such a method may include one or more of the following features. The identification of the target area or the identification of the geographic area comprises the venue-specific identification and the venue-specific identification comprises a civic location. The civic location comprises a venue-specific portion and a global portion. At least one of the first identification of at least one mobile device or the second identification of at least one mobile device comprises the venue-specific identification and the venue-specific identification comprises a venue-specific name. The venue-specific name identifies an individual mobile device or a group of mobile devices. The location services client is a location based services application server. The method further includes receiving an analytics report comprising at least one of a starting number of mobile devices, a number of entering mobile devices, a number of leaving mobile devices, a mean number of mobile devices, or a mean dwell time, where providing the location service includes using the analytics report.

An example of a location services client includes: a transceiver configured to send communications to, and receive communications from, a location server; and a processor communicatively coupled to the transceiver and configured to: send a request for location service toward the location server through the transceiver, where the request for location service comprises at least one of a first identification of at least one mobile device or an identification of a target area; receive a response to the request from the location server through the transceiver, where the response comprises at least one of a second identification of at least one mobile device or an identification of a geographic area; and provide the location service using the response, where at least one of the first identification of at least one mobile device, the second identification of at least one mobile device, the identification of the target area, or the identification of the geographic area comprises a venue-specific identification.

Implementations of such a location services client may include one or more of the following features. The identification of the target area or the identification of the geographic area comprises the venue-specific identification and the venue-specific identification comprises a civic location. The civic location comprises a venue-specific portion and a global portion. At least one of the first identification of at least one mobile device or the second identification of at least one mobile device comprises the venue-specific identification and the venue-specific identification comprises a venue-specific name. The venue-specific name identifies an individual mobile device or a group of mobile devices. The location services client is a location based services application server. The processor is further configured to receive an analytics report, from the location server through the transceiver, comprising at least one of a starting number of mobile devices, a number of entering mobile devices, a number of leaving mobile devices, a mean number of mobile devices, or a mean dwell time, and where to provide the location service the processor is configured to use the analytics report.

An example method of providing location services at a location server includes: receiving a request for location service for one or more mobile devices, where the request for location service comprises a trigger condition and at least one of a group condition or a persistence condition; determining the occurrence of the trigger condition and the at least one of the group condition or the persistence condition; and sending a response, where the response indicates the occurrence of the trigger condition and the at least one of the group condition or the persistence condition.

Implementations of such a method may include one or more of the following features. The one or more mobile devices comprises a plurality of mobile devices, and the trigger condition combined with the group condition comprises a portion of the plurality of mobile devices entering a target area, leaving the target area, remaining within the target area, or remaining outside the target area. The portion of the plurality of mobile devices is indicated by the group condition and comprises one of a minimum quantity of the plurality of mobile devices, a maximum quantity of the plurality of mobile devices, or all of the plurality of mobile devices. The minimum quantity or the maximum quantity, whichever is used, is either an integer number or a percentage of the plurality of mobile devices. The persistence condition comprises a minimum time period for continuous persistence of the trigger condition. The response comprises at least one of an identity or a geographic location for at least one mobile device of the one or more mobile devices. The request for location service and the response comprise messages for the Mobile Location Protocol (MLP) of the Open Mobile Alliance (OMA).

An example location server includes: a transceiver configured to send communications to, and receive communications from, a location services client; and a processor communicatively coupled to the transceiver and configured to: receive, from the location services client through the transceiver, a request for location service for one or more mobile devices, where the request for location service comprises a trigger condition and at least one of a group condition or a persistence condition; determine the occurrence of the trigger condition and the at least one of the group condition or the persistence condition; and send a response toward the location services client through the transceiver, where the response indicates the occurrence of the trigger condition and the at least one of the group condition or the persistence condition.

Implementations of such a location server may include one or more of the following features. The one or more mobile devices comprises a plurality of mobile devices, and the trigger condition combined with the group condition comprises a portion of the plurality of mobile devices entering a target area, leaving the target area, remaining within the target area, or remaining outside the target area. The portion of the plurality of mobile devices is indicated by the group condition and comprises one of a minimum quantity of the plurality of mobile devices, a maximum quantity of the plurality of mobile devices, or all of the plurality of mobile devices. The minimum quantity or the maximum quantity, whichever is used, is either an integer number or a percentage of the plurality of mobile devices. The persistence condition comprises a minimum time period for continuous persistence of the trigger condition. The response comprises at least one of an identity and a geographic location for at least one mobile device of the one or more mobile devices. The request for location service and the response comprise messages for the Mobile Location Protocol (MLP) of the Open Mobile Alliance (OMA).

An example method of providing location services at a location services client includes: sending a request for location service for one or more mobile devices, where the request for location service comprises a trigger condition and at least one of a group condition or a persistence condition; receiving a response to the request, where the response indicates the occurrence of the trigger condition and the at least one of the group condition or the persistence condition; and providing a location service using the response.

Implementations of such a method may include one or more of the following features. The one or more mobile devices comprises a plurality of mobile devices, and the trigger condition combined with the group condition comprises a portion of the plurality of mobile devices entering a target area, leaving the target area, remaining within the target area, or remaining outside the target area. The portion of the plurality of mobile devices is indicated by the group condition and comprises one of a minimum quantity of the plurality of mobile devices, a maximum quantity of the plurality of mobile devices, or all of the plurality of mobile devices. The minimum quantity or the maximum quantity, whichever is used, is either an integer number or a percentage of the plurality of mobile devices. The persistence condition comprises a minimum time period for continuous persistence of the trigger condition. The response comprises at least one of an identity and a geographic location for at least one mobile device of the one or more mobile devices. The location services client is a location based services application server. The request for location service and the response comprise messages for the Mobile Location Protocol (MLP) of the Open Mobile Alliance (OMA).

An example of a location services client includes: a transceiver configured to send communications to, and receive communications from, a location server; and a processor communicatively coupled to the transceiver and configured to: send, toward the location server through the transceiver, a request for location service for one or more mobile devices, where the request for location service comprises a trigger condition and at least one of a group condition or a persistence condition; receive, from the location server through the transceiver, a response to the request through the transceiver, where the response indicates the occurrence of the trigger condition and the at least one of the group condition or the persistence condition; and provide a location service using the response.

Implementations of such a location services client may include one or more of the following features. The one or more mobile devices comprises a plurality of mobile devices, and the trigger condition combined with the group condition comprises a portion of the plurality of mobile devices entering a target area, leaving the target area, remaining within the target area, or remaining outside the target area. The portion of the plurality of mobile devices is indicated by the group condition and comprises one of a minimum quantity of the plurality of mobile devices, a maximum quantity of the plurality of mobile devices, or all of the plurality of mobile devices. The minimum quantity or the maximum quantity, whichever is used, is either an integer number or a percentage of the plurality of mobile devices. The persistence condition comprises a minimum time period for continuous persistence of the trigger condition. The response comprises at least one of an identity and a geographic location for at least one mobile device of the one or more mobile devices. The location services client is a location based services application server. The request for location service and the response comprise messages for the Mobile Location Protocol (MLP) of the Open Mobile Alliance (OMA).

Items and/or techniques described herein may provide one or more of the following capabilities, as well as other capabilities not mentioned. Other capabilities may be provided and not every implementation according to the disclosure must provide any, let alone all, of the capabilities discussed. Locations, areas, and/or mobile devices may be specified by venue-specific labels. Group conditions and/or persistence conditions may be associated with trigger conditions to require satisfaction of the trigger condition for a specified time and/or by a specified group of mobile devices. High-precision geographic information may be provided for point locations and/or areas. Other capabilities may be provided and not every implementation according to the disclosure must provide any, let alone all, of the capabilities discussed.

DETAILED DESCRIPTION

Figure 1A:
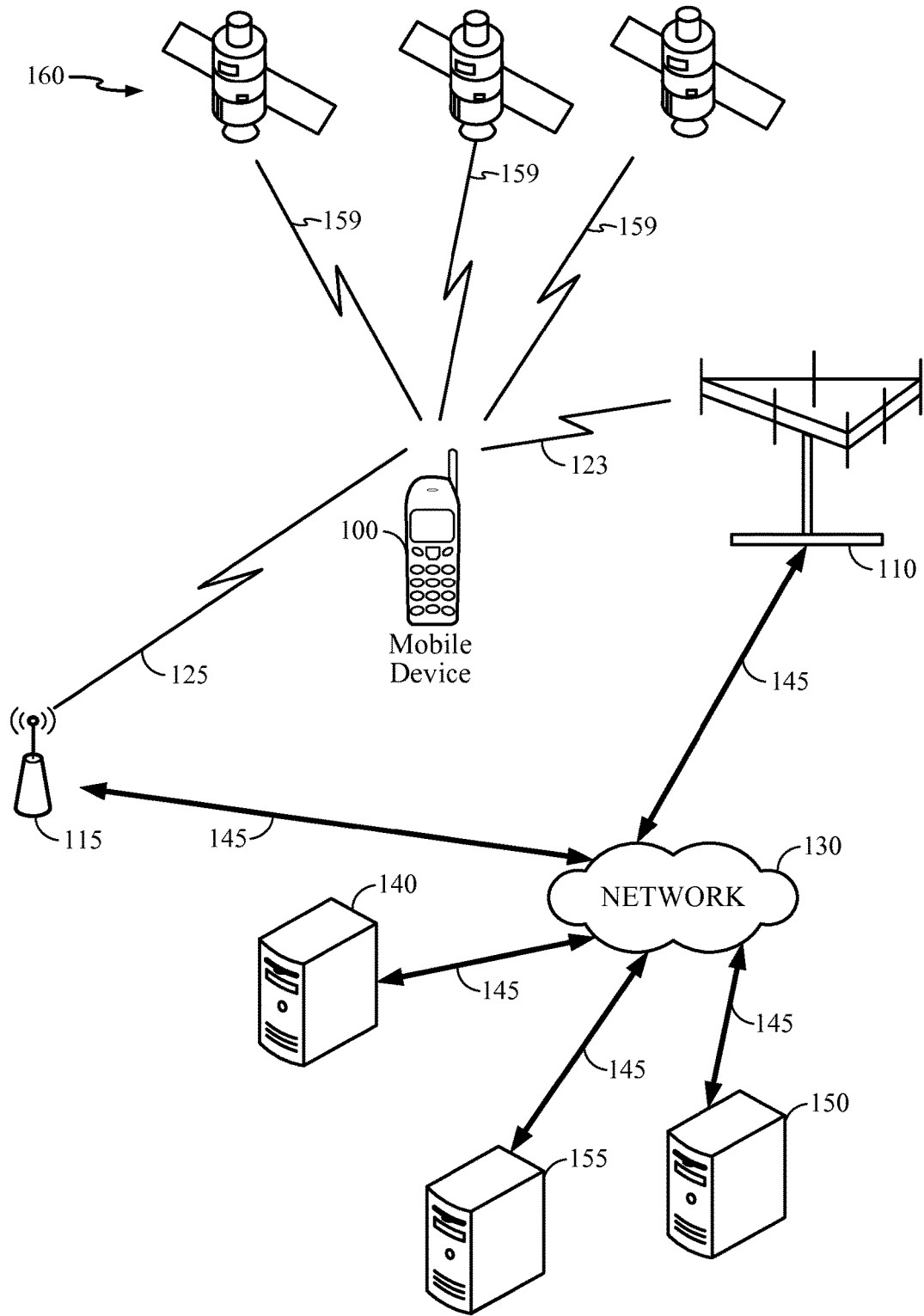
FIG. 1A is a system diagram illustrating certain features of a system containing a mobile device.

A number of location solutions may be used to support an ability to locate a mobile device, such as a mobile wireless device that may be a cellphone, smartphone, tablet, laptop, tracking device or some other device. Knowing the location of a mobile device may enable certain services and applications such as services and applications that support an emergency call, navigation, or direction finding. Location solutions that support reliable and accurate location of a mobile device in an outdoor environment may include the Secure User Plane Location (SUPL) solution defined by the Open Mobile Alliance (OMA) and various control plane solutions defined by the $3^{rd}$ Generation Partnership Project (3GPP) and the $3^{rd}$ Generation Partnership Project 2 (3GPP2). Whereas user plane solutions such as SUPL may rely on data transport (e.g. using TCP/IP) for communication between or among supporting entities, control plane solutions such as those defined by 3GPP and 3GPP2 may rely on signaling interfaces and signaling protocols in existing communications networks (e.g. wireless networks) to support most or all of such communication. These existing location solutions may rely substantially on positioning methods such as Assisted Global Navigation Satellite System (A-GNSS), Observed Time Difference of Arrival (OTDOA), Advanced Forward Link Trilateration (AFLT) and Enhanced Cell ID (E-CID), wherein a target mobile device that is being positioned makes measurements of radio signals received from satellite vehicles (e.g. for A-GNSS) or wireless network base stations (e.g. for OTDOA, AFLT and E-CID). The target mobile device may then either compute a location estimate from these measurements or transfer the measurements to a location server which computes a location estimate. Prior to measurements being obtained at a target mobile device, a location server may transfer positioning assistance data to the target mobile device to enable the mobile device to acquire and measure radio signals for use in positioning operations and, in some cases, to compute a location estimate based on the measurements. In order to provide assistance data and, as appropriate, compute a location estimate from measurements provided by a target mobile device, a location server may further employ data related to one or more GNSS systems and/or to one or more base stations in a wireless network. GNSS related data may include satellite almanac and ephemeris data and data related to ionospheric and tropospheric delays. GNSS related data may also be applicable to a large region (e.g. a state, country or even the entire World) while base station data may be provisioned for part of or all of a wide area network, and may similarly be valid for a large region such as a state or country. Location services may be supported based, at least in part, on location determination by a mobile device or location server. Location services, while possibly strongly related to the immediate location of a target mobile device, may be applicable and usable over a large area such as a city, state or country. Thus, the data that may be used in a location server to support determination of a location estimate and the usability of the subsequent location estimates need not be confined to a small area but may apply to a large area such as a city, state or country.

In contrast, if accurate and reliable location is particularly valued in a venue which may be an indoor environment or a mixed indoor and outdoor environment like a shopping mall, hospital, library, museum, college campus, airport, etc., existing position methods and existing location services may no longer be effective. For example, position methods like A-GNSS, AFLT, OTDOA and E-CID may not be accurate and reliable indoors due to signal attenuation, reflection and scattering from buildings, walls and ceilings. Instead, different position methods that may make use of measurements made by a target mobile device of radio signals from access points (APs) used for communication indoors such as WiFi and Bluetooth® (BT) APs may enable more accurate and reliable location estimates as ready access to such signals may be available from a large number of such APs inside a venue. Assistance data enabling measurement of such signals and computation of a location estimate may, however, be specific to a particular venue and may not be widely available (e.g., if the assistance data is proprietary to a venue owner or a location provider for a venue and is not made public or otherwise provided to other location providers). In addition, while certain location services (like navigation and direction finding) used outdoors may continue to be utilized inside a venue, the data to make such services work well or optimally may rely heavily on knowledge of the particular venue (e.g. may require knowledge of floor plans, building layouts, room assignments, exits and entrances, staircases and elevators, etc.). The specialist and possibly restricted assistance data and other data to support positioning and location services inside a venue may not be well-supported by existing location solutions such as OMA SUPL or the 3GPP or 3GPP2 control plane solutions but may instead benefit from or even require new solutions or extensions to existing solutions.

As discussed below, particular network architectures and message flows may enable efficient provisioning of location based services in particular illustrated use cases. Particular network architectures and message flows may be tailored to specific types of positioning applied in a particular venue including network-centric (NC) positioning, mobile-centric (MC) (network-initiated) positioning and mobile-centric (MC) (mobile-initiated) positioning. For example, particular message flows may be directed to detection and tracking of devices entering a venue and provision of services to a device based on an estimate of its current location, location history and/or expected or intended future location.

In certain implementations, as shown in FIG. 1A, in which MC positioning is used, a mobile device 100 may receive or acquire satellite positioning system (SPS) signals 159 from SPS satellites 160. In some embodiments, SPS satellites 160 may be from one GNSS, such as the US Global Positioning System (GPS), the European Galileo system or the Russian Glonass system. In other embodiments, the SPS Satellites may be from multiple GNSS such as, but not limited to, GPS, Galileo, Glonass, or Beidou (Compass) satellite systems. In other embodiments, SPS satellites may be from any one of several regional navigation satellite systems (RNSs) such as, for example, Wide Area Augmentation System (WAAS), European Geostationary Navigation Overlay Service (EGNOS), or Quasi-Zenith Satellite System (QZSS).

In addition, or alternatively, mobile device 100 may transmit radio signals to, and receive radio signals from, a wireless communication network. In one example, mobile device 100 may communicate with a cellular communication network by transmitting wireless signals to and/or receiving wireless signals from, base station transceiver 110 over wireless communication link 123. Similarly, mobile device 100 may transmit wireless signals to and/or receive wireless signals from local transceiver 115 over wireless communication link 125.

In a particular implementation, local transceiver 115 may be configured to communicate with mobile device 100 at a shorter range over wireless communication link 125 than at a range enabled by base station transceiver 110 over wireless communication link 123. For example, local transceiver 115 may be positioned in an indoor environment. Local transceiver 115 may comprise an AP and may provide access to a wireless local area network (WLAN, e.g., IEEE 802.11 network) or wireless personal area network (WPAN, e.g., Bluetooth network). In another example implementation, local transceiver 115 may comprise a femto cell transceiver or home base station capable of facilitating communication on wireless communication link 125 according to a cellular communication protocol. Of course, these are merely examples of networks that may communicate with a mobile device over a wireless link, and claimed subject matter is not limited in this respect.

Examples of network technologies that may support wireless communication link 123 are Global System for Mobile Communications (GSM), Code Division Multiple Access (CDMA), Wideband CDMA (WCDMA), Long Term Evolution LTE), High Rate Packet Data (HRPD). GSM, WCDMA and LTE are technologies defined by 3GPP. CDMA and HRPD are technologies defined by 3GPP2. Examples of radio technologies that may support wireless communication link 125 are IEEE 802.11 and BT in the case that local transceiver 115 is an AP, and CDMA, LTE, WCDMA and HRPD in the case that local transceiver 115 is a femto cell or home base station.

In a particular implementation, base station transceiver 110 and local transceiver 115 may communicate with servers 140, 150 and/or 155 over a network 130 through links 145. Here, network 130 may comprise any combination of wired or wireless links and may include base station transceiver 110 and/or local transceiver 115 and/or servers 140, 150 and 155. In a particular implementation, network 130 may comprise Internet Protocol (IP) infrastructure capable of facilitating communication between mobile device 100 and servers 140, 150 or 155 through local transceiver 115 or base station transceiver 110. In another implementation, network 130 may comprise cellular communication network infrastructure such as, for example, a base station controller or packet-based or circuit-based switching center (not shown) to facilitate mobile cellular communication with mobile device 100. In a particular implementation, network 130 may comprise local area network (LAN) elements such as WiFi APs, routers and bridges and may in that case include or have links to gateway elements that provide access to wide area networks such as the Internet. In other implementations, network 130 may be a LAN and may or may not have access to a wide area network but may not provide any such access (if supported) to mobile device 100. In some implementations, network 130 may comprise multiple networks (e.g., one or more wireless networks and/or the Internet).

In particular implementations, and as discussed below, mobile device 100 may have circuitry and processing resources capable of computing a position fix or estimated location of mobile device 100. For example, mobile device 100 may compute a position fix based, at least in part, on pseudorange measurements to four or more SPS satellites 160. Here, mobile device 100 may compute such pseudorange measurements based, at least in part, on pseudorange code phase detections in signals 159 acquired from four or more SPS satellites 160. In particular implementations, mobile device 100 may receive from server 140, 150 or 155 positioning assistance data to aid in the acquisition of signals 159 transmitted by SPS satellites 160 including, for example, almanac data, ephemeris data, or Doppler search windows.

In other implementations in which MC positioning is used, mobile device 100 may obtain a position fix by processing signals received from terrestrial transmitters fixed at known locations (e.g., such as base station transceiver 110) using any one of several techniques such as, for example, AFLT or OTDOA. In these particular techniques, pseudoranges or timing differences may be measured at mobile device 100 relative to three or more of such terrestrial transmitters fixed at known locations based, at least in part, on pilot or other positioning related signals transmitted by the transmitters and received at mobile device 100. Here, servers 140, 150 or 155 may be capable of providing positioning assistance data to mobile device 100 including, for example, information on signals to be measured (e.g., signal timing, frequency and/or coding) and locations and identities of terrestrial transmitters to facilitate positioning techniques such as AFLT and OTDOA. For example, servers 140, 150 or 155 may include a base station almanac (BSA) which indicates locations and identities of cellular base stations and/or APs in a particular region or regions such as a particular venue and may provide information related to base station and AP transmitted signals such as transmission power and signal timing.

A mobile device (e.g. mobile device 100 in FIG. 1A) may be referred to as a device, a wireless device, a mobile terminal, a terminal, a mobile station (MS), a user equipment (UE), a SUPL Enabled Terminal (SET) or by some other name and may correspond to a cellphone, smartphone, laptop, tablet, PDA, tracking device or some other portable or moveable device. Typically, though not necessarily, a mobile device may support wireless communication such as using GSM, WCDMA, LTE, CDMA, HRPD, WiFi, BT, WiMax etc. A mobile device may also support wireless communication using a LAN, DSL or packet cable for example. A mobile device may be a single entity or may comprise multiple entities such as in a personal area network where a user may employ audio, video and/or data input/output (I/O) devices and/or body sensors and a separate wireline or wireless modem. The location of a mobile device (e.g., mobile device 100) may be referred to as a location estimate, position, position fix or position estimate and may be geographic and thereby provide location coordinates for the mobile device (e.g., latitude and longitude) which may or may not include an altitude component (e.g., height relative to a reference such as height above sea level, height above or depth below ground level, floor level or basement level). Alternatively, a location of a mobile device may be expressed as a civic location (e.g. as a postal address or the designation of some point or small area in a building such as a particular room or floor). A location of a mobile device may also be expressed as an area or volume (defined either geographically or in civic form) within which the mobile device is expected to be located with some probability or confidence level (e.g., 67% or 95%). A location of a mobile device may further be a relative location comprising, for example, a distance and direction or relative X, Y (and Z) coordinates defined relative to some origin at a known location which may be defined geographically or in civic terms or by reference to a point, area or volume indicated on a map, floor plan or building plan. In the description contained herein, the use of the term location may comprise any of these variants unless indicated otherwise.

The network architecture described previously in relation to FIG. 1A may be considered as a generic architecture that can fit a variety of outdoor and indoor location solutions including the standard OMA SUPL and 3GPP and 3GPP2 control plane location solutions. For example, server 140 may function as a SUPL location platform (SLP) to support the SUPL location solution for MC positioning or as an enhanced Serving Mobile Location Center (E-SMLC) to support the 3GPP control plane location solution for MC and/or NC positioning with LTE access on wireless communication link 123 or 125. However, as described above, such frameworks for obtaining a location solution and the positioning methods they support may not be effective to support location services in an indoor environment or mixed indoor and outdoor environment of particular venues. Hence adaptations to the architecture shown in FIG. 1A and to the positioning methods that are supported may be as described further on herein.

In particular environments such as indoor environments or urban canyons, mobile device 100 may not be capable of acquiring signals 159 from a sufficient number of SPS satellites 160 to perform positioning according to the A-GNSS position method and may not receive signals from a sufficient number of base station transceivers 110 to perform AFLT or OTDOA to compute a position fix. In these circumstances, mobile device 100 may be capable of computing a position fix using MC positioning based, at least in part, on signals acquired from local transmitters (e.g., local transceiver 115 such as WLAN access points positioned at known locations). For example, mobile devices may obtain a position fix by measuring ranges to three or more indoor terrestrial wireless access points which are positioned at known locations. Such ranges may be measured, for example, by obtaining a Media Access Control (MAC) ID address from signals received from such access points and obtaining range measurements to the access points by measuring one or more characteristics of signals received from such access points such as, for example, received signal strength (as indicated by a received signal strength indication (RSSI)) or round trip time (RTT) for signal propagation to and from an AP. In alternative implementations, mobile device 100 may obtain an indoor position fix by applying characteristics of acquired signals to a radio map indicating expected RSSI and/or RTT values at particular locations in an indoor area (e.g. as provided for each grid point in a set of grid points covering all or part of the indoor area). In particular implementations, a radio map may associate identities of local transmitters (e.g., a MAC address which is discernible from a signal acquired from a local transmitter), expected RSSI from signals transmitted by the identified local transmitters, an expected RTT from the identified transmitters, and possibly standard deviations from these expected RSSI or RTT. In alternative implementations, angles of arrival or departure may be used in lieu of or in combination with measurements of range or signature recognition in a radio map for estimating a location of a mobile device. These, however, are merely examples of values that may be stored in a radio map, and claimed subject matter is not limited in this respect.

In particular implementations for MC positioning, mobile device 100 may receive positioning assistance data for indoor positioning operations from one or more of servers 140, 150 or 155. For example, such positioning assistance data may include locations and identities of transmitters positioned at known locations to enable measuring ranges to these transmitters based, at least in part, on a measured RSSI and/or RTT, for example. Other positioning assistance data to aid indoor positioning operations may include, for example, radio maps, magnetic maps, locations and identities of transmitters, routeability graphs, building layouts and floor plans indicating permitted locations, common locations and improbable locations (e.g. associated with walls and building infrastructure). Other positioning assistance data received by the mobile device may include, for example, local maps of indoor areas for display or to aid in navigation. Such a map may be provided to mobile device 100 as mobile device 100 enters a particular indoor area. Such a map may show indoor features such as doors, hallways, entry ways, walls, etc., points of interest such as bathrooms, pay phones, room names, stores, etc. By obtaining and displaying such a map, a mobile device may overlay a current location of the mobile device (and user) over the displayed map to provide the user with additional context.

In one implementation, a routeability graph and/or digital map may assist mobile device 100 in defining feasible areas for navigation within an indoor area and subject to physical obstructions (e.g., walls) and passage ways (e.g., doorways in walls). Here, by defining feasible areas for navigation, mobile device 100 may apply constraints to aid in the application of filtering measurements for estimating locations and/or motion trajectories according to a motion model (e.g., according to a particle filter and/or Kalman filter). In addition to measurements obtained from the acquisition of signals from local transmitters, according to a particular embodiment, mobile device 100 may further apply a motion model to measurements or inferences obtained from inertial sensors (e.g., accelerometers, gyroscopes, magnetometers, etc.) and/or environment sensors (e.g., temperature sensors, microphones, barometric pressure sensors, ambient light sensors, camera imager, etc.) in estimating a location, change of location or motion state of mobile device 100.

According to an embodiment for MC positioning, mobile device 100 may access indoor navigation assistance data through servers 140, 150 or 155 by, for example, requesting the indoor assistance data through selection of a universal resource locator (URL). In particular implementations, servers 140, 150 or 155 may be capable of providing indoor navigation assistance data to cover many different indoor areas including, for example, floors of buildings, wings of hospitals, terminals at an airport, portions of a university campus, or areas of a shopping mall. Also, memory resources at mobile device 100 and data transmission resources may make receipt of indoor navigation assistance data for all areas served by servers 140, 150 or 155 impractical or infeasible. A request for indoor navigation assistance data from mobile device 100 may then indicate a rough or coarse estimate of a location of mobile device 100. Mobile device 100 may then be provided with indoor navigation assistance data covering areas including and/or proximate to the rough or coarse estimate of the location of mobile device 100 which may reduce the memory requirements of mobile device 100 and use of data transmission resources while still providing mobile device 100 with valuable navigation and other positioning assistance data.

In another implementation of MC positioning, server 140 may provide an expected transmission power level of local transceiver 115 to many devices that may include, but not necessarily be limited to, mobile device 100. Mobile device 100 may determine a separate transmission power level of local transceiver 115 by measuring a travel time of a signal transmitted between mobile device 100 and local transceiver 115. Mobile device 100 may measure the signal strength of the signal transmitted by local transceiver 115 and acquired at mobile device 100. By combining the measured travel time of the signal with the measured signal strength, mobile device 100, or another device, such as server 140, for example, may estimate the transmission power level for local transceiver 115. In this embodiment, measured signal strength, and measured RTT values and/or estimated transmission power may be transmitted to server 140. Mobile device 100, or server 140, may update local transceiver 115 transmission power level at server 140, for example. Other devices obtaining or measuring location relevant information, such as, but not limited to RTT results, received signal strengths, or transmission power levels, may then receive an updated transmission power level for local transceiver 115 from server 140 to assist positioning using measurements of signals from local transceiver 115. Mobile device 100 may similarly provide measurements to server 140 that enable estimation of the location of local transceiver 115 (e.g., measurements of the location of mobile device 100 and of signals received from local transceiver 115 at the measured location of mobile device 100). Location server 140 may then use these measurements to determine or update an estimated location for local transceiver 115 and send this location to other devices to assist these devices in computing their estimated location using measurements of signals by these devices from local transceiver 115.

In a particular implementation, an access network (AN) or an access location network (ALN) may comprise devices positioned and configured to transmit or receive signals to assist in positioning operations such as, for example, local transceivers 115 or base station transceivers 110 described above. Signals transmitted and received to assist in positioning operations may be designed primarily to support communication of audio, video, data and control information as part of normal communications operations but may provide the additional benefit of supporting positioning by having measurable attributes such as signal strength, signal angle of arrival, signal timing or other signal characteristics. Relating to an AN or ALN, an AN database or ALN database (ALN DB), respectively, may be maintained in a server such as server 140, 150 or 155. Similarly, entities such as a location based services application server (LBS AS), location server (LS), and map database (Map DB) may be provided or maintained by one or more of servers 140, 150 or 155. In addition, a mobile station (MS) may be detected in a venue and interact with one or more of the above-referenced entities over wireless communication links. In one example, an MS may be implemented as a mobile device 100 discussed above. In particular examples, an MS may comprise circuitry or processors for hosting one or more applications capable of communicating with one or more of the aforementioned elements in performing location based services.

In implementations that use SUPL as a location solution for MC positioning, a location server such as server 140, 150 or 155 in FIG. 1A may comprise a home SLP (H-SLP) or a discovered SLP (D-SLP) for mobile device 100. An H-SLP may be provided for mobile device 100 by a home wireless network operator or by some other preferred location provider, and may comprise a location server with which mobile device 100 is provisioned to receive location services while in a home area (e.g., home network coverage area) or while unable to obtain location services from some other location server if not in a home area. A D-SLP may be a location server supporting location services in some other area such as a particular building, a venue, a city, a state or some foreign country for a user and may have unique data (e.g., unique positioning assistance data that can be transmitted to mobile device 100) to support location services in this area. A D-SLP may support better location services (e.g., may enable more accurate and reliable location) than an H-SLP inside the area served by the D-SLP. It may then be an advantage for mobile device 100 to discover a D-SLP while in certain environments, such as inside a venue, in order to obtain improved location services. Hence, a D-SLP may be used for SUPL location in any extension or modification of the architecture in FIG. 1A that is intended to support location services for a venue or other indoor environment.

SUPL is a location solution supporting MC positioning that is based on interaction between a SET and an SLP using TCP/IP as a transport mechanism in which SUPL messages, defined according to the SUPL User Plane Location Protocol (ULP) defined by OMA, are exchanged between a SET and an SLP to set up and manage SUPL location sessions and to transport positioning assistance data, location parameters (e.g., location estimate and/or measurements for use in computing a location estimate) and SUPL and positioning capabilities. A SUPL session may employ one or more positioning protocols that may convey at least a portion of positioning assistance data transferred from an SLP to a SET and some or all of the location measurement and/or location estimate information transferred from the SET to the SLP. Certain SUPL messages (e.g., a SUPL POS message) may carry one or more embedded messages defined according to a positioning protocol as a means of invoking and supporting positioning within a SUPL session. Examples of positioning protocols supported by SUPL include Radio Resource Location Services (LCS) Protocol (RRLP), Radio Resource Control Protocol (RRC), LTE Positioning Protocol (LPP), IS-801 and LPP Extensions (LPPe). Typically, LPPe may extend LPP such that an LPP positioning protocol message may contain an embedded LPPe message. RRLP, RRC and LPP are defined by 3GPP, IS-801 is defined by 3GPP2 and LPPe is defined by OMA, all in publicly available documents.

Some networks (e.g. network 130), base stations (e.g. base station 110) and/or APs (e.g. AP 115) may employ network-centric (NC) positioning in addition to or instead of mobile-centric (MC) positioning. With network-centric positioning, an AP such as AP 115 or a base station such as base station 110 or some separate measurement unit (e.g. a location measurement unit (LMU)) not shown in FIG. 1A may detect signals transmitted by a mobile device such as mobile device 100 and perform certain measurements or other operations on these signals. For example, an AP 115 may determine an identity for the transmitting mobile device, such as a MAC address, which is included and encoded within the received signals. An AP 115 may further measure an RSSI, RTT, Signal to Noise Ratio (S/N), angle of arrival, time of arrival and/or some other characteristic of the received signal. Other APs, base stations and/or LMUs may measure the same or different characteristics for the received signals from the same mobile device. The identity for the mobile device (e.g. a MAC address), any measurements and the identity of the AP, base station or LMU that obtained this information may be provided to a location server such as server 140. The server may use the received information together with known locations for the APs, base stations and/or LMUs that provided the information to determine a location estimate for the mobile device—e.g. using such position methods such as E-CID and Time of Arrival (TOA). A benefit of network-centric location (e.g. as compared to mobile-centric location) is that base stations, APs and/or LMUs may provide information (e.g. identities and measurements) for a large number of mobile stations that have been detected in a particular area (e.g. a venue or part of a venue) within the same message or messages, thereby enabling a location server (e.g. server 140) to locate and track a large number of mobile devices at the same time and with significant signaling efficiency. This may enable the location server to provide a location service in which a location client is able to request location information from the server for many devices at the same time.

Figure 1B:
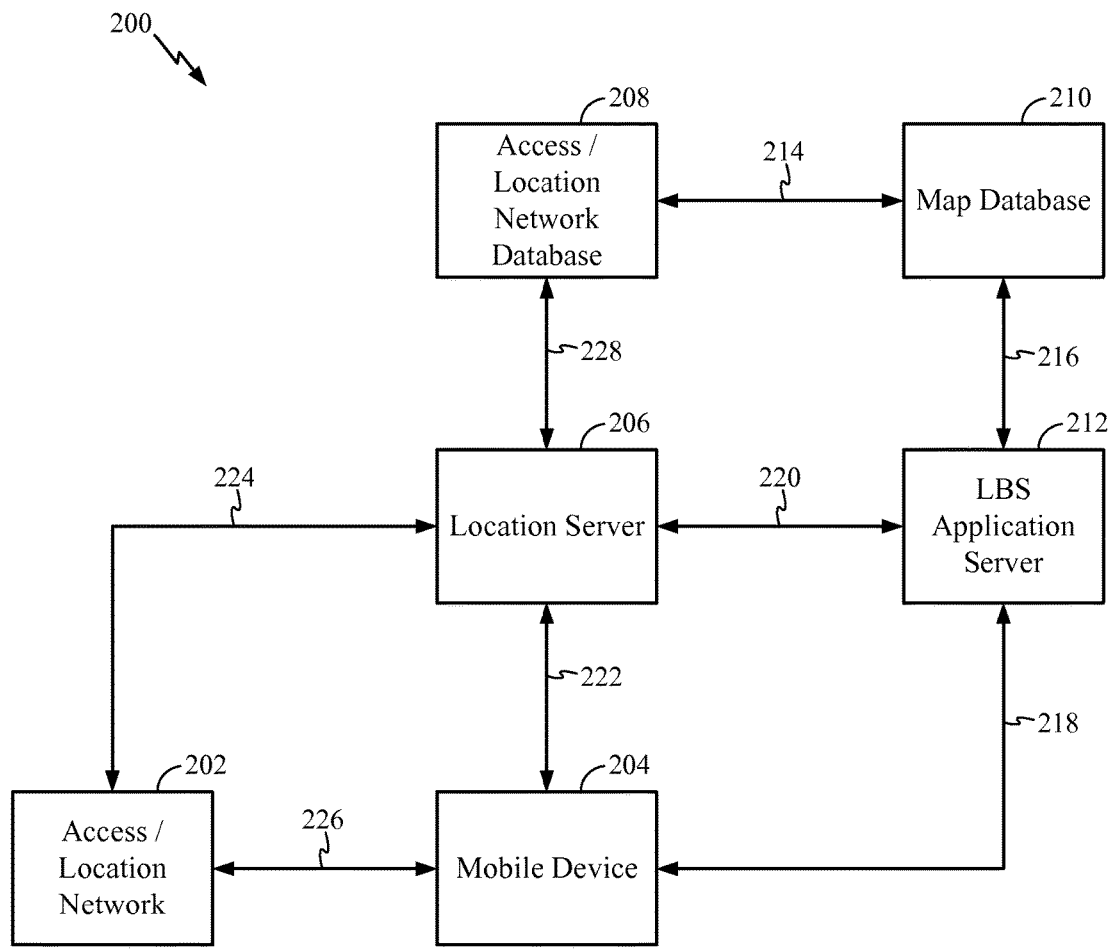
FIG. 1B is a system diagram illustrating certain features of an architecture for providing location based services in a venue.

FIG. 1B is a schematic diagram of an architecture 200 to provide location based services in a venue according to an embodiment. Architecture 200 may be implemented using elements of a network as shown in FIG. 1A and may comprise a modification and/or extension of the architecture shown in FIG. 1A that is more suitable for supporting location services in a particular venue or other indoor environment. For example, mobile device 204 in FIG. 1B may be implemented as mobile device 100 in FIG. 1A. Access/location network database (ALN DB) 208, map database (map DB) 210, LBS Application Server (LBS AS) 212 and Location Server (LS) 206 may be implemented as, or as a part of, servers 140, 150 and/or 155 in FIG. 1A. Access/Location Network (ALN) 202 may be implemented, at least in part, by base station transceiver 110 and/or local transceiver 115 in FIG. 1A and/or similar transceivers that serve a venue of interest. ALN 202 may comprise entities whose primary or only role is to support locating mobile device 204 (e.g. by transmitting positioning related radio signals to be measured by mobile device 204 or by measuring radio signals transmitted by mobile device 204) as well as entities whose primary or only role is to facilitate communication between mobile device 204 and other entities including but not limited to entities in FIG. 1B such as LS 206 and LBS AS 212. Additional correspondence between or among elements in the architectures depicted in FIGS. 1A and 1B may be as shown in Table 1 below, where elements that may correspond to one another are shown in different columns for the same row. For example, in row 5 of Table 1, for the element type LBS Application (shown in column 1), corresponding elements may comprise servers 140, 150, 155 in FIG. 1A (column 2) and LBS AS 212 in FIG. 1B (column 3). Note that in the case of FIG. 1A, the correspondence is less exact because FIG. 1A does not distinguish different types of server 140, 150, 155 or different types of communication link 145.

TABLE 1

Possible correspondence between Elements in FIGS. 1A and 1B

| Element Type | FIG. 1A | FIG. 1B |
|---|---|---|
| Mobile Device | 100 | 204 |
| Location Server | 140, 150, 155 | 206 |
| Access Network or AP | 110, 115 | 202 |
| LBS Application | 140, 150, 155 | 212 |
| Map Database | 140, 150, 155 | 210 |
| Access Network Database | 140, 150, 155 | 208 |
| Interface/Communication Link | 123, 125 | 226 |
| Interface/Communication Link | 145 | 224 |
| Interface/Communication Link | 123/125, 145 | 222 |
| Interface/Communication Link | 123/125, 145 | 218 |
| Interface/Communication Link | 145 | 220 |
| Interface/Communication Link | 145 | 228 |
| Interface/Communication Link | 145 | 216 |
| Interface/Communication Link | 145 | 214 |

In particular implementations, a presence and location of mobile device 204 in a venue or other indoor environment may be detected, measured or tracked using a mobile-centric (MC) approach and/or a network-centric (NC) approach. In an MC approach, for example, a receiver at mobile device 204 may obtain measurements for use in detecting a presence or estimating a location of mobile device 204. In an NC approach, receivers at stationary network elements (e.g., as elements of ALN 202) may acquire signals transmitted by mobile device 204 for detection of a presence of mobile device 204 in a venue and estimating or tracking a location of mobile device 204 in the venue. LS 206 may employ network-centric and/or mobile-centric positioning depending on capabilities of mobile device 204, ALN 202 and LS 206. LBS AS 212 may also query mobile device 204 for its location if LS 206 and/or ALN 202 do not support network-centric positioning or if mobile device 204 may provide an estimate of its location more accurately. Also, measurements indicated herein as being obtained using MC and NC approaches may be combined (e.g., at an LS) to mitigate measurement errors and improve accuracy of position estimates. Some specific examples of mobile-centric location and network-centric location have been described previously herein and may be employed in the architecture 200 shown in FIG. 1B—e.g. may be supported by ALN 202 and LS 206 in the case of NC location and/or may be supported by mobile device 204 and LS 206 in the case of MC location.

Message interfaces between entities in architecture 200 may include message interfaces 214, 216, 218, 220, 222, 224, 226 and 228. Message interfaces 214, 216, 218, 220, 222, 224, 226 and 228 may be bi-directional (as shown) or uni-directional. Message interfaces 214, 216, 218, 220, 222, 224, 226 and 228 may be implemented on any suitable communication link infrastructure such as IP infrastructure or wireless communication links. Message interfaces 214 and 216 may transmit requested map data (e.g. for a building floor plan and/or street map) to ALN Database 208 and LBS AS 212, respectively, for example in response to requests from these entities. Message interface 218 may transmit location-aware content (e.g. navigation directions) or map data (e.g. an indoor map of an area nearby to mobile device 204 that shows certain points of interest like stores, restaurants and exits in a shopping mall) from LBS AS 212 to mobile device 204. Message interface 220 may transmit a location request message from LBS AS 212 to LS 206 (e.g. a request for the location of mobile device 204), and a location response or location report (e.g. a location estimate for mobile device 204) from LS 206 to LBS AS 212 in response to the location request message. LBS AS 212 may be seen as a location services client by LS 206 and LS 206 may be seen as a server providing location services by LBS AS 212. Message interface 220 may correspond to interface 5 in an architecture defined by the In-Location Alliance and may be used to transfer messages between LBS AS 212 and LS 206 that are defined according to the OMA MLP protocol. In a mobile-centric approach, message interface 218 may similarly transmit a location request message from LBS AS 212 to mobile device 204, and a location response or location report from mobile device 204 to LBS AS 212 in response to the location request message. In a network-centric approach, on the other hand, message interface 218 may transmit a location request message from mobile device 204 to LBS AS 212, and a location response or location report from LBS AS 212 (which may convey a location estimate for mobile device 204 obtained by LBS AS 212 from LS 206) to mobile device 204 in response to the location request.

Message interface 222 may transmit positioning assistance data from LS 206 to mobile device 204 to support MC location. In a particular implementation where mobile device 204 computes an estimate of its location (e.g., using one or more of the above described techniques), message interface 222 may transmit the computed location estimate from mobile device 204 to location server 206. In another implementation in which MC positioning and/or NC positioning is used, message interface 222 may transmit access network related measurements (which may be obtained by mobile device 204 and/or by ALN 202 and conveyed to mobile device 204) from mobile device 204 to LS 206, and transmit an estimated location of mobile device 204 (e.g., computed based, at least in part, on the access network measurements) from LS 206 to mobile device 204. Such access network related measurements may include, but are not necessarily limited to, the aforementioned measurements of RTT, RSSI and angles of arrival for signals transmitted by mobile device 204 and received and measured by ALN 202 and/or signals transmitted by ALN 202 and received and measured by mobile device 204.

Message interface 226 (which may also comprise a signal interface and not explicitly convey messages) may transmit messages and/or radio signals between ALN 202 and mobile device 204 on wireless access communication links, for example. Radio signals transmitted on message interface 226 may be measured by a recipient entity and/or initiate a response that may be measured by the initial sending entity in order to obtain RSSI, RTT, pseudoranges, timing differences or other measurements that may enable location aspects (e.g. location coordinates) of mobile device 204 and/or elements of ALN 202 (e.g., an AP in ALN 202) to be obtained. Message interface 226 may also transmit location assistance data that is broadcasted or unicasted from ALN 202 to mobile device 204, wherein the positioning assistance data may be obtained by ALN 202 from LS 206 or may be otherwise provisioned in ALN 202 (e.g., by a network management entity not shown in FIG. 1B).

Message interface 224 may transmit messages from LS 206 to ALN 202 including, for example, messages to configure ALN 202 to detect and obtain measurements from mobile devices in the venue (using NC positioning) and to provide positioning assistance data to elements in ALN 202 for use by ALN 202 (e.g. to locate mobile device 204) or to be conveyed to mobile device 204 (e.g. via broadcast or unicast) to support MC positioning. In a network-centric application, message interface 224 may also transmit measurements from ALN 202 to LS 206 to, for example, enable LS 206 to detect, or compute an estimated location of, mobile devices in a venue.

Message interface 228 may transmit messages from ALN database 208 to LS 206 which may convey positioning assistance data including base station almanac data for ALN 202 to LS 206, and may transmit crowd-sourced data (e.g., including measurements and other data related to locations, identities and transmission characteristics for access points (e.g., 802.11 access points) in ALN 202 collected by LS 206 from client mobile devices in the venue such as mobile device 204) from LS 206 to ALN database 208.

In particular implementations, devices in ALN 202 (e.g., IEEE 802.11 access points, femto cell transceivers or Bluetooth devices) may be configured by LS 206 using message interface 224 to detect and report the presence or location of mobile device 204 in a venue. For example, LS 206 may configure devices to detect and report on detected mobile devices entering a venue in a default mode (e.g. report on all detected mobile devices every 30 seconds). LS 206 may configure devices to report on specific devices in other modes—(e.g., report at a higher frequency or if specific predefined trigger conditions occur such as some change in measured signal round-trip time (RTT) or measured RSSI, for example).

In particular implementations, LBS AS 212 may configure LS 206 to report on newly detected mobile devices (e.g., as reported to LS 206 by ALN 202) in a default mode (e.g., report on all mobile devices every 30 seconds). LBS AS 212 may also configure LS 206 to provide reports for specific mobile devices or for all mobile devices in response to other trigger conditions. Trigger conditions and trigger detection may be implemented within LS 206 including complex trigger conditions such as detecting when a mobile device enters or leaves a specific portion of a venue (e.g. a particular shop in a shopping mall or a particular gate area in an airport) or detecting when a mobile device has moved a certain distance from some previously reported location. LS 206 may in turn configure some trigger conditions in ALN 202 and/or in mobile device 204 which may then report back to LS 206 data associated with these trigger conditions (e.g., detection of mobile device 204) entering a venue or periodic location of mobile device 204. However, in some implementations, LS 206 may support the more complex trigger conditions while delegating the handling of simpler trigger conditions to ALN 202 and/or mobile device 204 in order to (i) reduce resource usage in ALN 202 and/or mobile device 204, (ii) conserve battery life in mobile device 204 and possibly ALN 202, (iii) simplify implementation (and possibly cost) of ALN 202 and/or mobile device 204 and/or (iv) avoid frequent upgrades to and replacement of elements in ALN 202 and mobile device 204. Possible configured triggers in LS 206, ALN 202 and/or mobile device 204 may include, for example, a single mobile device entering, leaving or remaining within a geofence (which may be some defined fixed area or some non-fixed area defined relative to the current location of another mobile device), a minimum or maximum number of mobile devices entering, leaving or remaining within a geofence, or the presence and/or location of a mobile device or set of mobile devices during a specific time window or at a specific time.

Mobile device 204 may be detected entering a venue area by one or more elements in ALN 202 (e.g., access points (APs) using existing low-level IEEE 802.11 or Bluetooth (BT) signaling). For example, APs in ALN 202 may be configured to make measurements of signals transmitted by either particular mobile devices 204 expected to be in the venue area or any mobile device 204 in the venue area. Here, APs in ALN 202 may transmit messages to LS 206 (e.g., messages specifying a MAC address for a detected mobile device 204, the MAC addresses of APs in ALN 202 that detected signals from the mobile device 204 and optional measurements of signals received from mobile device 204). LS 206 may then (i) compute an estimated location for mobile device 204; (ii) store the location if computed and/or store other data such as a time of day, the MAC addresses of APs detecting mobile device 204 and the MAC address for mobile device 204; and/or (iii) report some or all of this data to LBS AS 212. In some embodiments, ALN 202 may report detection of and measurements for a mobile device 204 only intermittently (e.g. at intervals of not less than 15 seconds) and may then report data and measurements for all mobile devices detected and measured since the previous report was sent to LS 206 in order to reduce signaling and processing by ALN 202 and LS 206. Similarly, LS 206 may report data to LBS AS 212 for mobile devices whose signals were detected and measured by APs in ALN 202 only intermittently in order to reduce signaling and processing for LS 206 and/or LBS AS 212. For any particular mobile device of interest, LS 206 may maintain an identity (e.g., identifiers such as a MAC address, IP address), identities of APs that most recently detected the mobile device, last known location or last known area, location history, current heading and speed, last serving AP or mobile device capabilities. In one particular implementation in which interaction between LS 206 and mobile device 204 is defined, at least in part, according to OMA SUPL, capabilities of mobile device 204 may include being capable of executing certain positioning protocols such as LPP and LPPe and certain positioning methods such as A-GNSS, OTDOA, AFLT and/or E-CID. LS 206 may transfer information regarding mobile devices detected in a venue (e.g., from contents of messages received from mobile devices or ALN 202) to LBS AS 212 (e.g., if configured for this as discussed above). LBS AS 212 may also store information received from LS 206 for use in, for example, delivery of location-aware content to mobile devices (e.g. mobile device 204) and/or maintaining, developing or updating analytics data regarding visitors to a venue.

In a particular implementation, mobile device 204 may discover LBS AS 212 using any one of several techniques such as, for example: (i) a generic application hosted on mobile device 204 obtaining a URL or IP address for the LBS AS 212 via broadcast information received from ALN 202; (ii) a user downloading a dedicated application to be hosted on mobile device 204 that is configured to interact with LBS AS 212 for one or more venues in response to the application being notified (e.g. via user input) that a particular venue has been detected by mobile device 204 or by the user of mobile device 204; or (iii) a user accessing LBS AS 212 via a user interface browser (e.g., by accessing a venue-specific website) in response to the user being aware of being inside a particular venue. For any particular such technique for discovering LBS AS 212, a user may initiate communication from mobile device 204 to LBS AS 212 via interaction with either an application hosted on mobile device 204 or via a mobile browser or by other means. In a particular implementation, mobile device 204 and LBS AS 212 may interact in order to: (i) optionally authenticate mobile device 204 by LBS AS 212, (ii) optionally authenticate the LBS AS 212 by mobile device 204, (iii) optionally provide LBS AS 212 with an identity of mobile device 204 (e.g., IP address, MAC address, International Mobile Subscriber Identity (IMSI), public user SIP address, logon identity or billing related identity), (iv) optionally indicate, to the user or an application hosted on mobile device 204, services (e.g., including location based services) available from LBS AS 212 to mobile device 204, (v) optionally provide user permission for being located (e.g., in association with provision of certain agreed services by LBS AS 212), (vi) optionally provide some initial map data to mobile device 204, (vii) optionally provide an address of LS 206 to mobile device 204 (e.g., if not broadcast by elements of ALN 202, or available from an H-SLP or D-SLP), and (viii) optionally provide location determination and positioning capabilities of mobile device 204 to LBS AS 212 (e.g. capabilities related to support of interface 222 including possibly support of SUPL, LPP and LPPe on interface 222). Following this interaction, LBS AS 212 may transmit messages to LS 206 providing information obtained from mobile device 204 such as an IP address, MAC address and/or other identity for mobile device 204, the capability of mobile device to support positioning related interaction (e.g. via SUPL) with LS 206 using interface 222 and possibly an initial location for mobile device 204 if received by LBS AS 212 from mobile device 204. LBS AS 212 may also store attributes of mobile device 204 (e.g., identifiers, estimated location, location determination capabilities, etc.) to enable provisioning of agreed or preferred services and support future location determination requests. The interaction between LBS AS 212 and mobile device 204 described here may be associated with or facilitated by a registration of mobile device 204 with LBS AS 212 (e.g., which may be established prior to mobile device 204 entering a venue supported by LBS AS 212) in which (e.g., following the registration) LBS AS 212 maintains some data for mobile device 204 even while mobile device 204 is not within a venue supported by LBS AS 212. Such a registration may simplify and speed up the interaction just described between mobile device 204 and LBS AS 212 and enable improved service support by LBS AS 212 to mobile device 204.

In a particular implementation, an estimated location of mobile device 204 may enable or help enable an application or browser hosted on mobile device 204 to support some service provided by a particular venue (e.g., provided by LBS AS 212 in FIG. 1B) or some service provided independently of any particular venue. Here, for example, the browser or application hosted on mobile device 204 may request an estimate of a location of mobile device 204 using a suitable high-level operating system (HLOS) application programming interface (API), which may lead to a request (e.g., from the HLOS) to a positioning engine or location engine on mobile device 204. A positioning engine or location engine may obtain an estimated location of mobile device 204 using various positioning methods such as A-GNSS, OTDOA, AFLT and/or use of WiFi AP and/or BT AP measurements and/or use of inertial sensors contained within mobile device 204 (e.g. accelerometers, gyroscopes, barometers, etc.) which may entail interaction with an H-SLP and/or interaction with a venue D-SLP, for example LS 206 in FIG. 1B. Positioning engine involvement in venue support may include venue D-SLP discovery by mobile device 204 from either the H-SLP for mobile device 204 or from another D-SLP already discovered from and/or authorized by the H-SLP for mobile device 204 if a venue D-SLP (e.g., LS 206) can provide better location support than an H-SLP or another D-SLP for mobile device 204. Here, if an application hosted on mobile device 204 interacts with LBS AS 212 in order to obtain venue-related location services (such as navigation assistance, map data, indication of nearby points of interest and/or other location-related content data) and this application relies on an estimated location of mobile device 204 in order to make use of such location services (e.g. to determine the location of mobile device 204 on a venue map provided by LBS AS 212), then the application may have an additional option of requesting an estimated location of mobile device 204 from LBS AS 212 (e.g., as a fallback to positioning engine failure or unavailability or as a first choice if preferred by the application). In such a case, LBS AS 212 may request mobile device 204 location from LS 206 and LS 206 may request ALN 202 to perform network-centric positioning of mobile device 204 with the location result or measurements being passed back from ALN 202 to LS 206 and with a computed location estimate then being passed back to mobile device 204 via LBS AS 212.

In a particular implementation, LBS AS 212 may request LS 206 to periodically locate some or all mobile devices (e.g., as described above) using interface 220. This may enable various venue services and collection of statistics on all users and/or on selected users (e.g., in order to determine which shops are most popular in a shopping mall, where congestion occurs in an airport, where additional seating may be needed in a hospital). LS 206 may authenticate LBS AS 212 once only for multiple requests (e.g., may establish a secure session on which the multiple requests and their responses may be conveyed) or may authenticate LBS AS 212 multiple times, e.g., once for each individual request. LBS AS 212 may similarly authenticate LS 206 once only for multiple requests or multiple times, e.g., once for each individual request. LS 206 may request updated measurements from ALN 202 in order to obtain new location estimates for mobile devices of interest as discussed above and/or may rely on earlier configuration of ALN 202 by LS 206 whereby ALN 202 provides new location reports to LS 206 for mobile devices (e.g., mobile device 204) without further requests from LS 206. LS 206 may also obtain location information (e.g. location estimates and/or location measurements) directly from mobile devices (e.g. mobile device 204) using interface 222. LS 206 may then return obtained location information (e.g., location estimates, location history) for mobile devices such as mobile device 204 to LBS AS 212 to enable LBS AS 212 to provide location-related services to these mobile devices.

In a particular implementation, a user (e.g., via an application or browser hosted on mobile device 204) may periodically request services (e.g., map data, venue information) from LBS AS 212. LBS AS 212 may also or instead periodically push services to the user without a user request (e.g. via a browser or application hosted on mobile device 204) and as triggered by certain events (e.g., a user entering or leaving some geofence or following some change in environmental conditions such as the imminent closure of a shopping mall or the start of a sales event at shopping mall store). Mobile device 204 may obtain a position fix to make use of such services using a mobile-centric approach or network-centric approach as discussed above.

Following a timeout period following a last detection of mobile device 204 in a venue by ALN 202 and/or after determination that a location of mobile device 204 is outside the venue, LS 206 and LBS AS 212 may delete some or all stored attributes of mobile device 204 from their current data set. Here, in some instances, all data may be deleted in LS 206 while some data may be retained in LBS AS 212 (e.g., as agreed upon with the user and as allowed by a privacy policy). Retained data may, for example, be helpful to future authentication and billing support and for providing future services.

In particular implementations, as pointed out above, mobile device 204 may be registered with an LBS AS 212 where the LBS AS 212 has knowledge of a unique identifier (ID) of mobile device 204 (e.g. an IMSI, public SIP user ID, MAC address). Subsequent specific service requests issued by LBS AS 212 to LS 206 that may request location information (e.g., a location estimate) for mobile device 204 or that may configure LS 206 to provide such location information responsive to one or more of certain trigger events occurring (such as mobile device 204 entering or leaving some geofence) may be specific to that particular unique ID (or may be specific to the IDs for a set of mobile devices if location information is desired for mobile devices in this set). If a particular mobile device is not registered with LBS AS 212 (e.g., where a unique ID of the mobile device is not known by LBS AS 212), subsequent service requests by LBS AS 212 to LS 206 may be generic as opposed to specific to a particular unique ID of mobile device 204 and may then be applicable to any mobile device. For any generic or specific service request, LBS AS 212 may request that LS 206 respond to one or more particular types of predefined events. In one implementation, LBS AS 212 may request that LS 206 provide estimated locations of one or more identified mobile devices or of any mobile device at fixed times (e.g., periodically). In another implementation, LBS AS 212 may request that LS 206 report detections of an identified mobile device 204 or of any mobile device entering, leaving, remaining inside or remaining outside a specific geographic target area. LS 206 may subsequently provide one or more reports to LBS AS 212 where each report may comprise, for example, a simple event notification (e.g. that an identified mobile device 204 or some plurality of mobile devices entered, left, remained within or remained outside the geographic target area) and/or may include more information such as, for example, an estimated location of a mobile device 204, an identity of mobile device 204 and/or estimated locations and/or identities for a plurality of mobile devices.

In another particular implementation in connection with ALN 202, LBS AS 212 may request that LS 206 report detection of an identified mobile device 204 or any mobile device entering or leaving an area covered or serviced by ALN 202. This particular report may comprise a simple event notification and/or may include more information such as, for example, an estimated location of the mobile device 204 and/or an identity of mobile device 204. In another particular implementation, LBS AS 212 may request that LS 206 provide reports in support of analytics (e.g., statistics on a rate of individuals entering and/or leaving a predefined area or statistics on the number of individuals and/or dwell time of individuals within a predefined area). Here, LBS AS 212 may request that LS 206 provide a report periodically at fixed intervals or in response to the occurrence of certain specific analytic events. For instance if a number of mobile devices (or the rate of arrivals and/or departures) within an area or ALN 202 exceeds a certain threshold, LS 206 may provide a report. Such a report may include a simple event notification or more information such as the location or locations of the mobile devices associated with the event and/or their identities. In order to provide location-related event notifications and information to LBS AS 212, LS 206 may request location information from ALN 202 and/or from mobile device 204, and/or may configure ALN 202 and/or mobile device 204 to provide location-related event notifications and additional information to LS 206.

Figure 2:
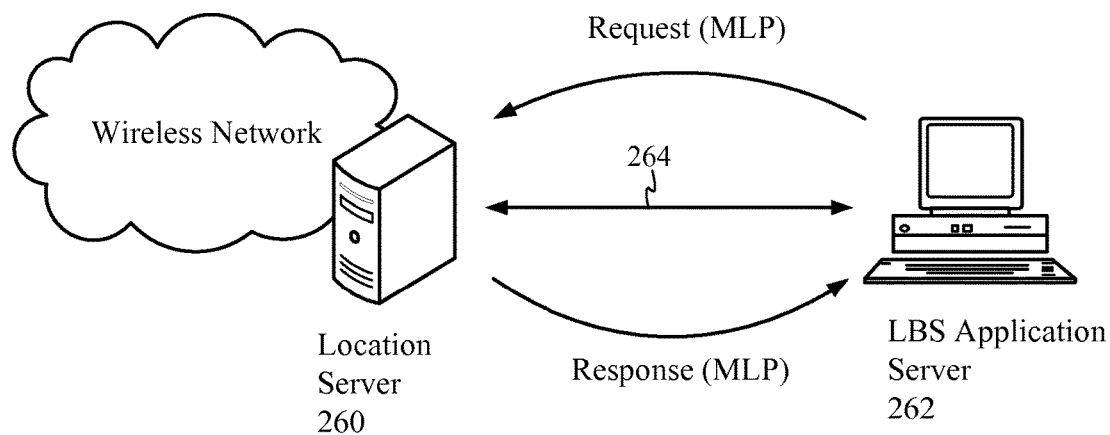
FIG. 2 is a schematic diagram of a network including a location server capable of communicating with a location application server using a mobile location protocol (MLP).

As pointed out in particular implementations above, an LS 206 and LBS AS 212 may communicate and/or interoperate at least in part according to aspects of OMA. FIG. 2 is a schematic diagram of a network including an LS 260 (e.g., which may correspond to LS 206 in FIG. 1B) capable of communicating with an LBS AS 262 (e.g., which may correspond to LBS AS 212 in FIG. 1B) using a mobile location protocol (MLP) defined according to OMA according to an embodiment. The LS 260 and LBS AS 262 may be connected by a link 264 which may correspond to or support interface 220 in FIG. 1B. Link 264 may be a direct link (e.g. a wired connection or connection via a common LAN) or may comprise one or more intermediate entities such as bridges, routers and/or networks (e.g. network 130 in FIG. 1A). Here, LS 260 may communicate with LBS AS 262 according to MLP. Here, the LBS AS 262 may transmit MLP requests to the LS 260 and receive MLP responses and MLP reports from LS 260. In an embodiment, LBS AS 262 in FIG. 2 may be replaced by another location services client that requests and obtains similar or the same location services from LS 260 as requested and obtained by LBS AS 262 but is not an LBS AS serving a venue but is instead some other server or application providing location services to one or mobile devices (e.g. mobile device 204 in FIG. 1B) and/or one or more other users. In this case, the interactions supported by MLP on the link 264 on behalf of the other location services client may be the same as those supported by MLP on behalf of LBS AS 262.

Figure 3:
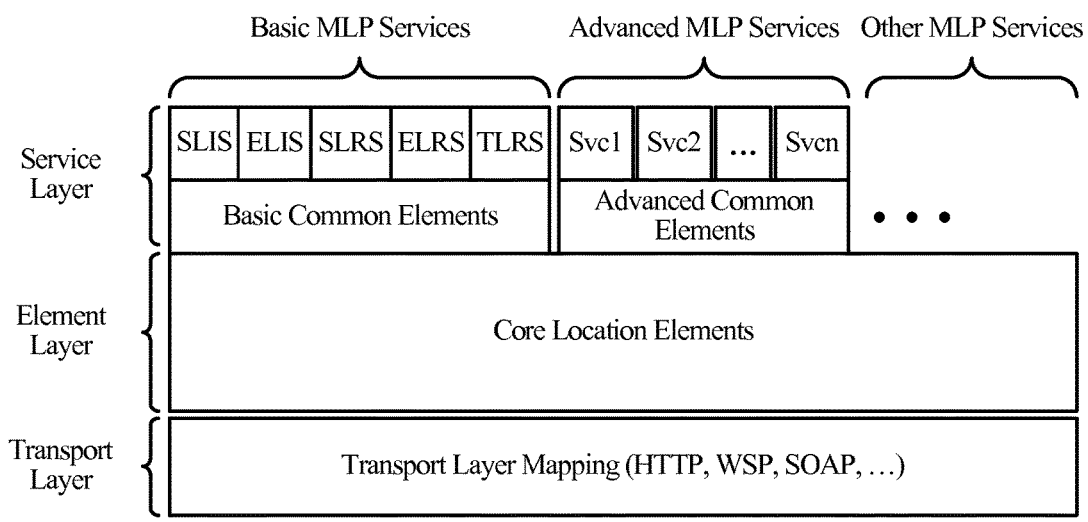
FIG. 3 is a block diagram of a layered protocol stack.

According to an embodiment, an MLP protocol may be implemented as an XML based protocol having a layered architecture as shown in FIG. 3. MLP may be used by the LBS AS 262 to configure location reporting from the LS 260 as described in association with FIG. 1B (e.g. in the case that LS 260 corresponds to LS 206 and LBS AS 262 corresponds to LBS AS 212) and may support the different interactions described in association with FIG. 1B that occur between LS 206 and LBS AS 212. MLP may further support location related interaction between an LS and LBS AS as exemplified later herein in FIGS. 11, 12, 13, 14, 15A, 15B, 15C and 15D (e.g., as described for event B in FIGS. 11, 12, 13, 14 and 15A). In all cases, an LBS AS may be replaced by some other LCS client without affecting the MLP interaction between the LCS Client and the LS.

Figure 4:
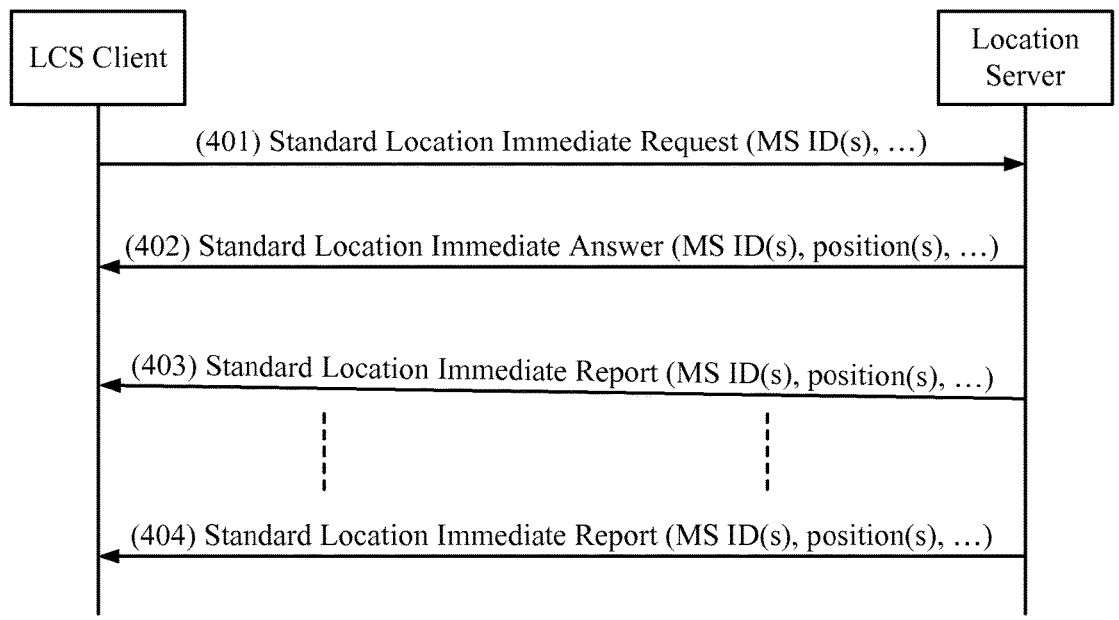
FIGS. 4-6 are message flow diagrams of example messages flows between a location server and a location services (LCS) client.

In one particular application as shown in FIG. 4, an MLP service may be used by a location services (LCS) client (e.g. LBS AS 212 in FIG. 1B or LBS AS 262 in FIG. 2) in order to request an estimated location of one or more target mobile devices (e.g. mobile device 204 in FIG. 1B) if a response is required immediately or within a set time window. In particular implementations, the LCS client receives updates from an LS (e.g. LS 260 in FIG. 2 or LS 206 in FIG. 1B) regarding states of mobile devices in a venue. In this case, the LCS client may send an MLP Standard Location Immediate Request (SLIR) to the LS at step 401 in FIG. 4 including unique identifiers of the target mobile devices (e.g., an identifier for mobile device 204). The LS may acknowledge the request with an MLP Standard Location Immediate Answer (SLIA) at step 402 possibly including an estimated location result for each target mobile device. If the SLIA does not contain all requested estimated location results (e.g. it may not contain any), the LS may transmit one or more subsequent Standard Location Immediate Reports (SLIREP) at step 403, step 404 and other steps not shown in FIG. 4 containing the estimated location results until all estimated locations that have been requested are reported.

Figure 5:
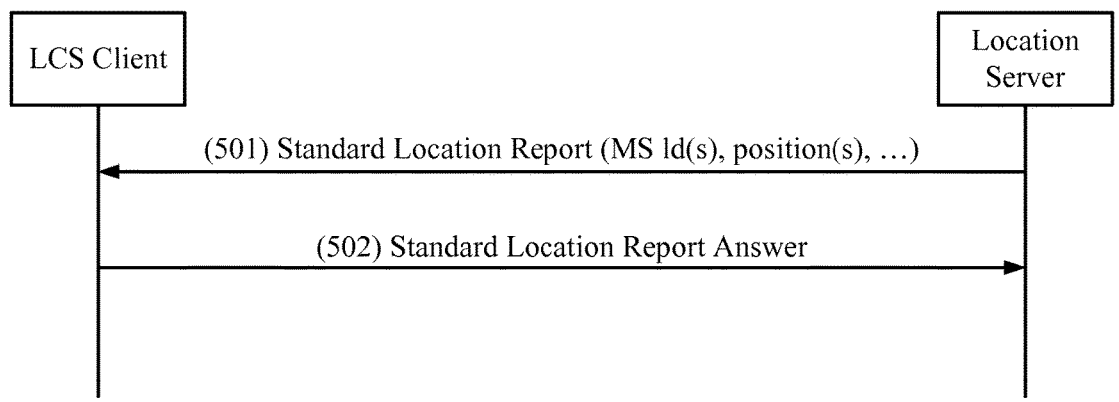

In another particular application as shown in FIG. 5 in which the LS and LCS Client may have similar correspondence to FIGS. 1A and 2 as described for FIG. 4, an MLP service may be used for unsolicited positioning reporting of one or more mobile devices. Here, an LS may initiate position reporting at step 501 to the LCS Client by sending an MLP Standard Location Report (SLREP) including the position of one or more mobile devices and their identities. The LCS client may acknowledge receipt of the position report with a Standard Location Report Answer (SLRA) at step 502.

Figure 6:
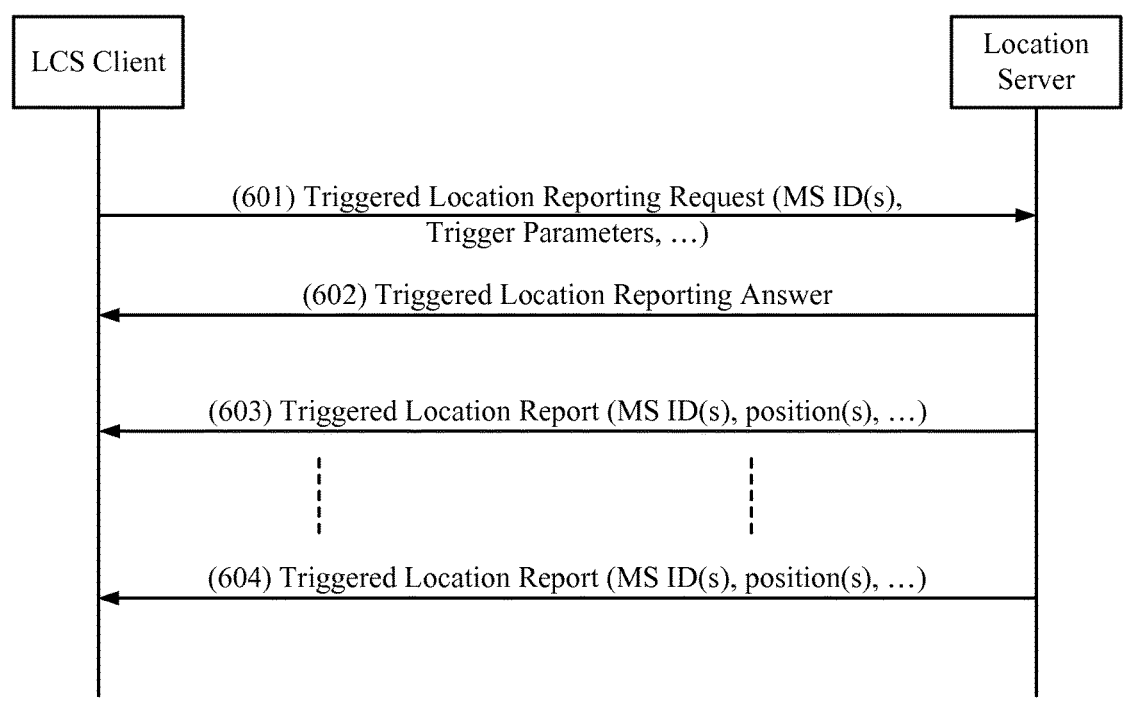

In another particular implementation as shown in FIG. 6 in which the LS and LCS Client may have similar correspondence to FIGS. 1A and 2 as described for FIG. 4, an MLP service may be used by an LCS client to track the position of one or more target mobile devices. Here, tracking may be based on time (e.g., periodic location reporting), geographical area (e.g., entering, leaving, remaining within or remaining outside a 'geofence') or other events. In this case the LCS client may transmit an MLP Triggered Location Reporting Request (TLRR) at step 601 to the LS including unique identifiers (e.g., MAC addresses, IP addresses, IMSIs) of the target mobile devices to be tracked and particular events for which location information is requested to be returned. The LS may acknowledge the TLRR with transmission of an MLP Triggered Location Reporting Answer (TLRA) at step 602. As events occur, the Location Server may report to the LCS Client at steps 603, 604 and possibly other steps not shown in FIG. 6 by sending MLP Triggered Location Report (TLREP) messages that may each include the type of the event being reported and associated mobile device identities for the target mobile devices associated with the event and possibly the positions of these mobile devices. Different event types that may be requested to be reported in step 601 may include: (i) "time" where the LS is requested to report the positions of a mobile device or devices at fixed times (e.g., periodically); (ii) "area" where the LS is requested to report an MS's entry into, departure from, remaining within or remaining outside a specific geographic target area (e.g., for which a report may be a simple event notification or may include more information such as for example the position of an MS); (iii) "ALN" where the LS is requested to report an MS's entry into or departure from an area covered by a specific ALN (e.g., for which a report may be a simple event notification or may include more information such as for example the position of the MS); and (iv) "analytics" where the LS is requested to report the occurrence of certain analytic events such as the number of MSs (or the rate of arrivals/departures) within a geographic area or ALN coverage area exceeding a certain threshold, a mobile device moving more than a threshold distance, speed of a mobile device increasing above a threshold, speed of a mobile device being above a threshold, speed of a mobile device decreasing below a threshold, speed of a mobile device being below a threshold, or distance of a mobile device relative to a reference point decreasing below a threshold, increasing above a threshold, being below a threshold, or being above a threshold.

Trigger Condition Persistence

In a venue environment, the satisfaction of a trigger condition (i.e., one or more circumstances, e.g., activities or inactivities) may be significant. For example, the proximity or lack of proximity of a user or group of users to a certain location or area may be relevant, such as the proximity of many users to an exit, an information desk, or a cash register, or the lack of proximity of users to a shop display case or a blackjack table in a casino. Further, there may be added significance if the condition persists. Persistence of such conditions, respectively, may be indicative of a blocked or locked fire exit, the lack of an attendant at the information desk, the lack of a cashier at the cash register, or the desirability to redesign, replace, or remove the display case or blackjack table. Hence, in a venue environment, it may be useful to monitor and determine the persistence of one or more corresponding trigger conditions to trigger a corresponding response (e.g., a notification or execution of another action), which may be in addition to a response triggered in response to the condition being met regardless of persistence.

An LCS client (e.g. an LBS AS) may provide an indication of a persistence condition (i.e., a required duration in time) to an LS along with a request to report location related information when a certain trigger condition or one of several trigger conditions are detected by the LS. The persistence condition may be provided as one of the parameters in an MLP TLRR message such as that exemplified at step 601 in FIG. 6. More than one persistence condition may be provided by an LCS Client to an LS and different persistence conditions may be associated with different trigger conditions, including a single persistence condition being associated with more than one trigger condition. The persistence condition time may be provided in terms of days, hours, minutes, and seconds, or in another time format.

After receiving a persistence condition (e.g. after receiving an MLP TLRR message as in step 601 in FIG. 6 that contains one or more persistence conditions), the location server may monitor one or more trigger scenarios that each includes a trigger condition or a combination of trigger conditions (e.g. as also provided in an MLP TLRR message as in step 601 or FIG. 6), with each trigger condition possibly having an associated persistence condition, or no persistence condition. The persistence condition may define a duration of time for which one or more trigger events must persist continuously before a location server will report the occurrence of the trigger event or trigger events to the LCS Client (e.g. at step 603 or 604 in the example of FIG. 6) along with possibly additional information such as the identity or identities of mobile devices associated with the trigger event or events and possibly their locations. As an example, a persistence condition may be provided by an LCS Client in a TLRR message that requests reporting by an LS whenever a particular mobile device (e.g. mobile device 204 in FIG. 1B) is within a particular target area. If the mobile device subsequently enters the target area at a time T0 and later leaves at a time T1 where (T1-T0) is less than the duration of time for the persistence condition, the LS may not send a report to the LCS Client. If the mobile device later enters the target area again at a time T2 and is still present in the target area at a time T3 without having left and reentered in the intervening time where (T3-T2) equals or exceeds the duration for the persistence condition, the LS may send a report to the LCS Client (e.g. at step 603 or 604 in FIG. 6) indicating that the mobile device is within the target area—and may provide the identity of the mobile device and/or the current location of the mobile device.

The persistence condition may be the same for all the trigger conditions (e.g., all conditions met for one minute), or may be different for any number of multiple trigger conditions (e.g., one trigger condition met for one minute and all others for two minutes; one trigger condition met for one minute, another trigger condition met for two minutes, another trigger condition having no persistence requirement, and all other trigger conditions met for five minutes; each of trigger conditions A, B, and C met for durations X, Y, and Z, respectively; etc.). Combinations of trigger conditions may fulfill a trigger scenario by being met for various relationships of their respective persistence. For example, combinations of trigger conditions may be met by a concurrently running equal duration, by partially overlapping durations, or by non-overlapping durations. For non-overlapping durations, the durations may be related by a proximity of the durations (e.g., trigger condition X persists for duration Y within Z minutes of trigger condition A persisting for duration B; trigger condition X persists for duration Y within Z minutes of trigger condition A beginning and then persisting for duration B; etc.). Thus, for a singular persistence of multiple trigger conditions, while typically all trigger conditions are concurrently met for the entire persistence condition to satisfy the trigger scenario, this is not required. Further, while for different trigger conditions each with a different associated persistence condition, the trigger scenario may typically be met where durations of satisfaction of the different trigger conditions overlap, this is not required. Examples of trigger conditions for which a persistence condition may be defined are being inside of a target area, being outside of a target area, being inside one target area and inside or outside another target area, or being outside one target area and inside or outside another target area. A target area is typically a contiguous region (e.g., a region bounded by a circle), but may also be multiple separated regions (e.g., two non-overlapping regions each bounded by a circle). Other trigger conditions for which a persistence condition may be defined include entering a target area, leaving a target area. moving some minimum distance from a previous location, exceeding some minimum speed, falling below some maximum speed and other conditions that may be associated with events that occur at some instant of time. For these trigger conditions, a persistence condition may be associated with the trigger event remaining continuously valid for a duration of time defined by the persistence condition. For example, in the case of a trigger condition associated with a mobile device entering a target area, the persistence condition may be satisfied if, after entering the target area, the mobile device remains inside the target area for the required duration. In another example of a trigger condition associated with a mobile device exceeding some minimum speed, the persistence condition may be satisfied if, after starting to exceed the minimum speed, the mobile device continues to exceed the minimum speed without falling below this speed for the required duration.

A persistence condition defines a minimum time period for continuous persistence of the trigger condition. Here, continuous persistence does not necessarily require absolute continuity without interruption, but instead is an indication of consecutive samples or instances of monitoring of a trigger condition being observed to persist. For example, if a trigger condition is monitored at sample times once per second to determine whether the trigger condition is met, and the persistence condition is 10 seconds, then the persistence condition is met if at 10 consecutive times that the trigger condition is monitored, the trigger condition is satisfied, even if between two consecutive sample times the trigger condition ceased to be satisfied and returned to being satisfied before the next sample time had occurred.

If a trigger condition is met, and then is determined to be no longer met before the persistence condition is met, then the duration of the trigger condition may be reset to zero. For example, the duration could be reset to zero if it is determined that a mobile device leaves a target area prior to expiration of a persistence condition associated with entering or being within the target area Similarly, the duration could be reset to zero if it is determined that a velocity of a mobile device increases above a threshold velocity and then decreases below the threshold velocity prior to expiration of the persistence condition associated with exceeding the threshold velocity.

The location server is configured to provide an indication of satisfaction of a trigger scenario in a response to the request by the LCS client. The location server is preferably configured to report occurrence of the trigger condition(s) for the corresponding persistence condition(s) only once the persistence condition(s) is(are) met for (all) the trigger condition(s). The location server may send, in the TLREP (e.g. in step 3 or step 4 of FIG. 6), a notification to the LCS client of the satisfaction of a trigger scenario and may include in the notification an identification of a mobile device that satisfies the trigger condition and/or a current location of the mobile device. The notification may cause the LCS client to provide location information related to the trigger scenario (e.g., alerting a manager that a cashier is desirable).

Trigger Conditions for a Group of Target Devices

Trigger conditions may be applied to a group of mobile devices that may be either identified, e.g., by the LCS client in a location service request to the location server, or by the location server, or not identified. The location service request may include a trigger scenario that includes a trigger condition and a group condition specifying a group of mobile devices and the location server is configured to monitor the trigger scenario. The location server may monitor multiple trigger scenarios, and a given trigger scenario may include multiple trigger conditions, but for simplicity a single trigger scenario with a single trigger condition is discussed here as an example. The group condition may indicate a number of mobile devices without identifying any particular mobile device, may identify one or more particular mobile devices, or may be a combination of one or more unidentified mobile devices and one or more identified mobile devices.

An indication of a group condition may be provided by the LCS client to the location server in a location service request (e.g., the MLP TLRR as in step 601 of FIG. 6) and/or by the location server to the LCS client in a response (e.g., the MLP TLREP as in steps 603 and 604 of FIG. 6). The trigger condition may comprise a description of the circumstance(s) (e.g., activity, non-activity) for meeting the trigger condition and the group condition may indicate a number or fraction of mobile devices that are required to meet the trigger condition in order to satisfy the group condition. For example, the trigger condition may refer to entering, leaving, remaining within or remaining outside a designated geographic target area. The group condition may specify a particular group of mobile devices (e.g. mobile devices belonging to all employees of a particular store in a shopping mall or mobile devices belonging to all members of a particular flight crew for some airline). The group condition may further specify whether (i) all members of the group, (ii) some minimum number or minimum fraction of members of the group or (iii) no more than some maximum number or some maximum fraction of members must fulfill the trigger condition in order for the trigger condition to be reported by the location server to the LCS Client. For example, when a group consists of mobile devices belonging to employees of a certain store in a shopping mall, the trigger condition may specify mobile devices remaining within a target area comprising the area of the store and the group condition may specify a maximum of two mobile devices remaining within the target area. In this example, there may be no report while the number of employees in the store exceeds two, but once the number of employees (i.e. users of mobile devices in the group) who are within the store falls to two or less, the location server may send a report to the LCS Client. In this example, if the LCS Client is, or is in communication with, the manager of the store, the manager can call in additional employees to provide adequate service in the store. In another example, where the group consists of mobile devices belonging to members of a flight crew at an airport, the trigger condition may be mobile devices entering a certain target area that comprises a gate area for a departing flight and the group condition may specify all members of the group. In this example, the location server may send a report to an LCS Client (e.g. an airport operator) only after all members of the flight crew have entered the gate area for the departing flight.

The trigger condition (e.g. as included in an MLP TLRR message) may include a character string description of the circumstance(s) to be monitored, and the group condition may comprise a character string indication of a threshold type, a value type, and a value for a number or fraction of mobile devices defining the group size for the trigger condition. The threshold type may be indicated by a character string that can be set to one of the values "all", "minimum" or "maximum" where "all" indicates that all mobile devices in the group must satisfy the trigger condition, "minimum" indicates that some minimum number or fraction of mobile devices must satisfy the trigger condition and "maximum: indicates that no more than some maximum number or maximum fraction of mobile devices in the group must satisfy the trigger condition. The default threshold type may be "all." The group condition may further include a character string description of a value type for the threshold type. For example, the value type may be "absolute" for an absolute number of mobile devices (e.g., five), or may be "relative" for a relative quantity such as a percentage of a total number of mobile devices in the defined group (i.e., the target devices). The default value type may be "absolute," and the value type information may only be used (e.g., only supplied or only analyzed) if the threshold type is not "all." Thus, a trigger scenario may include a trigger condition description and a threshold quantity, e.g., comprising a threshold type indication of whether the threshold quantity is all mobile devices, a minimum number or fraction, or a maximum number or fraction, and a value type indication of whether the threshold quantity is an absolute number or a relative amount. If the threshold quantity is an absolute number, then the group condition will include the absolute number (at least if the threshold type is not "all"), and if the threshold quantity is a relative amount, then the group condition will include an indication of the relative amount (at least if the threshold type is not "all"), e.g., a percentage of the total number of mobile devices in the group.

The location server is configured to determine when the trigger scenario is met and respond to the trigger scenario being met by providing an indication of the trigger scenario being met to the LCS Client. The location server determines whether the described trigger scenario has been met for the prescribed group condition, e.g., threshold quantity. If the trigger scenario has been satisfied, then the location server provides an indication to this effect, e.g., in a response to the LCS client. The indication may be provided by the location server to the LCS client (and/or one or more of the mobile devices) in the MLP TLREP message. The indication in the TLREP may indicate the trigger condition that was met (or may reference the initial LCS Client Request as in step 601 in FIG. 6) and may identify the mobile devices within the group that satisfy the trigger condition and/or may provide their current locations.

The following are examples of trigger scenarios, in particular trigger scenarios with single group conditions. Examples of group conditions of identified target devices include group conditions of all members of a flight crew of an outbound flight reaching a target area corresponding to a gate area of the flight, or a maximum relative quantity (e.g., percentage) of presently-working employees being in a back room of a place of business during business hours. An example of a group condition of unidentified target devices is a minimum absolute number of mobile devices in a target area in a store near where an attendant is supposed to be. In this case, users not carrying a locatable mobile device would be ignored so a venue operator might set the minimum number of detectable mobile devices to a low value, e.g., two or three, to account for the likely presence of undetectable users. Another example of a group condition with unidentified target devices is a minimum absolute number of target devices in a shopping mall or shopping mall store, with responses to the trigger scenario being satisfied being a request for additional shopping store staff and/or providing extra ventilation.

Figure 7:
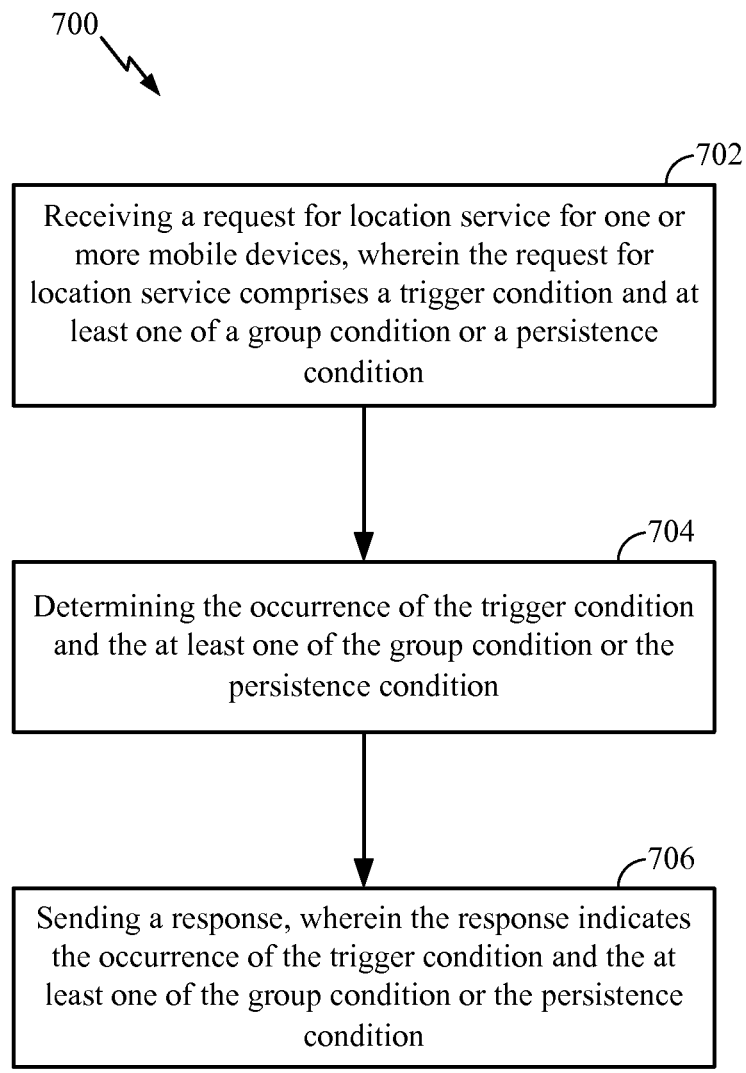
FIG. 7 is a block flow diagram of a process of providing location services at a location sever.

Referring to FIG. 7, with further reference to FIGS. 1-6, a process 700 of providing location services at a location sever includes the stages shown. The process 700 is, however, an example only and not limiting. The process 700 can be altered, e.g., by having stages added, removed, rearranged, combined, performed concurrently, and/or having single stages split into multiple stages.

At stage 702, the method 700 includes receiving a request for location service for one or more mobile devices, wherein the request for location service comprises a trigger condition and at least one of a group condition or a persistence condition. For example, the request for location service may be received by the location server from the LCS client over interface 220 in FIG. 1B in an MLP TLRR message sent as exemplified in step 601 in FIG. 6. Here, the request for location service includes a character string including the trigger condition and either, or both of, the group or the persistence condition. The request for location service may be for multiple mobile devices (e.g. a group of identified or unidentified mobile devices) and the trigger condition combined with the group condition may, for example, be a portion of the multiple mobile devices entering a target area, leaving the target area, remaining within the target area, or remaining outside the target area. The portion of the multiple mobile devices, as indicated by the group condition, may be a minimum quantity of the mobile devices, a maximum quantity of the mobile devices, or all of the mobile devices. The minimum quantity or the maximum quantity, whichever is used as the portion of the multiple mobile devices, may be an integer or a percentage of the multiple mobile devices (or a percentage of some other reference amount). The persistence condition is a minimum time period for continuous persistence of the trigger condition, with "continuous" being discussed above.

At stage 704, the method 700 includes determining the occurrence of the trigger condition and the at least one of the group condition or the persistence condition. The location server monitors the location of each of the one or more mobile devices to determine whether the trigger condition is met, and met by the mobile devices specified in the group condition and/or met for a duration at least as long as specified by the persistence condition.

At stage 706, the method 700 includes sending a response, wherein the response indicates (explicitly or implicitly) the occurrence of the trigger condition and the at least one of the group condition or the persistence condition. The response may or may not contain an explicit indication of the occurrence of the trigger condition and the at least one of the group condition or the persistence condition. In the case that the response does not contain an explicit indication, the occurrence may be implied due to an association of the response with the request received at stage 702 (e.g. an association defined for the OMA MLP protocol). Having determined the occurrence of the trigger condition and either, or both of, the group condition or the persistence condition, the location server sends a response indicating this. For example, the location server sends the response in an MLP TLREP message over interface 220 in FIG. 1B to the LCS client as in exemplified step 603 or step 604 of FIG. 6. The response sent by the location server may include an identity and/or a geographic location for at least one mobile device of the one or more mobile devices indicated in the request for location service.

Figure 8:
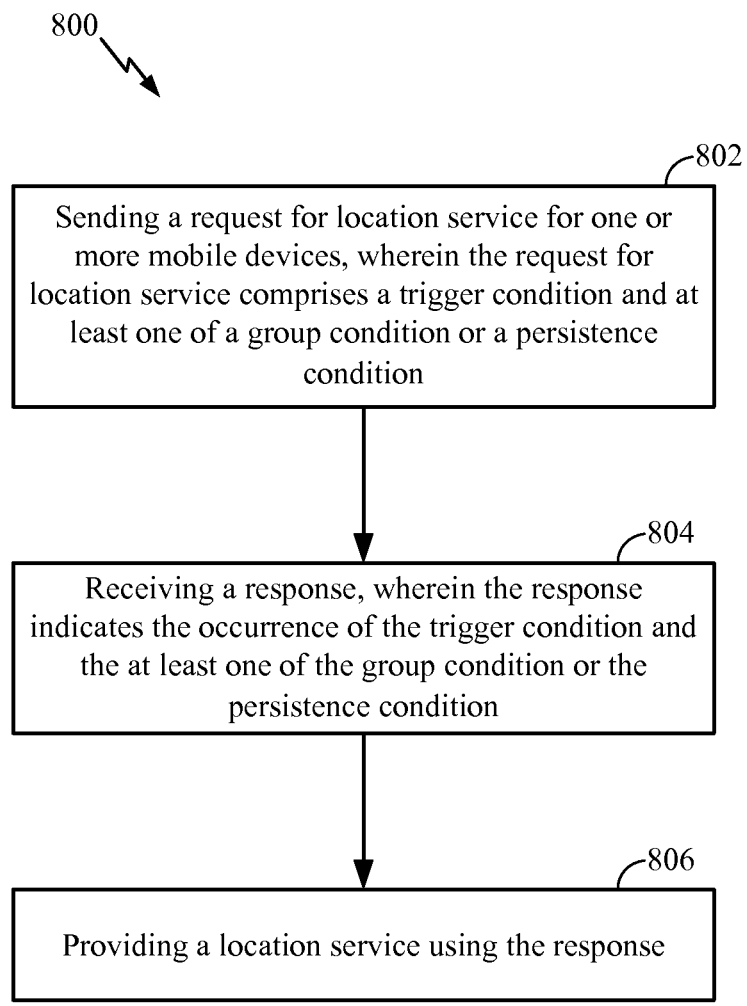
FIG. 8 is a block flow diagram of a process of providing location services at a location services client.

Referring to FIG. 8, with further reference to FIGS. 1-7, a process 800 of providing location services at a location services client includes the stages shown. The process 800 is, however, an example only and not limiting. The process 800 can be altered, e.g., by having stages added, removed, rearranged, combined, performed concurrently, and/or having single stages split into multiple stages. The method 800 is similar to the method 700, but from the LCS client perspective.

At stage 802, the method 800 includes sending a request for location service for one or more mobile devices, wherein the request for location service comprises a trigger condition and at least one of a group condition or a persistence condition. For example, the LCS client may send a request for location service to the location server over interface 220 (see FIG. 1B) in an MLP TLRR message as exemplified in step 601 of FIG. 6.

At stage 804, the method 800 includes receiving a response, wherein the response indicates (explicitly or implicitly) the occurrence of the trigger condition and the at least one of the group condition or the persistence condition. The response may or may not contain an explicit indication of the occurrence of the trigger condition and the at least one of the group condition or the persistence condition. In the case that the response does not contain an explicit indication, the occurrence may be implied due to an association of the response with the request sent at stage 802 (e.g. an association defined for the OMA MLP protocol). For example, the LCS client receives the response in an MLP TLREP message over interface 220 (see FIG. 1B) from the location server as exemplified in step 603 and step 604 of FIG. 6.

At stage 806, the method 800 includes providing a location service using the response. For example, the LCS client may provide an audible and/or visual notice, such as an alarm, indicative of the trigger condition and the group condition and/or the persistence condition being met to a user through a user interface. In the case that the LCS Client is an LBS AS (e.g. LBS AS 212 in FIG. 1B), the LCS Client may notify the operator or owner of a venue in which location services are provided and/or record information concerning the occurrence of the trigger condition for later use (e.g. in analysis of visitor behavior at a venue).

Venue-Specific Identification

Venue-Specific Location Identification and/or Target Area Identification

Referring to FIGS. 1-6, the location server and LCS client may be further configured to allow a location and/or a target area (e.g., an area of interest for a trigger condition, an area to be used for location reporting, etc.) to be identified (specified) using a venue-specific identification (label), e.g., a venue name, a venue identity (ID), and/or a venue-specific civic location description. Venue-specific location identifications or venue-specific target area identifications may be provided by an LCS client (e.g. instead pf providing geographic or civic location identifications and target area identifications) when requesting some location service from a location server—for example, may be included by an LCS Client in an MLP SLIR message (e.g. as exemplified in step 401 of FIG. 4) or in an MLP TLRR message (e.g. as exemplified in step 601 of FIG. 6). Further, a location server may provide a venue specific location instead of a geographic or civic location when providing a location estimate for a target device or a set of location estimates for a set of target devices to an LCS Client—for example in a response to a request for location services from the LCS Client such an MLP SLIA or SLIREP message (e.g. as in steps 402, 403 and 404 of FIG. 4) or an MLP TLRA or TLREP message (e.g. as in steps 602, 603 and 604 of FIG. 6). The location server may store and/or may have access to, a mapping of the venue-specific location identifications to associated locations and target areas. An owner or operator of location services for one or more venues (e.g., comprising buildings, outdoor areas, combinations of buildings and outdoor areas such as shopping malls) may have a venue-specific, non-universal (e.g., proprietary) format (or formats) for specifying locations and/or target areas within (or possibly outside of) the venue(s). Venue-specific location identifications may be associated with a particular venue (e.g., unique within the venue although perhaps not unique globally) or group of venues and may use some formal and possibly simple syntax. For example, a venue may have a unique format (or formats) for specifying a location and/or a target area (such as "complex name A, store name B," or a coded identifier for a store location (e.g., "building W, floor X, suite Y"; or "floor X, suite Y", etc.)). Point locations, locations comprising an area or volume (e.g. containing a probable location of a mobile device with an area or volume of uncertainty) and/or target areas (e.g., rooms, halls, stores, lobbies, waiting areas, regions (e.g., area outside of a store, area adjacent to a cash register, etc.)) may be given venue-specific names that are unique for a particular venue, though possibly not universally unique. Venue-specific location and/or target area names may also appear on floor plans or building plans or on maps for a venue, thereby providing association with particular locations in a venue.

Venue-specific location related labels may provide specificity that is not available from standard civic location designations or by using geographic location descriptions (e.g. geographic coordinates). Existing standards for civic location definition are normally intended to apply in a global context and are focused on narrowing down a location to a small area by specifying a succession of, mainly, outdoor-related location areas of successively diminishing size (e.g., country, state, city, street name, street address, building name). In the context of a given venue, outdoor-related designations may be unnecessary or even unhelpful, whereas venue-specific designations may be used that may or may not be standardized. For example, a venue-specific label may be: (i) an operating room or ward designation in a hospital; or (ii) a cubicle, printer or fax machine designation in an office complex; or (iii) a shop name, cash register, display area or product line designation in a shopping mall.

By allowing venue specific locations and venue specific target areas in messages sent by an LCS Client to a location server that request some location service and/or in messages sent by a location server to an LCS Client to provide one or more location estimates for one or more target devices, the support of location services may be simplified. For example, an LCS Client may be associated with a certain store in a shopping mall and wish to be informed whenever a preferred customer (e.g. a customer who has a credit card issued by the store) has entered the store. The LCS Client may send a location request to a location server (e.g. may send an MLP TLRR message as in step 601 of FIG. 6) and may specify triggered location reporting for a group of target devices, comprising devices belonging to the preferred customers for the store, and may further specify triggered reporting whenever one of these devices enters a certain target area comprising the whole store or part of the store. It may be difficult to specify the store or the part of the store using conventional geographic area descriptions or via a civic location description—e.g. because the description may be long, complex and/or imprecise. However, it may be easy to provide a venue specific description of the target area—e.g. as "store XYZ" or "store XYZ, floor 2" or "store XYZ, north entrance". The location server may then detect and monitor target devices belonging to the preferred customers who are in or nearby to the venue (e.g. which may be the entire shopping mall containing the particular store in this example) and report to the LCS Client whenever one of these target devices enters the indicated target area. The location server may in addition provide the identification of any target device that enters the target location to the LCS Client and provide its current location. Although the location might be expressed geographically (e.g. using longitude, latitude and altitude) or in a civic form (e.g. by using a postal address and building designation), it may be simpler and more precise to provide a venue specific location. Thus, in this example, there may be several entrances to the store and the location server may provide the specific entrance to the store used by a preferred customer when the target device of the preferred customer is detected to enter the store—e.g. may indicate "store XYZ west entrance" or "store XYZ, merchandise pickup entrance" when sending a response or report to the LCS Client—e.g. as in an MLP SLIA or SLIREP message as in FIG. 4 steps 402-404 or in an MLP TLIA or TLIREP message as in FIG. 6 steps 602-604. Should the target area be instead a portion of the store (e.g. second floor of the store), the location of the target device reported by the location server may refer to some specific location within the store—e.g. "store XYZ, floor 2 elevator" or "store XYZ floor 2 escalator".

To support civic location descriptions for a venue environment, the location server and the LCS client may be configured to provide and receive standard civic identifications or venue-specific identifications, with a venue-specific identification containing venue-specific information only or being a hybrid identification that is a combination of (i.e., comprises) a standard civic identification portion and a venue-specific portion. Civic location descriptions in a venue environment may facilitate precise specification of different locations and target areas that are significant for a particular venue and that have global significance. For example, while a venue specific description of a target area or a location may be meaningful within the context of a known venue, the venue specific identification may not be meaningful or unique in the absence of a context for a known venue. Thus, for example, if an LCS Client or a location server needs to specify a venue specific target area or location to an entity that that may not be aware of the venue specific location format and rules or that may not be aware of which venue a target area or location may refer to, a hybrid form may be used comprising a globally unique civic description of a target area or location plus a venue specific portion that may narrow down the location or target area specified by the civic description. As an example in the case of a store in a certain shopping mall, a target area or location might be specified by defining the country, state, city and shopping mall using a standard civic location description and then specifying a store and a part of the store using a venue specific location description—e.g. as in "County A, state B, city C, shopping mall D" for a global civic location plus "store X, cosmetics section" for the venue specific part.

A venue-specific identification (or label) for a location or target area may comprise a character string containing a venue name, a venue ID, and/or a venue-specific name. For example, a venue-specific identification may be "Fashion Valley San Diego, SM123, The Apple Store", with "Fashion Valley San Diego" being the venue name, "SM123" being the venue ID, and "The Apple Store" being the venue-specific name, in this example the name of a store in the Fashion Valley shopping mall. The venue-specific identification may be part of a bigger identification, e.g., a civic location identification, that includes standard, non-venue-specific, labeling. An example of such a bigger identification, using the example venue-specific identification above, could be "USA, California, San Diego County, San Diego, Fashion Valley, SM123, The Apple Store". Further, a civic location type that is part of a civic location identification may be specified as "venue name," "venue ID," or "venue-specific name" to allow inclusion of venue specific location descriptions within a civic location description in a standardized form and to indicate which type of information (in this case venue specific) is provided in a civic location element of a message.

Venue-Specific Target Device Identification

A location server and an LCS client may be configured to identify mobile devices with one or more venue-specific names as part of one or more venue-specific identifications. Venue-specific names may be used to identify one or more mobile devices and may be associated with a particular venue (e.g., unique within the venue although perhaps not unique globally) or group of venues and may use a well-defined and possibly simple syntax. Venue-specific names may be assigned to mobile devices by the LCS client, e.g., when a user of a mobile device registers with the LCS client to receive location services inside one or more venues. Venue specific names may also be chosen by the user of a mobile device—e.g. when the user first registers for location service with a venue (e.g. with an LBS AS for the venue). In this case, the venue (e.g. an LBS AS) may provide the user with some guidelines or rules for choosing a venue specific name (e.g. such as containing between 6 and 12 alphanumeric characters) and may inform the user if a chosen name is already assigned to another user and allow the user in that case to choose a different name. The names may provide a convenient means to refer to particular mobile devices, e.g., may allow a venue operator to conveniently refer to users who may have some service subscription or service agreement with the venue. The names may be used to conceal and/or replace a global identity for a target mobile device and associated user. This may enable flexible naming of an individual mobile device (as well as a group of mobile devices). A venue-specific name may be used when other forms of identification (e.g., IMSI (international mobile subscriber identity), MAC (media access control) address, IMEI (international mobile equipment identity), SIP URI (session initiation protocol universal resource identifier)) are unavailable, e.g., to the LCS client. For example, the LCS client may request location information about a category of user even though the LCS client does not have a specific mobile device identifier for a particular mobile device, e.g., because this is not available to an application on the mobile device that is in communication with the LCS client. Further, a venue-specific name may be used when other forms of identification are not considered reliable, e.g., for a user that employs multiple mobile devices.

In an embodiment, venue specific names may provide a convenient way of referring to a group of mobile devices that share some common property. For example, even though one or more global identifications (e.g. IMSI, IMEI, MAC address) may be available for individual mobile devices, it may be easier to refer to an entire group using a single name that embodies the common property. Thus, for example, mobile devices belonging to a particular flight crew of an airline may be assigned a group name such as "flight crew ABC". Similarly, mobile devices belonging to sales people for new or used cars at one or more new or used car lots may be assigned a group name such as "car sales". In another example, mobile devices belonging to doctors specializing in treatment of trauma at a hospital may be assigned a group name such as "trauma care". Likewise, venue specific names for individual mobile devices may provide convenience when one or more global identifications are available for the mobile device. For example, while a location server may store or have access to a mapping between the one or more global identifications and the venue specific identification, an LCS Client such as an LBS AS may only or mainly use the venue specific identification—e.g. since only this identification may be used when communicating with the mobile device (such as on interface 218 in FIG. 1B).

A venue-specific name may be structured to enable application of the name to a group of target devices corresponding to a group of users, e.g., "Store X: all employees," or a particular target device corresponding to a particular user, e.g., "Store X: employee ABC." The structure of the venue-associated name may be venue-dependent, and thus a property of a naming convention of the particular venue. Thus, the structure of the venue-specific name may not be defined in a positioning related protocol such as OMA MLP, but may still be understandable by an LCS client and a location server by knowledge of a particular venue or set of venues to which a location related request or response (e.g. an MLP request or response) is associated.

An LCS client can produce and send requests to a location server using venue-specific names, and receive location information from the location server specifying one or more mobile devices using venue-specific names. For example, an LCS Client may send a location request to the location server identifying one or more mobile devices whose locations are required or for which some trigger condition needs to be detected. The one or more mobile devices may be identified using venue-specific names—e.g. by providing one venue-specific name for a group of mobile devices and/or by providing one venue-specific name for each individual mobile device. The location request may also or instead identify a target area for a trigger condition using a venue-specific name to identify the target area. After receiving the location request, the location server may determine locations of mobile devices, such as any mobile devices identified in the location request, and/or may determine whether any trigger condition provided in the location request has occurred. The location server may then provide location information to the LCS client indicating identities and/or locations of mobile devices using venue-specific names to identify the mobile devices and/or to identify the locations. The location server may receive a location-related request from the LCS client for one or more mobile devices where the mobile device(s) is(are) identified by venue-specific name(s). The location server may determine one or more individual mobile devices using the provided venue specific name(s). For example, the location server may be configured with a mapping between venue-specific names and global mobile device identifiers (or have access to such a mapping from some other source). This may also be used to resolve venue specific group names. As another example, a mobile device may provide its venue-specific name to the location server indirectly (e.g., to a WiFi access point in the access network which then forwards the name to the location server) or directly and together in either case with one or more other global identities (IDs) such as a WiFi MAC address or a wireless IMSI. Such provision of one or more global IDs together with venue specific names may enable a location server to establish and store a mapping between these IDs. In another embodiment, an LCS Client may discover one or more global IDs for a mobile device—e.g. which may be provided by a user when registering or subscribing for location service or may be accessible from a wireless network (e.g. network 130 in FIG. 1A) when a user contacts the LCS Client (e.g. makes a data connection or voice connection to the LCS Client) or when the LCS Client contacts the mobile device. The LCS Client may then agree to a venue specific name with the user of the mobile device or may simply assign a venue specific name and store this in association with the global ID(s) discovered at the same time. This stored association may also be made available to a location server to enable the location server to associate venue specific names with global IDs for mobile devices.

To support a venue specific name for a mobile device or a group of mobile devices in the case of the OMA MLP protocol, an MSID (mobile station identity) type may be extended to include a venue-ID. In this case, a venue-specific identity may be included in an MSID by identifying the type of MSID as a venue-ID. The venue specific ID may be a character string and may begin with a sequence of characters that identify a particular venue or set of venues. For example, a venue specific ID for a particular employee DEF of a store GHI in a shopping mall JKL may be given as "JKL: store GHI, employee DEF" where the first three characters (JKL) identify the venue (in this case the shopping mall). By including an identification for a particular venue in a venue specific name, a receiver of the name (e.g. an LCS Client or location server) can verify whether the name is for a known venue and thus whether the received name can be interpreted and used to identify a particular mobile device or group of mobile devices or whether the venue is not known and thus the name is referring to a mobile device or group of mobile devices that cannot be identified by the receiver. An MLP MSID that comprises a venue specific name may be included to identify a mobile device or a group of mobile devices in a location request sent by an LCS Client to a location server such as in an MLP SLIR message (e.g. as in step 401 of FIG. 4) or in an MLP TLRR message (e.g. as in step 601 of FIG. 6). Similarly, an MLP MSID that comprises a venue specific name may be included to identify a mobile device or a group of mobile devices in a location related response sent by a location server to an LCS Client such as in an MLP SLIA or SLIREP message (e.g. as in steps 402-404 of FIG. 4) or in an MLP TLRA or TLREP message (e.g. as in steps 602-604 of FIG. 6).

Figure 9:
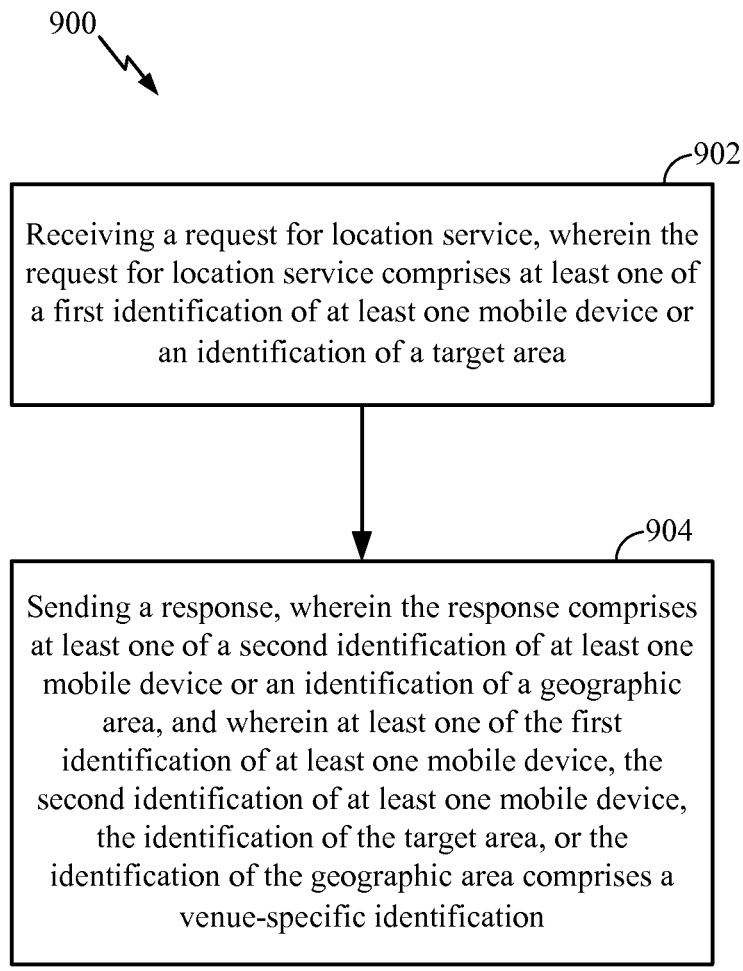
FIG. 9 is a block flow diagram of a process of providing location services, at a location server for a venue.

Referring to FIG. 9, with further reference to FIGS. 1-6, a method 900 of providing location services, at a location server for a venue (e.g. location server 206 in FIG. 1B), includes the stages shown. The method 900 is, however, an example only and not limiting. The method 900 can be altered, e.g., by having stages added, removed, rearranged, combined, performed concurrently, and/or having single stages split into multiple stages.

At stage 902, the method 900 includes receiving a request for location service, wherein the request for location service comprises at least one of a first identification of at least one mobile device or an identification of a target area. The location server receives the request for location service from an LCS client—e.g. over interface 220 in FIG. 1B in an MLP SLIR (see FIG. 4) or MLP TLRR (see FIG. 6), with the request identifying the at least one mobile device and/or a target area, as further discussed below and above.

At stage 904, the method 900 includes sending a response, wherein the response comprises at least one of a second identification of at least one mobile device or an identification of a geographic area, and wherein at least one of the first identification of at least one mobile device, the second identification of least one mobile device, the identification of the target area, or the identification of the geographic area comprises a venue-specific identification. The location server sends the response to the LCS Client—e.g., over interface 220 in FIG. 1B in an MLP SLIA or SLIREP (see FIG. 4) or an MLP TRLA or TLREP (see FIG. 6) to the LCS client. The first identification of at least one mobile device, the second identification of least one mobile device, the identification of the target area, and/or the identification of the geographic area includes a venue-specific identification, examples of which are discussed above. For example, the identification of the target area and/or the identification of the geographic area may include a civic location, and the civic location may include a venue-specific portion and a global portion. As another example, the first identification of at least one mobile device or the second identification of least one mobile device may comprise a venue-specific name, and the venue-specific name may identity an individual mobile device or a group of mobile devices.

In an embodiment for periodic reporting, the request received at stage 902 in method 900 may include a triggered or periodic condition such as a request for a periodic report at fixed intervals or a request for a triggered report whenever a particular mobile device or a group of mobile devices enter, leave, remain within or remain outside of a provided target area. In this embodiment, the sending of a response at stage 904 may be repeated—e.g. at fixed periodic intervals or whenever a particular triggering conditions is detected by the location server.

The method 900 may include other features. As an example of another feature, the method 900 may include sending an analytics report. For example, the location service requested at stage 902 may be an analytics report and the request may (i) indicate sending of the analytics report at a fixed periodic reporting interval or at a varying periodic reporting interval determined by the detection of certain triggering conditions and (ii) may provide a target area for the analytics report. In this case, the response sent at stage 904 may be the analytics report requested at stage 902 and may be repeated periodically as described above for the embodiment for periodic reporting The analytics report sent periodically at stage 904 may then include: (i) a starting number of mobile devices (e.g. equal to the number of mobile devices within the target area at the start of the preceding fixed or varying reporting interval); (ii) a number of entering mobile devices (e.g. equal to the number of mobile devices entering the target area during the preceding fixed or varying reporting interval); (iii) a number of leaving mobile devices (e.g. equal to the number of mobile devices leaving the target area during the preceding fixed or varying reporting interval); (iv) a mean number of mobile devices (e.g. equal to the mean number of mobile devices within the target area during the preceding fixed or varying reporting interval); (v) and/or a mean dwell time (e.g. equal to the mean time of a mobile device within the target area during the preceding fixed or varying reporting interval.

Figure 10:
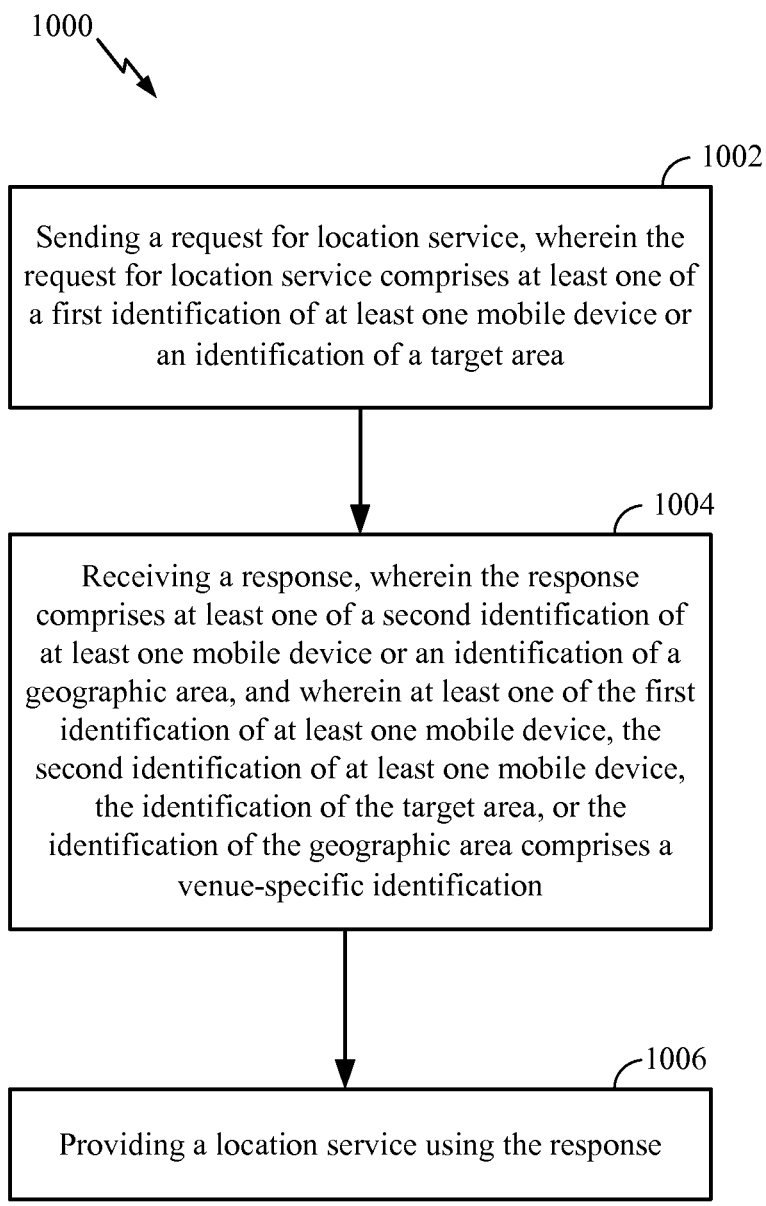
FIG. 10 is a block flow diagram of a process of providing location services at a location services client.

Referring to FIG. 10, with further reference to FIGS. 1-6 and 9, a method 1000 of providing location services at a location services (LCS) client includes the stages shown. The method 1000 is, however, an example only and not limiting. The method 1000 can be altered, e.g., by having stages added, removed, rearranged, combined, performed concurrently, and/or having single stages split into multiple stages. The method 1000 is similar to the method 900, but from the LCS client perspective.

At stage 1002, the method 1000 includes sending a request for location service, wherein the request for location service comprises at least one of a first identification of at least one mobile device or an identification of a target area. The LCS client sends a request for location service, e.g., over interface 220 shown in FIG. 1B in an MLP SLIR message (see FIG. 4) or MLP TLRR message (see FIG. 6) to the location server, with the request identifying at least one mobile device and/or a target area, as discussed above with respect to FIG. 9.

At stage 1004, the method 1000 includes receiving a response, wherein the response comprises at least one of a second identification of at least one mobile device or an identification of a geographic area, and wherein at least one of the first identification of at least one mobile device, the second identification of at least one mobile device, the identification of the target area, or the identification of the geographic area comprises a venue-specific identification. The LCS client receives a response, e.g., over interface 220 shown in FIG. 1B in an MLP SLIA or MLP SLIREP (see FIG. 4) or in an MLP TLRA or a MLP TLREP (see FIG. 6) from the location server, that comprises at least one of a second identification of at least one mobile device and an identification of a geographic area, as discussed above with respect to stage 904 of FIG. 9. The first identification of at least one mobile device, the second identification of at least one mobile device, the identification of the target area, and/or the identification of the geographic area includes a venue-specific identification, examples of which are discussed above.

At stage 1006, the method 1000 includes providing a location service using the response received at stage 1004. For example, the LCS client may provide an audible and/or visual notice of receiving the response to a user through a user interface and may include in the notification an identification of one or mobile devices (e.g. an identification corresponding to either the second identification of at least one mobile device included in the response received at stage 1004 or the first identification of at least one mobile device included in the request sent at stage 1002) and/or an identification of a geographic area (e.g. the identification of the geographic area included in the response received at stage 1004 or the identification of the target area included in the request sent at stage 1002) As with method 900, the method 1000 may include requesting periodic responses at stage 1002 and receiving a response at stage 1004 at fixed periodic intervals or at varying periodic intervals following detection of particular triggering conditions. Further, as also with method 900, the method 1000 may include requesting an analytics report at stage 1002 and receiving an analytics report at stage 1004 following fixed or varying periodic reporting intervals and containing the same information as described for method 900. Further, if an analytics report is received at stage 1004, the LCS Client may store the analytics report at stage 1006 and/or perform analysis of one or more received analytics reports and provide information to a user (e.g. provide information to the owner or operator of a shopping mall of the number of mobile devices that were detected to enter, stay within and leave a certain store in the shopping may over a period of a day or a week).

High Precision and Relative Location and/or Target Area

High-precision specification of geographic information, e.g., a location of a mobile device or a target area, may be very useful. High-precision location and/or target area description may be of particular use in an indoor environment where a small change in location may be significant, e.g., where a door, window, wall, display case, or other structure separates two significantly different areas from a user perspective. For example, a difference of less than a meter in a mobile device's location may determine whether the mobile device is inside or outside a target area (e.g., and thus whether a location-related service should or should not be provided to the mobile device), on which side of a wall or other barrier the mobile device presently is, etc. Typical precision of a location or a target area may be provided in terms of integer numbers of degrees, minutes and seconds of latitude and longitude (e.g. when location is expressed using the World Geodetic System 84 (WGS84)) and thereby have a precision of around 31 meters which may be too coarse to specify location accurately indoors. Location may also be provided in units of meters (e.g. when location is expressed using the Universal Transverse Mercator (UTM) system) with an accuracy of about one meter.

In order to improve the precision of a location, a fractional element may be added to latitude and longitude coordinates. For example, the fractional part may be a fraction of one second of latitude or one second of longitude and be expressed as a decimal fraction using a sequence of digits—e.g. "0.9154". The fractional element may instead be a fraction of one meter when location is expressed as an integer number of meters using UTM. The fractional part may also be a fraction of one meter in the case of an altitude coordinate that is expressed as an integer number of meters (e.g. above or below ground level or above or below the surface of the WGS84 ellipsoid). A fractional element may also be added when a relative location is provided (e.g. as described further below) using some reference point with a fixed known location where the relative location provides location relative to the reference point. In this case, location may be provided using an integer number of degrees, minutes and seconds for the differences of latitude and longitude between the reference location and the location being provided or may be provided as the differences in the UTM coordinates for the reference location and the location being provided as integer numbers of meters. In both cases, fractional elements may be added to the integer numbers to increase the precision and accuracy of the relative location.

An LCS client may be configured to request, receive, and process high-precision geographic information, and the location server may be configured to process a request for high-precision information, and/or to determine and provide high-precision geographic information. The LCS client may request high-precision geographic information, e.g., in an MLP SLIR or MLP TLIR message, and the location server may provide high-precision geographic information, e.g., in an MLP SLIA or SLIREP message or in an MLP TLRA or TLREP message. The high-precision geographic information may include integer and fractional portions of locations, e.g., fractional portions of coordinates such as fractional portions of meters of two-dimensional or three-dimensional locations, fractional portions of seconds in a degrees-minutes-seconds location, etc. For three-dimensional locations, x, y, and z coordinates may be provided with integer and fractional components of each of the x, y, and z coordinates. For target areas, the high-precision geographic information may be integer and fractional portions of parameters defining the target areas. For example, a high-precision target area may be specified by integer and fractional portions of locations defining a boundary of the target area (e.g., corresponding to vertexes of a polygon), integer and fractional portions of coordinates for a centers of a circle and/or integer and fractional portions of a radius for the circle, etc.

Locations may also be expressed relative to some reference point whose location may be fixed and known or possibly unknown as already mentioned herein. An LCS Client may request a location server to provide a geographic location as a relative location when requesting location services from the location server—e.g. using an MLP SLIR message as in FIG. 4 or using an MLP TLRR message as in FIG. 6. The LCS Client may then provide a reference point to the location server in the request and may include an identification for the reference point (e.g. a name which may be known to the location server and/or indicated on a floor plan or map) and/or may provide the location of the reference point (e.g. a civic location or a geographic location such as latitude, longitude and altitude). The location server may then provide a location to the LCS Client (e.g. the location of a mobile device) as a relative location that is expressed relative to the reference point provided to the location server. Alternatively, the location server may provide the relative location expressed relative to some other reference point—e.g. if the LCS Client did not provide a reference point to the location server—and may in that case provide an identification (e.g. an ID or a name) for the reference point and/or a location.

A reference point may be, e.g., a corner of a building or a corner of a floor of a building (e.g., the reference point may include an indication of the floor such as a floor number), or a known location of an object such as an access point, an information desk, or entry/exit door or some other identifiable location or small area. Relative location and/or relative target area description may be useful, for example, in an indoor environment where relative location can be more accurately determined (e.g., using building and floor plans and local measurement(s)) than absolute location (e.g., where absolute location determination is not possible or is not accurate). For example, a target area may be a rectangle measuring 20 meters by 30 meters centered 150 meters south and 23 meters east of a reference point corresponding to an information desk. As further examples, circular or elliptical areas may be specified in terms of their sizes and origins provided relative to a reference point. In many indoor areas (e.g. venues), locations may be accurately known relative to the indoor area (e.g. relative to a corner of a building or an entrance) but may not be accurately known using absolute coordinates (e.g. expressed using WGS84 or UTM coordinates) if the absolute locations of the indoor area and its constituent parts are not accurately known. For example, building plans, maps and floor plans may enable accurate determination of relative locations but obtaining accurate absolute locations may be difficult in the absence of precise surveying or use of GNSS location. Moreover, relative locations may be more useful and meaningful to an LCS Client and/or to a location server than absolute locations. Therefore, there may be a benefit to using relative location in such location related protocols as MLP.

The LCS client may request, such as in an MLP SLIR, an MLP ELIR (emergency location immediate request), or an MLP TLRR, that geographic information be specified using relative coordinates. The request for relative coordinates may be explicit, or may be implicit, e.g., by including a reference point in the request.

The location server may be configured to determine and provide the location of a mobile device relative to the reference point. The location server may determine the relative location of the mobile device using trilateration based on signals received and measured by one or more access points from the mobile device and/or from signals received and measured from multiple access points by the mobile device. The location server may provide the relative location in a response or report that may include the reference point or may not include the reference point (e.g., if the location server provides the location in response to a request that identified the reference point or the reference point is otherwise known by the recipient of the response or report from the location server, or is otherwise not needed). Relative coordinates may be expressed in a variety of formats, e.g., as a distance X (e.g., in an East-West direction, or per a specified coordinate system relative to a structure), a distance Y (e.g., in a North-South direction, or per the specified coordinate system), and a distance Z (e.g., in a vertical direction). If an SLIR, ELIR, or TLRR includes a reference point, then the location server may preferably provide locations relative to the reference point, buy may provide locations in absolute coordinates.

Example Message Communication Flows

Exemplary message communication flows are now described referring to FIGS. 11, 12, 13, 14, 15A, 15B, 15C, 15D and 16A that show interactions between or among elements in the architectures described above with reference to FIGS. 1A, and 1B that support different types of location-related services in a venue or other indoor environment in a manner similar to that previously described and/or in a manner that extends and improves the location services previously described. Elements in FIGS. 11, 12, 13, 14, 15A, 15B, 15C, 15D and 16A are shown as corresponding to elements in the architecture 200 of FIG. 1B via the use of like element numbers. Hence FIGS. 11, 12, 13, 14, 15A, 15B, 15C, 15D and 16A may directly represent message interactions between elements in FIG. 1B. However, using the correspondence of elements shown in Table 1, FIGS. 11, 12, 13, 14, 15A, 15B, 15C, 15D and 16A may also represent message interactions between elements in FIG. 1A. Interfaces (or communication links) in FIGS. 11, 12, 13, 14, 15A, 15B, 15C, 15D and 16A are indicated by the abbreviation "i/f" and mobile device (or MS) 204 is shown as comprising a location engine and modem functional component (LE/M) and an application (App) that may in some implementations be the true endpoints of certain interfaces supported by mobile device (or MS) 204. The sequence of events shown in and described for FIGS. 11, 12, 13, 14, 15A, 15B, 15C, 15D and 16A may occur in the order shown and described or may occur in some other order in some implementations. In addition, some events may occur concurrently in which case some events may start before other events and finish during or after these other events. Messages such as configuration messages and location reports that are transferred between LBS AS 212 and LS 206 as discussed below (e.g., see FIGS. 11-14, 15A-15D, 16B-16M), may include (i) venue-specific identifications as discussed above in order to identify a particular mobile device, a group of mobile devices, a location, a geographic area or target area and/or (ii) persistence conditions and/or group conditions as discussed above in the case of messages that relate to triggered reporting. Further, MLP TLRR, TLRA, and/or TLREP messages discussed below (see FIG. 16A) may include one more trigger conditions, persistence conditions, and/or group conditions as discussed above. Thus, while the message flows in FIGS. 11-14, 15A-15D and 16B-16M are described below in a generic manner, they may each provide specific examples of the usage of venue specific identifications and persistence and group conditions as described previously herein.

Figure 11:
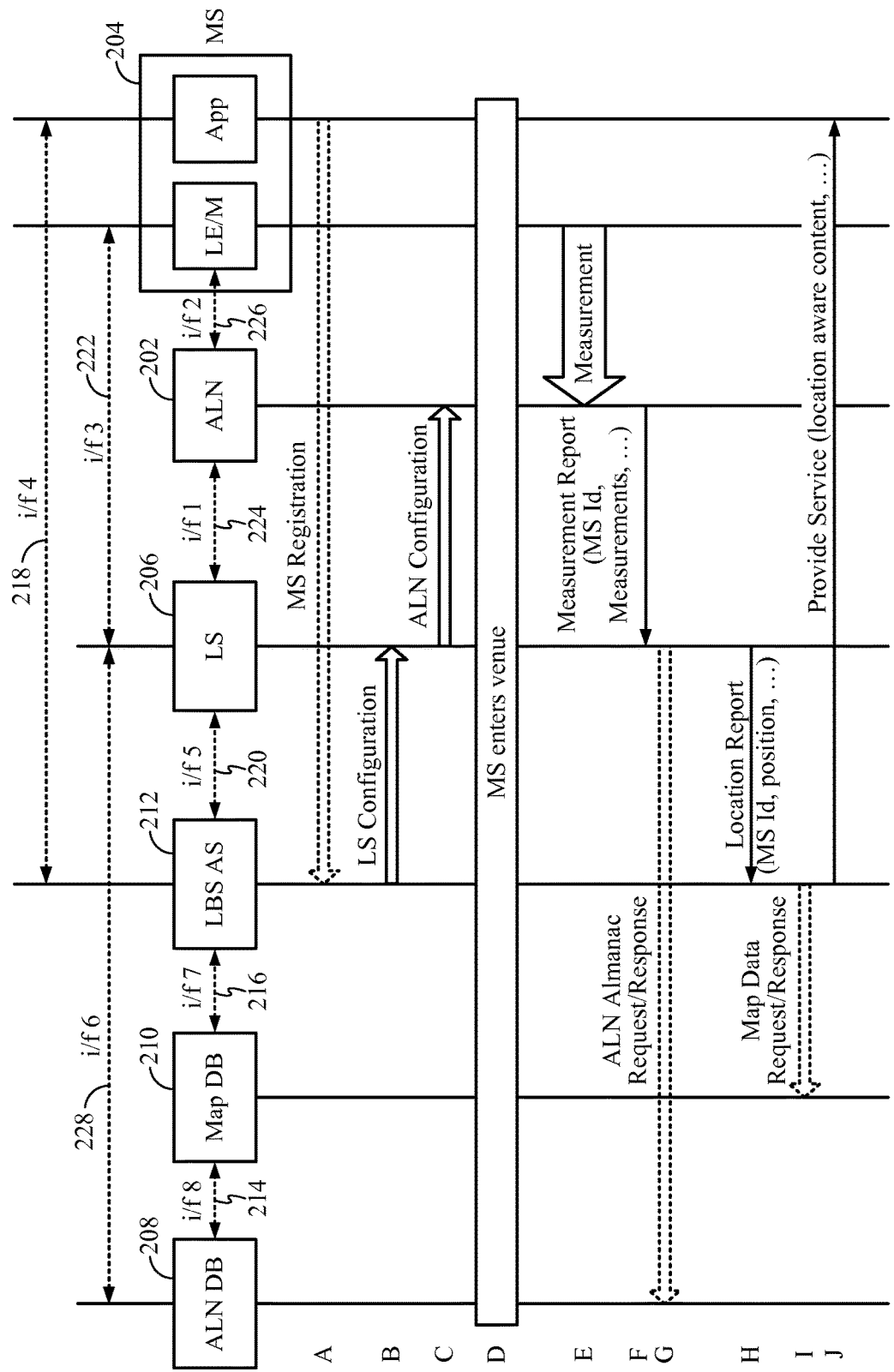
FIG. 11 is a message flow diagram identifying events in connection with providing location aware content to a mobile device in a venue.

FIG. 11 is a message flow diagram exemplifying network-centric positioning according to an embodiment and may exemplify aspects of location support in architecture 200 in FIG. 1B. In one implementation, the message flow in FIG. 11 may be executed by a location server (e.g. LS 206) in communication with other entities such as one or more mobile devices (e.g. mobile device 204), an LBS AS (e.g. LBS AS 212), and/or elements of an ALN (e.g. ALN 202). In FIG. 11, at event A, an application (App) on mobile device 204 may register with LBS AS 212 to provide the LBS AS 212 with information to return location-aware content, for example, whenever mobile device 204 is inside a venue supported by LBS AS 212. Such location-aware content may include, for example, information about locally available goods and services, data about objects in the local environment, such as museum exhibits, or local routing information. Such information may include, for example, a unique identifier or address for the mobile device 204. At event B, the LBS AS 212 may transmit one or more messages to LS 206 to configure the LS 206 for detecting and locating mobile devices (including mobile device 204) that enter a venue. The message or messages sent at event B may correspond to the request for location service sent at stage 802 for the method 800 in FIG. 8 or the request for location service sent at stage 1002 for the method 1000 in FIG. 10. At event C, the LS 206 may configure ALN 202 for detecting mobile devices and performing measurements that may assist the LS 206 in detecting and estimating locations of mobile devices entering the venue. In one implementation, LS 206 may transmit one or more messages to one or more elements of an ALN 202 to configure the ALN 202 to obtain measurements in connection with mobile devices entering a venue. In some implementations, event A may occur after events B and C.

In particular implementations, nodes (e.g. APs, femto cells) in ALN 202 may be used to provide access services to mobile devices (e.g., data and voice communication services) in addition to obtaining measurements for positioning operations. In one embodiment, LS 206 may transmit messages at event C to configure ALN 202 to obtain location measurements so as to reduce or avoid any degradation in a quality of access services provided to mobile devices. For example, a message transmitted at event C to a node in ALN 202 may configure the node to operate on a different frequency channel to obtain measurements of signals transmitted by a particular mobile device or type of mobile device, and then return to a normal channel of operation to resume providing access services to other mobile devices.

Following configuration of the ALN 202, at event D, mobile device 204 may enter the venue. At event E, the configured ALN 202 may detect a presence of the mobile device 204 in the venue (e.g., by detecting radio signals transmitted by mobile device 204 as part of normal mobile device 204 operation to either secure communications access from ALN 202 or request information from ALN 202 relevant to obtaining communications access) and may collect measurements in connection with the mobile device 204. Such measurements may include, for example, but are not necessarily limited to, the aforementioned measurements of RTT, RSSI and angles of arrival or departure. After obtaining measurements, at event F ALN 202 may transmit a Measurement Report to LS 206. The received Measurement Report may contain identifiers of the mobile devices (e.g. mobile device 204) detected by ALN 202 and associated measurements. After receiving the measurements in event F, LS 206 may request and obtain ALN 202 Almanac data from ALN DB 208 at event G in order to calculate the position of the mobile devices (e.g., mobile device 204). Event G may be optional and may only be performed if the LS 206 requires ALN Almanac data but does not yet have this data. If event G is performed, the LS 206 may cache received data for later use and thereby not need to perform event G if the message flow in FIG. 11 is performed at a later time. The ALN DB 208 may in turn obtain Map Data from Map DB 210 in order to provide the LS 206 with the Almanac Data (e.g. if the almanac data provides locations of APs and/or femto cells in ALN 202 relative to a venue map and possibly further provides AP and/or femto cell signal strength values relative to a venue map). In this case the ALN DB 208 requests (and obtains) the Map Data from the Map DB 208 (not shown in FIG. 11). At event H, the LS 206 may compute estimated locations of the mobile devices (e.g., mobile device 204) entering the venue based, at least in part, on measurements contained in the received measurement report in event F and any ALN 202 almanac data obtained at event G or previously available to LS 206. Further at event H, the LS may transmit a report to the LBS AS 212 comprising computed estimated locations of mobile devices (e.g., mobile device 204) that have entered the venue for use in delivering location-aware content to the mobile devices. The report sent at event H may correspond to the response sent at stage 706 for the method 700 in FIG. 7 (e.g. as a consequence of LS 206 determining a trigger condition according to stage 704 of method 700) or the response sent at stage 904 for the method 900 in FIG. 9. The LBS AS 212 may then deliver location-aware content to located mobile devices in the venue (e.g. mobile device 204) at event J. Depending on the type of location-aware content to be provided to an application on mobile device 204, the LBS AS 212 may obtain Map Data. Here, at event I, the LBS AS 212 may request (and obtain) Map Data from the Map DB 210.

Figure 12:
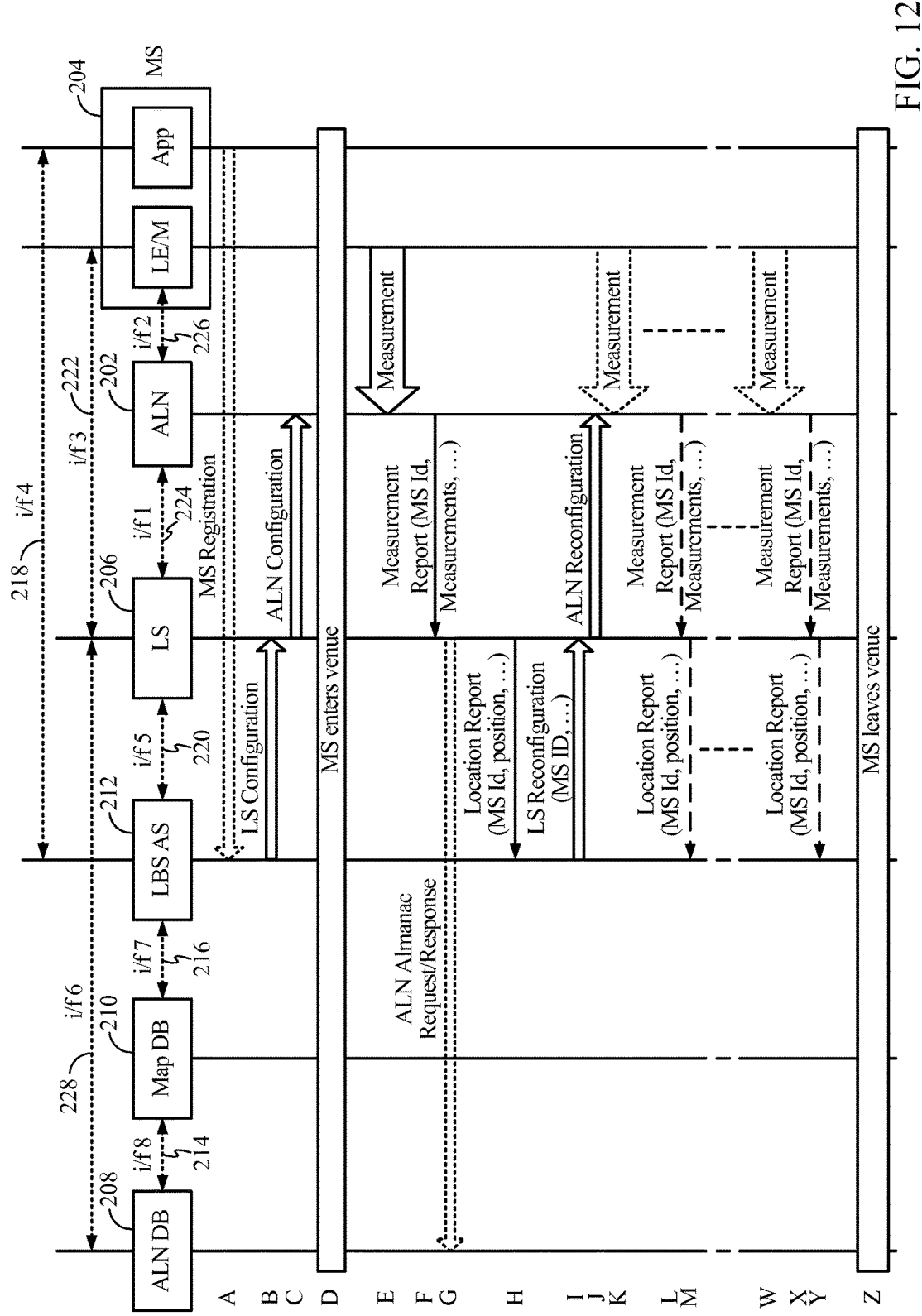
FIG. 12 is a message flow diagram identifying events in connection with collecting visitor analytics for a venue.

FIG. 12 is a message flow diagram exemplifying network-centric positioning for the collection of venue visitor analytics data according to an embodiment. Data collected may include, for example, visitor density over time throughout the venue, paths traversed through the venue, presence or collocation of uniquely identifiable visitors, visitor dwell times at specific locations in the venue, and the number of visitors within or nearby to a particular location or area. At event A, an application on mobile device 204 may register with LBS AS 212 (e.g. prior to entering a venue or after entering a venue) to provide the LBS AS 212 with parameters enabling the LBS AS 212 to return location-aware content, for example. Such parameters may include, for example, a unique identifier or address for the mobile device (e.g., a MAC address and/or IMSI and/or an identification of the mobile device user). Event A may be optional and may only be performed if the LBS AS 212 relies on information in advance for mobile device 204 such as the identity of mobile device 204. At event B, the LBS AS 212 may transmit one or more messages to LS 206 to configure the LS 206 for detecting and locating mobile devices (such as mobile device 204) that enter a venue. The message or messages sent at event B may correspond to the request for location service sent at stage 802 for the method 800 in FIG. 8 or the request for location service sent at stage 1002 for the method 1000 in FIG. 10. At event C, the LS 206 may configure an ALN 202 for detecting mobile devices and performing measurements that may assist the LS 206 in detecting and estimating locations of mobile devices entering the venue. In one implementation, LS 206 may transmit one or more messages to one or more elements (e.g., APs and/or femto cells) of ALN 202 to configure ALN 202 to obtain measurements in connection with mobile devices entering a venue. In some implementations, event A may occur after events B and C.

Following configuration of ALN 202, at event D, a mobile device 204 may enter the venue. At event E, the configured ALN 202 may detect a presence of the mobile device 204 in the venue (e.g., from receipt of radio signals transmitted by mobile device 204) and may collect measurements in connection with the mobile device 204. Such measurements may include, for example, the aforementioned measurements of RTT, RSSI and angles of arrival or departure. After obtaining measurements, at event F the ALN 202 may transmit a Measurement Report to the LS 206. The received Measurement Report may contain identifiers of the mobile devices (e.g., mobile device 204) detected by ALN 202 and associated measurements. After receiving the measurements in event F, the LS 206 may request and obtain ALN 202 Almanac data from the ALN DB 208 at event G in order to calculate the position of the mobile devices (e.g. mobile device 204). Event G may be optional and may only be performed if the LS 206 requires ALN Almanac data but does not yet have this data. If event G is performed, the LS 206 may cache the received data for later use and thereby not need to perform event G if the message flow in FIG. 12 is performed at a later time. The ALN DB 208 may in turn obtain Map Data from Map DB 210 in order to provide the LS 206 with the Almanac Data (e.g., if the almanac data contains locations of APs and/or femto cells in ALN 202 relative to a venue map and possibly further provides AP and/or femto cell signal strength values relative to a venue map). In this case the ALN DB 208 requests (and obtains) the Map Data from the Map DB 208 (not shown in FIG. 12). At event H, LS 206 may compute estimated locations of the mobile devices (e.g., mobile device 204) entering the venue based, at least in part, on measurements contained in the received measurement report in event F and any ALN 202 almanac data obtained at event G or previously available to LS 206. Further at event H, LS 206 may transmit a report to LBS AS 212 comprising computed estimated locations of mobile devices (e.g., mobile device 204) that have entered the venue for use in collecting or maintaining analytics data at LBS AS 212 in connection with visitors to the venue. The report sent at event H may correspond to the response sent at stage 706 for the method 700 in FIG. 7 (e.g. as a consequence of LS 206 determining a trigger condition according to stage 704 of method 700) or the response sent at stage 904 for the method 900 in FIG. 9.

With knowledge of identifier(s) of mobile device(s) having entered the venue obtained at event H, LBS AS 212 may transmit a message to the LS 206 at event I to configure the LS 206 for obtaining periodic updates to the estimated locations of the mobile devices (e.g., mobile device 204). The message sent at event I may correspond to the request for location service sent at stage 802 for the method 800 in FIG. 8 or the request for location service sent at stage 1002 for the method 1000 in FIG. 10. In response, the LS 206 at event J may transmit one or more messages to the ALN 202 as part of a procedure to configure the ALN 202 to obtain periodic measurements in connection with the mobile devices (e.g. mobile device 204) having entered the venue. Events K, L, M and events W, X, Y exemplify one or more repetitions of events E, F, H whereby ALN 202 makes further location-related measurements of mobile devices that have entered the venue (e.g., mobile device 204), and provides the measurements to LS 206. LS 206 may then compute locations for the mobile devices using this information and provide the computed locations, and possibly the mobile identities, to LBS AS 212 to enable LBS AS 212 to gather further analytics data. Events corresponding to event G may also be performed if LS 206 employs ALN 202 almanac data to help compute mobile device locations.

Figure 13:
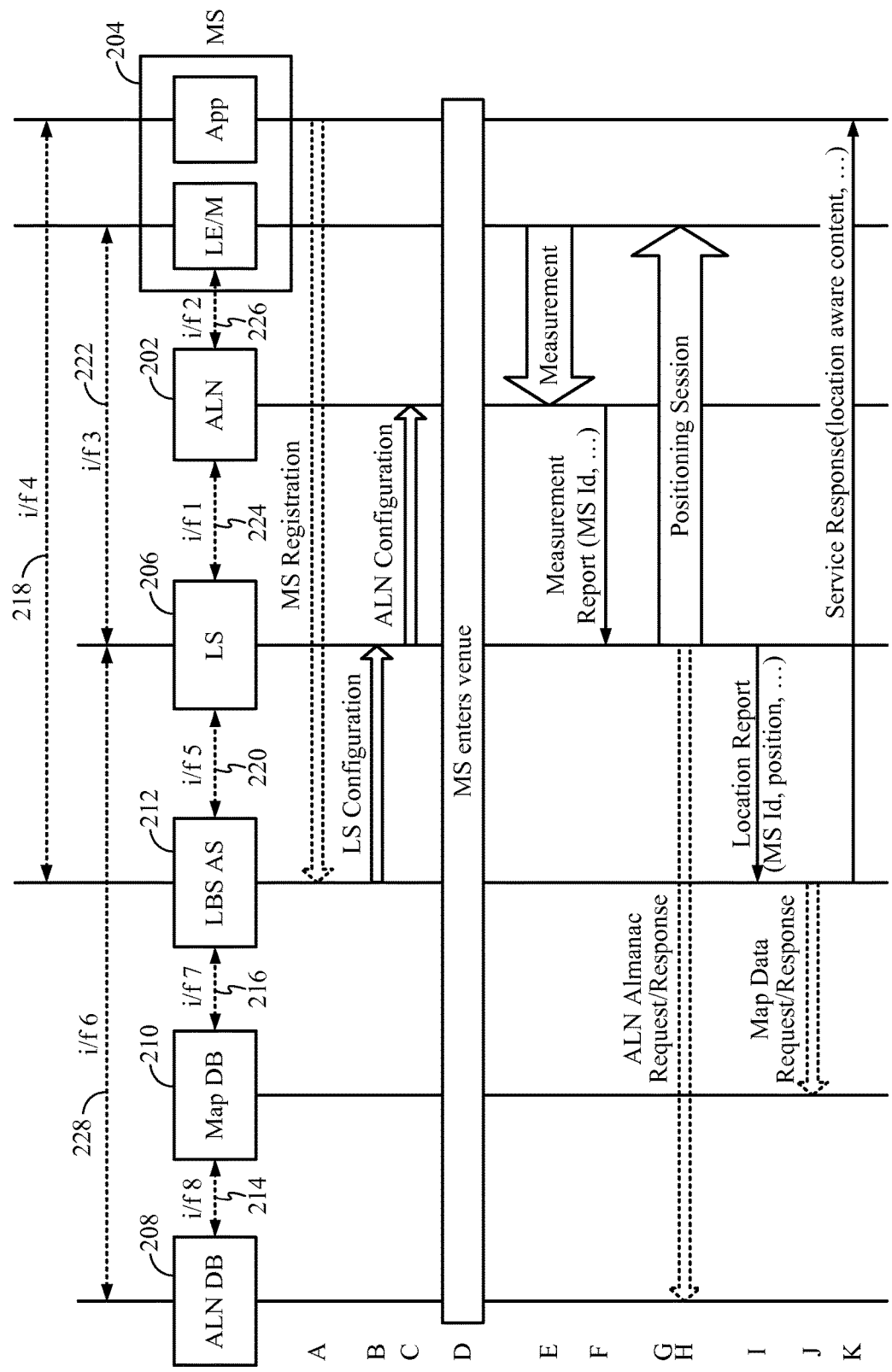
FIG. 13 is a message flow diagram identifying events in connection with an example process for network initiated positioning.

FIG. 13 is a message flow diagram that exemplifies network-initiated, mobile-centric positioning for the delivery of location aware content to mobile devices in a venue. Here, events A through F may occur as described above for events A through F in the particular implementation of FIG. 11 and/or of FIG. 12. Thus at event F, the LS 206 may receive one or more reports from the configured ALN 202 comprising at least one or more identifiers of one or more corresponding mobile devices (e.g., mobile device 204) that have entered the venue.

With knowledge of an identifier (e.g. an IP address and/or a MAC address) of a mobile device 204 having entered the venue, LS 206 may transmit one or more messages to the mobile device 204 (e.g. using the identifier to send and route the messages to mobile device 204 possibly via ALN 202) to invoke a positioning session with the mobile device's location engine at event G. The positioning session may be a SUPL session or a location session defined according to some other location solution such as a solution defined by IETF, 3GPP or 3GPP2. In the course of the positioning session, the mobile device 204 may obtain location measurements that may be used in computing an estimated location of the mobile device (e.g., measurements of acquired SPS signals, RTT or RSSI for signals received from APs and/or femto cells in ALN 202). In one implementation of a positioning session, a location engine on the mobile device may compute an estimate of the location of the mobile device based, at least in part, on the obtained measurements. The mobile device may then transmit the estimated location to the LS 206. In an alternative implementation of a positioning session, the mobile device may transmit location measurements collected at the mobile device 204 to the LS 206 so that the LS 206 may compute the estimated location of the mobile device 204. At event I, the LS 206 may transmit a report to an LBS AS 212 comprising an identifier of the mobile device and the computed estimate of the mobile device's location for use in delivery of location-aware content to the mobile device. The report sent at event I may correspond to the response sent at stage 706 for the method 700 in FIG. 7 (e.g. as a consequence of LS 206 determining a trigger condition according to stage 704 of method 700) or the response sent at stage 904 for the method 900 in FIG. 9.

Optionally, at event H, in the course of a positioning session at event G with mobile device 204, LS 206 may request ALN Almanac data from the ALN DB 208 in order to (i) assist the LS 206 in calculating an estimated location of mobile device 204 (e.g., if mobile device 204 had provided location measurements of ALN 202 to LS 206 during event G) and/or (ii) provide ALN-related data such as almanac data to mobile device 204 to assist measurements of ALN 202 and possibly to assist estimating the mobile device location from these measurements. In one implementation, the ALN DB 208 may request and obtain Map Data from the Map DB 210 in order to provide the LS with the ALN Almanac Data.

Depending on a type of location-aware content to be provided to an application hosted on the mobile device 204, at event J the LBS AS 212 may request (and obtain) Map Data from the Map DB 210. The LBS AS 212 may deliver location-aware content to the mobile device 204 at event K.

Figure 14:
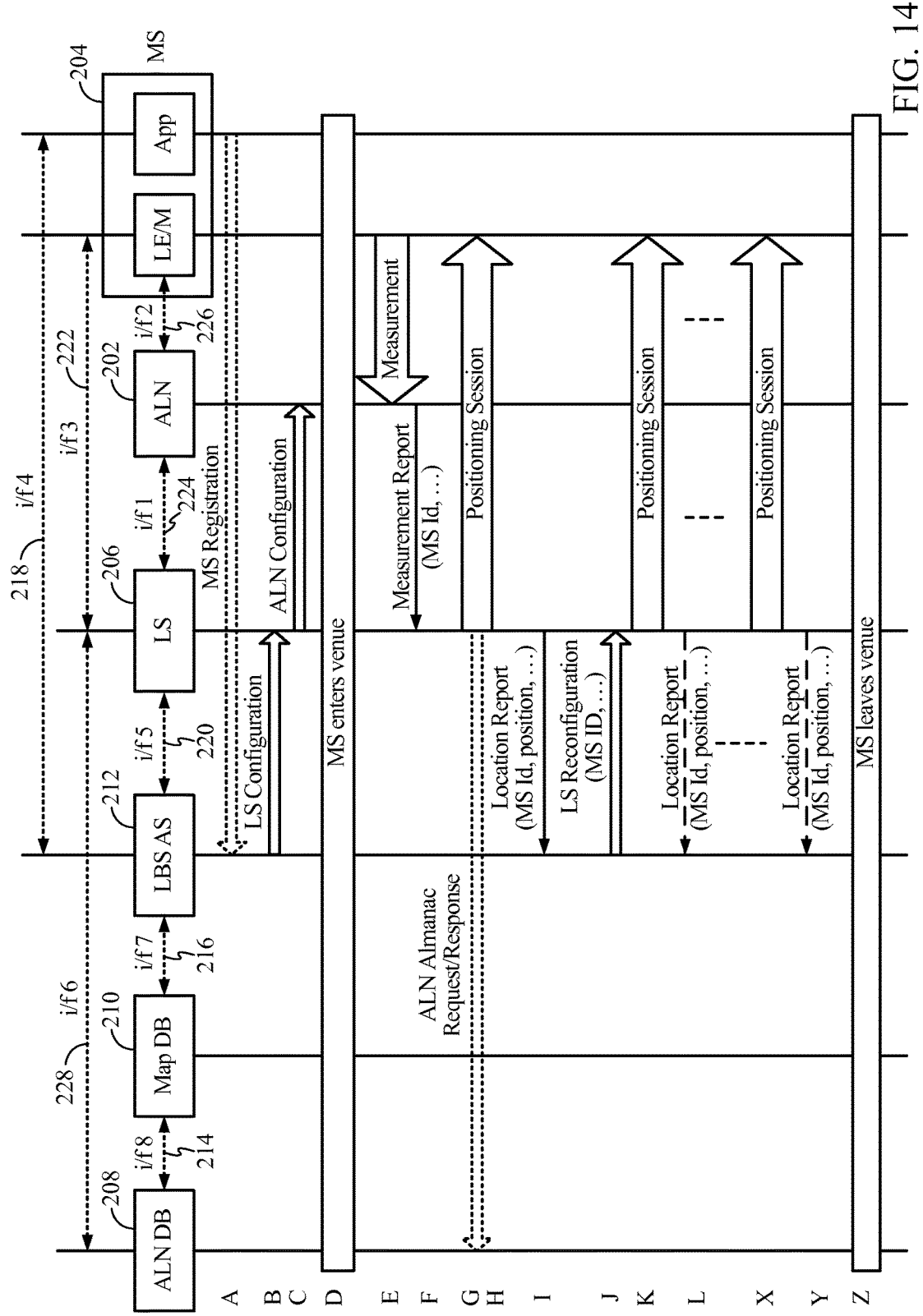
FIG. 14 is a message flow diagram identifying events in connection with network initiated, mobile-centric positioning in a venue.

FIG. 14 is a message flow diagram that exemplifies network-initiated, mobile-centric positioning of mobile devices in a venue with periodic updates. Events A through I as indicated in FIG. 14 may occur as events A through I in FIG. 13 described above. Thus at event I, LS 206 may transmit a report to LBS AS 212 comprising an identifier of a mobile device 204 and the computed estimate of the mobile device's location. The report sent at event I may correspond to the response sent at stage 706 for the method 700 in FIG. 7 (e.g. as a consequence of LS 206 determining a trigger condition according to stage 704 of method 700) or the response sent at stage 904 for the method 900 in FIG. 9.

At event J, LBS AS 212 may transmit one or more messages to LS 206 to configure LS 206 to obtain periodic or triggered updates of estimated locations of mobile device 204 (and possibly of other mobile devices). The message or messages sent at event J may correspond to the request for location service sent at stage 802 for the method 800 in FIG.

8 or the request for location service sent at stage 1002 for the method 1000 in FIG. 10. In order to obtain periodic or triggered updates of estimated locations, LS 206 may instigate one or more repetitions of events G I, as exemplified by events K and L and events X and Y, for the case that no additional ALN Almanac data (in a repetition of event H) may be required. In the course of these events, an estimated location of the mobile device 204 may be periodically determined and reported to LBS AS 212 by LS 206 at events L and Y. The mobile device 204 may leave the venue at event Z after which location reporting may cease.

Figure 15A:
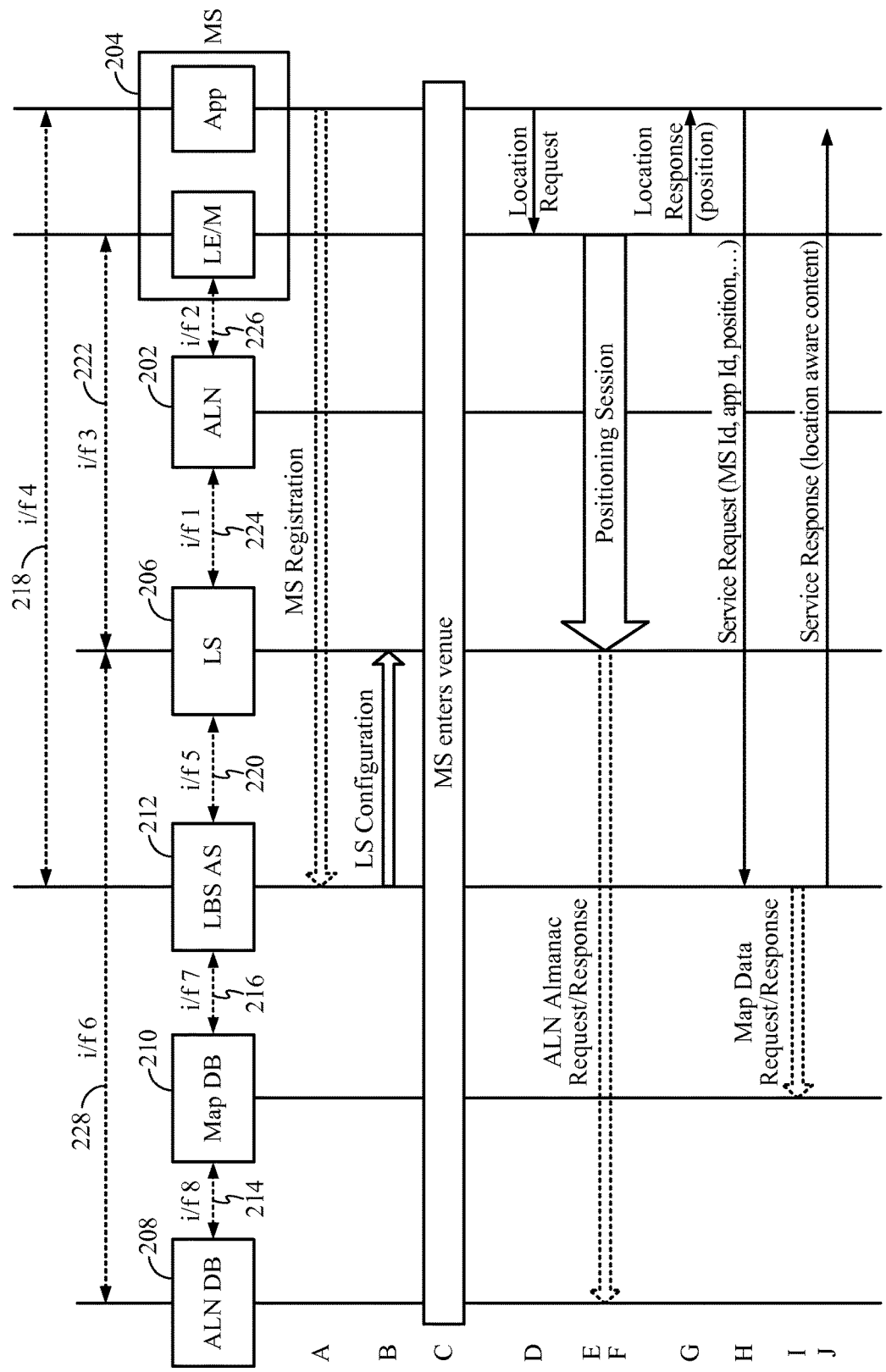
FIG. 15A is a message flow diagram identifying events in connection with mobile initiated, mobile-centric positioning.

FIG. 15A is a message flow diagram that exemplifies mobile initiated, mobile-centric positioning of mobile devices in a venue. At event A, an application hosted on a mobile device 204 may transmit a message to an LBS AS 212 to register the application with the LBS AS 212 in order to, for example, enable the LBS AS 212 to deliver location-aware content to the application in the future. The registration may provide the LBS AS 212 with an identifier for the application and/or for the mobile device 204. At event B, to invoke a configuration procedure, the LBS AS 212 may transmit one or more messages to an LS 206 to instruct the LS 206 to report position results to the LBS AS 212. In this scenario, the configuration request prepares the LS 206 for the mobile initiated position session at event E discussed below. The mobile device 204 may enter the venue at event C and autonomously detect its entry to the venue. Here, the mobile device 204 may detect its entry by, for example, acquisition of a signal transmitted by a radio frequency (RF) ID tag, an AP or femto cell in ALN 202 (e.g., where the transmitted signal may identify the venue or contain information that may be associated by mobile device 204 with the venue), or by user input (e.g., user interaction with the application in event A).

At event D, in response to detecting entry into the venue, an application hosted on mobile device 204 (e.g., the same application as in event A) may request a location engine on mobile device 204 to obtain an estimated location of mobile device 204. At event E, the location engine on mobile device 204 may initiate a positioning session with LS 206 to obtain an estimated location of mobile device 204 and provide the estimated location to the application in a response message at event G. Mobile device 204 may first need to discover LS 206 (e.g., from information received from ALN 202, from a home location server of mobile device 204 such as an H-SLP, from some D-SLP authorized by the H-SLP or during registration at event A). The positioning session in event E may be a SUPL session or a location session defined according to some other location solution such as a solution defined by IETF, 3GPP or 3GPP2. According to an embodiment, in the course of the positioning session initiated at event E, LS 206 may request ALN Almanac data from an ALN DB 208 at event F in order to (i) facilitate computation of an estimated location of mobile device 204 and/or (ii) provide ALN data to mobile device 204 to assist mobile device 204 in making location measurements (e.g., of ALN 202) and/or in computation of the estimated location (e.g., from measurements obtained by the mobile device 204 of ALN 202). In another implementation, ALN DB 208 may request and obtain Map Data from Map DB 210 to enable providing LS 206 with ALN Almanac Data.

At event H, in order to obtain location-aware content, the application hosted on the mobile device 204 may transmit a service request message to the LBS AS 212 including the estimated location of the mobile device obtained at event G and an identifier of the application hosted on the mobile device 204 and/or an identifier of the mobile device 204 and/or of the user of mobile device 204. At event I, the LBS AS 212 may optionally request and receive Map Data from the Map DB 210 in response to the service request message in event H. At event J, the LBS AS 212 may transmit the requested location-aware content to the mobile device 204 which is received by the application hosted on the mobile device 204.

Figure 15B:
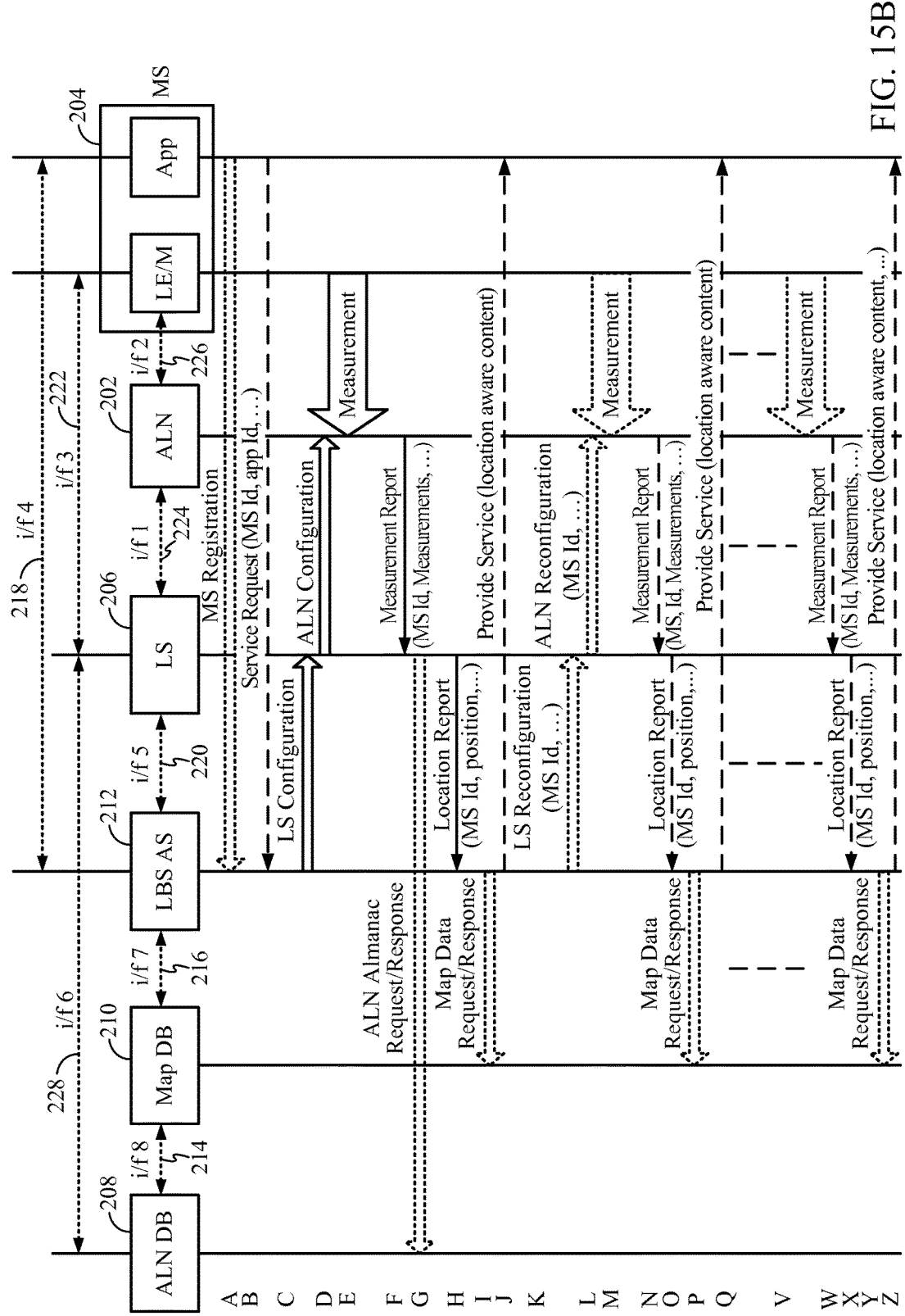
FIG. 15B is a message flow diagram identifying events in connection with network initiated positioning in a venue.

FIG. 15B exemplifies network-centric support of service provision to a mobile device 204 within a venue according to an embodiment. Service provision may support various types of service offered by a venue including, for example, provision of location-related information and/or provision of directions and/or navigation assistance. At event A, an application (App) on mobile device (MS) 204 may register with LBS AS 212 and may provide an identity of the mobile device (e.g., MAC address, IMSI), optionally an identity of the App and means to authenticate the App identity (e.g. if only certain trusted Apps are permitted to receive location services from the venue), information relating to supported and/or preferred services and privacy and/or information on the positioning capabilities of the mobile device (e.g., capability to support SUPL). This event is optional and may occur as needed. Depending on the scenario, this event may occur before or after events C and D. In scenarios where an App on mobile device 204 requests service from the venue without providing the location of mobile device 204, the App sends a Service Request to the LBS AS 212 at event B. The Service Request may identify the specific service being requested (e.g. navigation assistance, directions, map data for the venue, asset or user tracking in which the location of mobile device 204 is periodically updated by LBS AS 212 or mobile device 204 to an asset or user tracking system) and may contain the identity of the mobile device 204 (e.g., a MAC address, IP address, IMSI) and/or of the App and/or information on the positioning capabilities of the mobile device (e.g. capability to support SUPL). Possible triggers for event B may include the App detecting it is within the venue (e.g., in response to detection of signals transmitted by ALN 202) or the user invoking the App in response to the user being aware of entering the venue. In some implementations, the Service Request at event B may indicate user permission for the LBS AS 212 to share the location of mobile device 204 with certain third parties (e.g., the venue owner) in return for location service provided later to the user (e.g. at events J, Q and Z in FIG. 15B). In some implementations, the registration at event A and/or the service request at event B may provide geofence information to LBS AS 212 associated with particular service preferences for the App such as (i) being notified if mobile device 204 enters or leaves a certain geographic area, (ii) receiving certain services or privileges when inside a certain area (such as being able to download certain information) or (iii) being notified when another user (e.g. a child) exits a geofence area defined relative to mobile device 204. At event C, the LBS AS 212 may configure the LS 206 to report position results by sending one or more messages to LS 206 to invoke an LS configuration procedure. The LS configuration procedure may request a single position or multiple positions for particular trigger events (e.g. events related to entering or exiting a geofence) and can address a single MS (e.g., mobile device 204), a set of MSs (e.g., all MSs currently registered with the LBS AS 212), or all MSs detected inside the venue. Each of the MSs for which location information is requested in event C may be identified using some MS identity such as a MAC address, IP address and/or IMSI. Event C may occur before event A (e.g., to configure position results for all MSs), after event A but before event B (e.g., to configure position results for all registered MSs) as well as after event B (e.g., to configure specific position results for the service request in event B). The trigger event(s) configured in step C may include detection of mobile device 204 entering the venue, detection of mobile device entering or exiting from a particular geofence area, a periodic time interval after each of which location information is to be returned to LBS AS 212 and/or a change in an estimated location of mobile device 204 by some threshold relative to a previously-reported location. The message or messages sent at event C may correspond to the request for location service sent at stage 802 for the method 800 in FIG. 8 or the request for location service sent at stage 1002 for the method 1000 in FIG. 10.

In line with LS configuration performed at event C, LS 206 may perform an ALN configuration procedure at event D to instruct ALN 202 to perform measurements enabling detection of the presence and possibly location of mobile device 204 and/or of other mobile devices. The configuration in event D may include providing an identity of mobile device 204 to ALN 202, providing a time interval for reporting mobile device location measurements to LS 206, and a change in mobile device signal measurements for which mobile device signal measurements are to be reported to LS 206. At event E, ALN 202 detects mobile device 204 and performs measurements of mobile device 204. After ALN 202 obtains measurements of mobile device 204, ALN 202 reports the measurements to the LS 206 in a Measurement Report at event F. The Measurement Report may contain the mobile device identity (e.g., MAC address, IP address) and the measurements. After receiving the measurements in event F, LS 206 may request and obtain ALN almanac data from ALN DB 208 at event G in order to calculate the position of mobile device 204. Event G may be optional and may only be performed if LS 206 requires ALN Almanac data for ALN 202 and has not already obtained this data from ALN DB 208 and stored the data for later use. ALN DB 208 may also require Map Data in order to be able to provide the LBS AS 212 with the Almanac Data. In this case, ALN DB 208 requests (and obtains) the required Map Data from Map DB 210.

At event H, LS 206 calculates the position of mobile device 204 based on the measurements received in event F and any ALN almanac data received at event G, and sends a Location Report to LBS AS 212. The Location Report may contain the mobile device identity (e.g. MAC address, IP address) and position and an indication of any trigger events applicable to mobile device 204 such as mobile device 204 having entered or left a particular geographic area. In some implementations, LS 206 may not perform event H immediately but instead await further repetitions of event F (not shown in FIG. 15B). This may occur, for example, if LS 206 was configured by LBS AS 212 at event C to provide the location report at event H only when mobile device 204 satisfies some trigger condition (e.g. such as mobile device 204 having entered or left a particular geographic area) and further repetitions of event F are needed before the particular trigger event occurs and is detected by LS 206. The location report sent at event H may correspond to the response sent at stage 706 for the method 700 in FIG. 7 (e.g. as a consequence of LS 206 determining a trigger condition according to stage 704 of method 700) or the response sent at stage 904 for the method 900 in FIG. 9. If LBS AS 212 requires Map Data in order to respond to the initial service request (i.e., event B) and did not previously obtain and store the data, LBS AS 212 may request (and obtain) the required Map Data from Map DB 210 at event I. If a location estimate of mobile device 204 and/or location-aware content needs to be provided to the mobile device 204 (App) in response to event B or as a consequence of detecting the mobile device 204 in the venue at event E or as a consequence of any trigger events indicated at event H, LBS AS 212 sends a Provide Service message to the mobile device 204 (App) at event J. The Provide Service message contains the location estimate of mobile device 204 and/or the location-aware content (e.g. venue map data, directions and/or venue information relevant to the current location of mobile device 204). In the case of an asset or user tracking service, LBS AS 212 or mobile device 204 may then update an asset or user tracking service with a location estimate of mobile device 204 (not shown in FIG. 15B).

If LBS AS 212 needs to reconfigure the LS 206 (e.g., to obtain location reports for the mobile device 204 more frequently or for different trigger events than instructed in event C), LBS AS 212 may send a message or messages containing new configuration instructions to LS 206 at event K regarding reporting the location of mobile device 204 (e.g. may provide new trigger conditions such as mobile device 204 entering or leaving some geofence). The message or messages sent at event K may correspond to the request for location service sent at stage 802 for the method 800 in FIG. 8 or the request for location service sent at stage 1002 for the method 1000 in FIG. 10. If event K was performed, LS 206 may reconfigure ALN 202 in line with the LBS AS reconfiguration of event K (e.g., LBS AS 212 may request location reports from ALN 202 related to mobile device 204 at a higher frequency or in response to the occurrence of certain event triggers such as a certain change in signal measurements (e.g. RTT, RSSI) related to mobile device 204). Events E, F, G, H, I and J described previously may then be repeated one or more times (e.g. at events M, N, 0, P, Q and at events V, W, X, Y, Z wherein repetition of event G is omitted) to provide updated location information for mobile device 204 to LBS AS 212 and provide new service to mobile device 204 (e.g. new map data, new venue information).

Figure 15C:
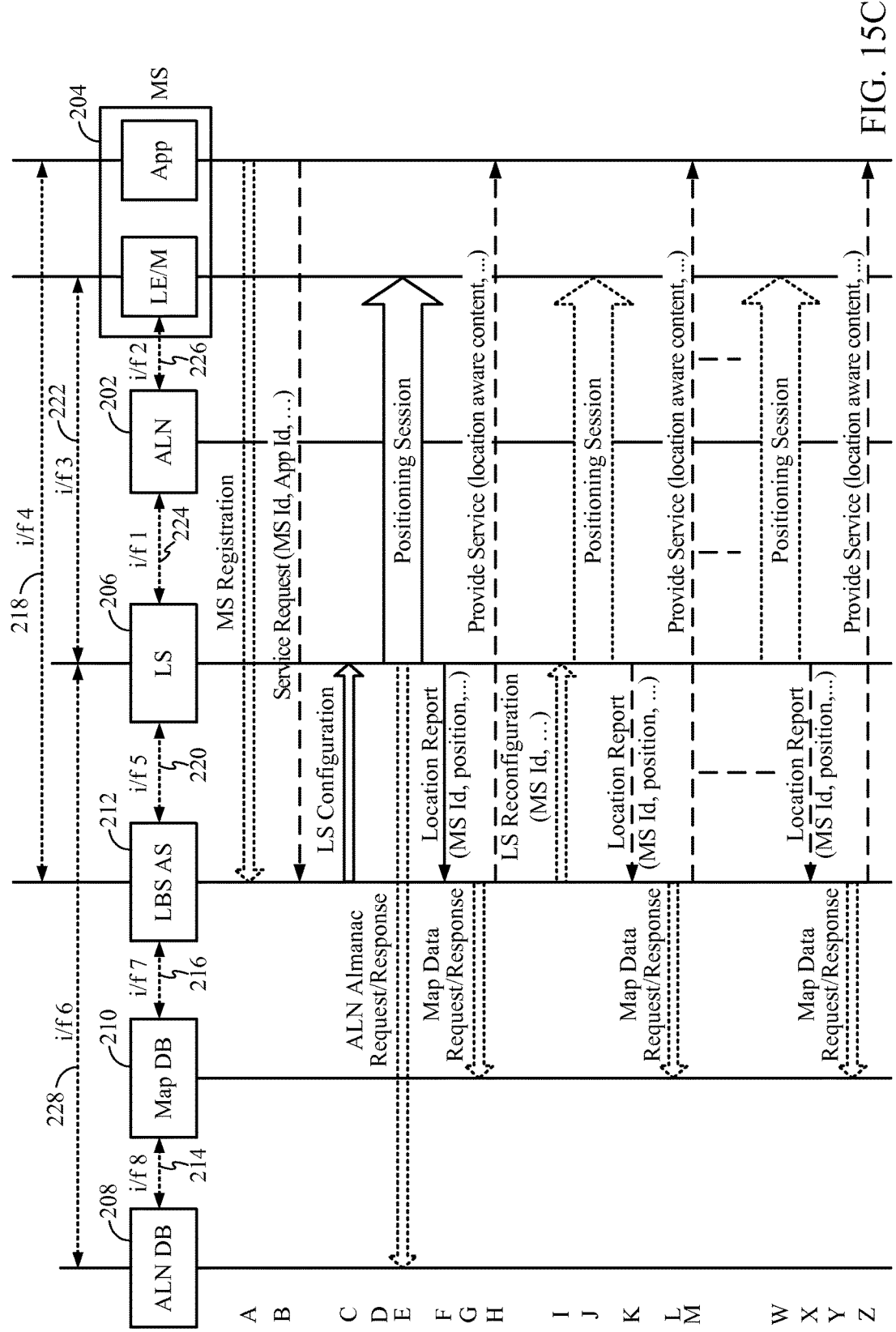
FIG. 15C is a message flow diagram identifying events in connection with mobile-centric network initiated positioning in a venue.

FIG. 15C exemplifies mobile-centric network-initiated support of service provision to a mobile device 204 within a venue. Service provision may support various types of service offered by a venue including, for example, provision of location-related information and provision of directions and/or navigation assistance. FIG. 15C may support the same venue services as the embodiment of FIG. 15B except that the embodiment of FIG. 15C may employ mobile-centric network-initiated positioning instead of network-centric positioning as in FIG. 15B. Events A, B and C in FIG. 15C may occur as described previously for FIG. 15B. Thus, at event C, LS 206 may receive configuration instructions from LBS AS 212 for mobile device 204 and possibly for other mobile devices. In response to event C, LS 206 may initiate a Positioning Session with mobile device 204 (LE/M) at event D in order to obtain an estimated location of mobile device 204. The positioning session may comprise a SUPL session (and may then employ LPP and LPPe for positioning) or may comprise a location session defined according to some other location solution such as a solution defined by IETF, 3GPP or 3GPP2. In the course of the Positioning Session, LS 206 may request and obtain ALN Almanac data from ALN DB 208 at event E to enable computation of the estimated position of the mobile device 204 and/or provide ALN 202 data to the mobile device 204 to enable mobile device 204 to obtain measurements and possibly estimate the location of mobile device 204. Event E may be optional and only performed if LS 206 or mobile device 204 employs ALN Almanac data and if the LS 206 has not already obtained this data from ALN DB 208 and stored the data for later use. If event E occurs, ALN DB 208 may employ Map Data in order to provide LS 206 with the Almanac Data. In this case, ALN DB 208 may request (and obtain) the Map Data from Map DB 210. In some implementations, the positioning session at event D may support triggered positioning in which LS 206 obtains a location estimate for mobile device 204 only when one or more of certain trigger events occur such as mobile device 204 entering or leaving a particular geofence area. In these implementations, LS 206 and/or mobile device 204 may monitor for occurrence of the trigger event(s) by periodically obtaining a location estimate for mobile device 204 and determining whether the location estimate satisfies a trigger condition. In the case of a SUPL positioning session, mobile device 204 may monitor any trigger conditions by obtaining positioning assistance data from LS 206 in order to periodically compute a location estimate for mobile device 204 and communicate a position estimate to LS 206 when one or more trigger events have been detected.

At event F, LS 206 may report a computed location estimate for mobile device 204 to the LBS AS 212 in a Location Report which may include the identity of mobile device 204 and an indication of any trigger events applicable to mobile device 204 such as mobile device 204 having entered or left a particular geographic area. In some implementations, LS 206 may not perform event F immediately but may instead await further repetitions of event D (not shown in FIG. 15C). This may occur, for example, if LS 206 was configured by LBS AS 212 at event C to provide the location report at event F only when mobile device 204 satisfies some trigger condition (e.g. such as mobile device 204 having entered or left a particular geographic area) and further repetitions of event D are needed before the particular trigger event occurs and is either detected by LS 206 or reported to LS 206 by mobile device 204. The location report sent at event F may correspond to the response sent at stage 706 for the method 700 in FIG. 7 (e.g. as a consequence of LS 206 determining a trigger condition according to stage 704 of method 700) or the response sent at stage 904 for the method 900 in FIG. 9. If the LBS AS 212 employs Map Data in order to respond to the initial service request (event B) and did not previously obtain and store the data, LBS AS 212 may request (and obtain) the required Map Data from Map DB 210 at event G. If a location estimate for mobile device 204 and/or location-aware content is to be provided to mobile device 204 (App) in response to event B or event A or as a consequence of any trigger events indicated at event F, LBS AS 212 may send a Provide Service message to mobile device 204 (App) at event H. The Provide Service message contains a location estimate for mobile device 204 and/or the location-aware content (e.g. directions or information related to the venue). In the case of an asset or user tracking service, LBS AS 212 or mobile device 204 may then update an asset or user tracking service with a location estimate of mobile device 204 (not shown in FIG. 15C).

If LBS AS 212 is to reconfigure the LS 206 (e.g., to obtain location reports for the mobile device 204 more frequently or for different trigger events than instructed in event C), LBS AS 212 may send a message or messages containing new configuration instructions to LS 206 at event I regarding reporting the location of mobile device 204 (e.g. may provide new trigger conditions for reporting such as mobile device 204 entering or leaving some geofence). The message or messages sent at event I may correspond to the request for location service sent at stage 802 for the method 800 in FIG. 8 or the request for location service sent at stage 1002 for the method 1000 in FIG. 10. If event I was performed, events D, E, F, G and H described previously may be repeated one or more times (e.g., as shown at events J, K, L, M and W, X, Y, Z where repetition of event E is not shown) to provide updated location information for mobile device 204 to LBS AS 212 and provide new service to mobile device 204 (e.g., new map data, new venue information).

Figure 15D:
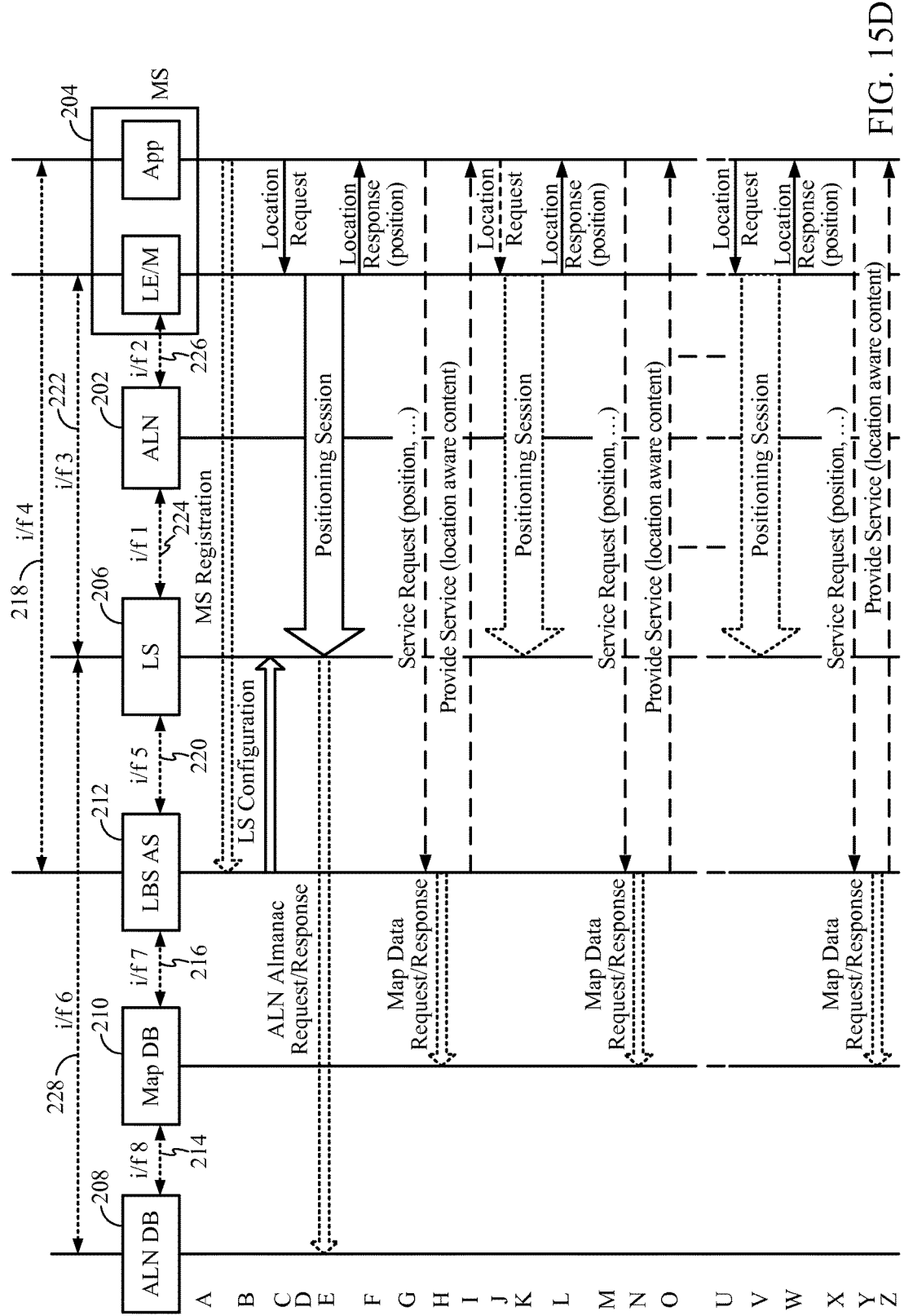
FIG. 15D is a message flow diagram identifying events in connection with mobile-centric mobile initiated positioning in a venue.

FIG. 15D exemplifies mobile-centric mobile-initiated support of service provision to a mobile device 204 within a venue according to an embodiment. Service provision may support various types of service offered by a venue including, for example, provision of location-related information and provision of directions and/or navigation assistance. FIG. 15D may support the same venue services as FIGS. 15B and 15C except that FIG. 15D may employ mobile-centric mobile-initiated positioning instead of network-centric positioning as in FIG. 15B or mobile-centric network-initiated positioning as in FIG. 15C. Events A and B in FIG. 15D may occur as described previously for events A and C, respectively, in FIGS. 15B and 15C. The LS configuration procedure in event B may then prepare the LS 206 for single position or multiple positions for particular trigger event sessions and may address a single mobile device 204 (e.g., the mobile device 204 in event A), a set of MSs (e.g., MSs currently registered with the LBS AS 212), or all MSs detected inside the venue. In this scenario, the configuration request in event B may prepare LS 206 for the position session in event D initiated by mobile device 204.

An App on the mobile device 204 (e.g., the App associated with event A) may require a position and send a Location Request to the LE/M on the mobile device 204 at event C. Possible triggers for this event may include the App detecting that mobile device 204 is within the venue (e.g., based on detection of signals from ALN 202 received by mobile device 204) or the user invoking the App in response to the user being aware of entering the venue. The App may also be aware that the App can obtain the estimated location of mobile device 204 locally on the mobile device 204. At event D, mobile device 204 (LE/M) may initiate a Positioning Session with the LS 206 in order to obtain the estimated position of mobile device 204. Mobile device 204 may first discover the LS 206 (e.g., from information received from the ALN 202, from a home location server of the mobile device 204 such as an H-SLP, from some D-SLP authorized by the H-SLP or during the registration event A). The positioning session in event D may comprise a SUPL session (and may then employ LPP and LPPe for positioning), or may comprise a location session defined according to some other location solution such as a solution defined by IETF, 3GPP or 3GPP2.

In the course of a Positioning Session at event D, LS 206 may request and obtain ALN 202 Almanac data from ALN DB 208 at event E in order to calculate an estimated position of mobile device 204 and/or provide ALN data to the mobile device 204 to assist measurements and possibly location derivation by mobile device 204. Event E may be optional and may only be performed if LS 206 or mobile device 204 employs ALN Almanac data and if the LS 206 has not already obtained this data from the ALN DB 208 and stored the data for later use. If event E occurs, ALN DB 208 may employ Map Data in order to provide the LS 206 with the Almanac Data. In this case the ALN DB 208 may request (and obtain) the Map Data from the Map DB 210.

After obtaining an estimated position of the mobile device 204 at event D, the LE/M on mobile device 204 may send the estimated position to the App in a Location Response at event F. If the App on mobile device 204 is to receive location-aware content from LBS AS 212 (e.g., based on the position result obtained in event F or based on the trigger that invoked event C), the mobile device 204 (App) may send a Service Request to LBS AS 212 indicating the type of service requested at event G. The service request may include the mobile device identity (e.g., MAC address, IP address, IMSI), the identity of the user of mobile device 204 and/or the estimated position obtained in event F.

If LBS AS 212 employs Map Data as a result of the Service Request received in event G and did not previously obtain and store the data, LBS AS 212 may request (and obtain) Map Data from Map DB 210 at event H. If event G was performed, LBS AS 212 may send a Provide Service message with the requested location-aware content to the mobile device 204 (App) at event I. Events C through I may then be repeated one or more times to enable the App on mobile device 204 to request new services from LBS AS 212 at later times (e.g., if the location of mobile device 204 has changed or if the user makes an additional request for new service to the mobile device 204). These repeated events are shown in FIG. 15D at events J through O and events U through Z wherein repetition of event E is not shown.

Figure 16A:
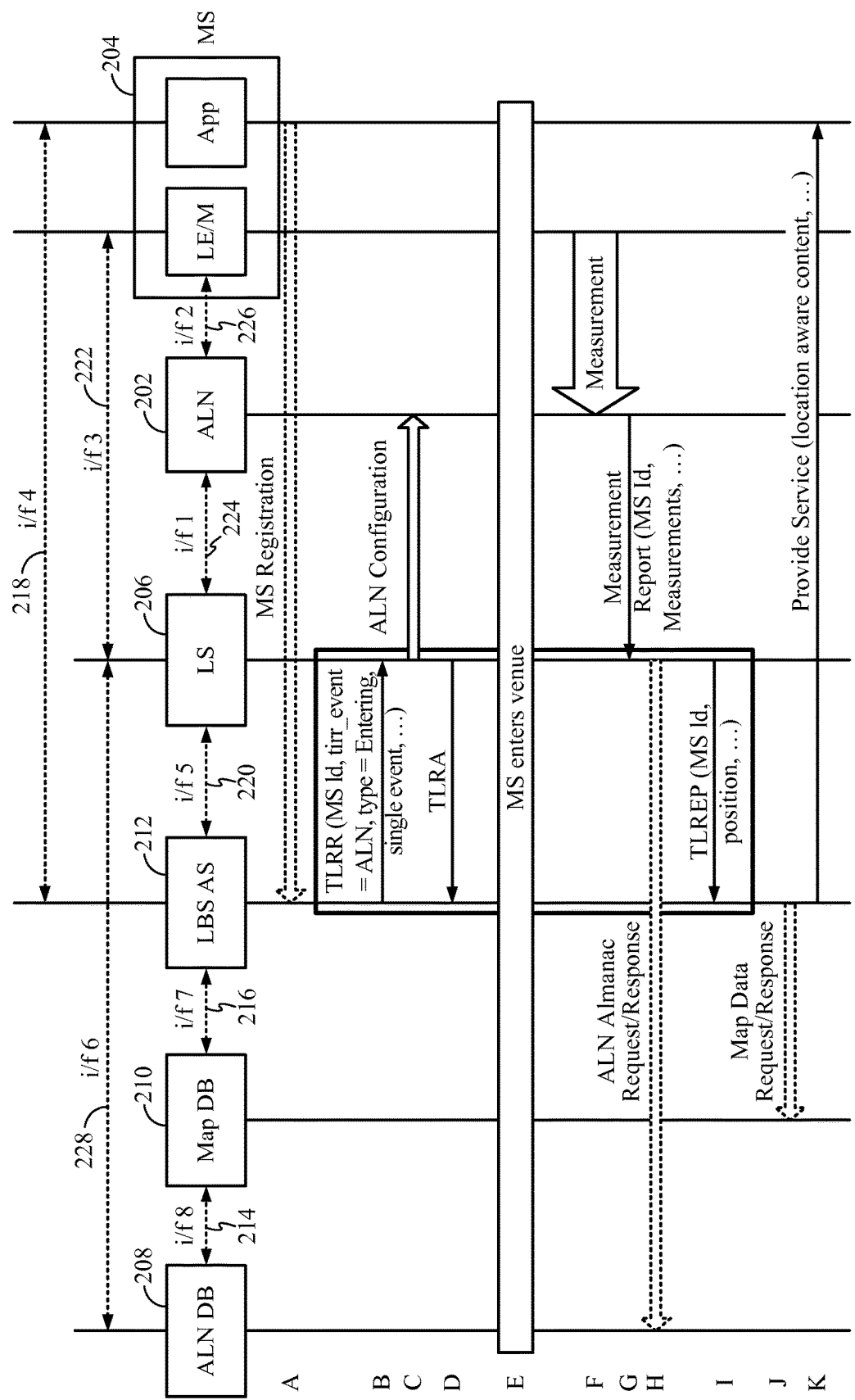
FIG. 16A is a message flow diagram of a method to facilitate communication between a location server and a location based services application server.

FIG. 16A is a message flow diagram of a method using MLP on message interface 220 in FIG. 1B to facilitate communication between an LS 206 and LBS AS 212 by applying one or more features of OMA MLP. In one example implementation, an LBS AS 212 may comprise an LCS client of the LS 206. Aspects of communication between the LBS AS 212 and LS 206 as described with reference to FIG. 16A are not limited to the particular discussion of FIG. 16A but may be applied to communication between an LBS AS 212 and LS 206 as described above in connection with other message flow diagrams shown in FIGS. 11, 12, 13, 14, 15A, 15B, 15C and 15D. Here, at event A, a mobile device 204 may register with the LBS AS 212 for a particular service (and may provide a mobile device identity such as a MAC or IP address to LBS AS 212 and a set of supported or preferred services to LBS AS 212) which may entail, for example, providing the mobile device 204 with location-aware content (e.g., a venue map with an estimated location of the mobile device) in response to the mobile device 204 entering a venue.

At event B, the LBS AS 212 may send an MLP TLRR message to the LS 206 including unique identifiers (e.g. MAC address, IP address) of mobile devices of interest (e.g. mobile device 204) and an event type (tlrr_event) of "ALN/ entering" that may indicate that the event is a mobile device being detected by ALN 202 as entering a venue. Here, in this particular example, a single event may be selected such that only a first mobile device entry may be counted as an event. The MLP TLRR message sent at event B may correspond to the request for location service sent at stage 802 for the method 800 in FIG. 8 or the request for location service sent at stage 1002 for the method 1000 in FIG. 10. At event C, the LS may configure the ALN 202 to detect the one or more particular mobile devices and transmit a measurement report to the LS in response to the MS entering (or leaving) an area covered by ALN 202. At event D, the LS 206 may acknowledge the service request in a TLRA response message to LBS AS 212. At event E, a mobile device 204 of interest enters a venue (e.g., an area covered or served by the ALN 202). At event F, the ALN 202 may detect that one or more mobile devices (e.g. mobile device 204) have entered an area covered or served by the ALN 202 and perform measurements enabling estimation of locations of the mobile devices (with multiple mobile devices being assumed for this example). After having obtained measurements enabling estimates of locations of the mobile devices, at event G the ALN 202 may transmit a message comprising the measurement results in a Measurement Report to the LS 206 including unique identifiers (e.g., MAC addresses, IP addresses) of the mobile devices. At event H, the LS 206 may transmit a message to the ALN DB 208 to request and obtain ALN Almanac data to assist or enable calculation of estimated locations of the mobile devices (e.g., mobile device 204). At event I, the LS 206 may compute estimated locations of the mobile devices and transmit an MLP TLREP message to the LBS AS 212 including unique identifiers and estimated locations of the mobile devices. The MLP TLREP message sent at event I may correspond to the response sent at stage 706 for the method 700 in FIG. 7 (e.g. as a consequence of LS 206 determining a trigger condition according to stage 704 of method 700) or the response sent at stage 904 for the method 900 in FIG. 9. At event J, the LBS AS 212 may request map data from Map DB 210 to assist with providing location-aware content based, at least in part, on the estimated locations of the mobile devices. At event K, the LBS AS 212 may provide location-aware content to applications hosted on the mobile devices (e.g., mobile device 204) based, at least in part, on the estimated locations of the mobile devices received at event I. Events F through K may be repeated one or more times (not shown in FIG. 16A) to report additional (e.g., new) mobile device locations to LBS AS 212 and enable further provision of location-aware content by LBS AS 212 to mobile devices (e.g., mobile device 204). Events B through K may also or instead be repeated to enable LBS AS 212 to request other types of location reporting associated with different configuration instructions at event B (e.g., to enable LBS AS 212 to track mobile device 204 while within the venue and provide other location-related services based on the current location of mobile device 204).

In particular environments, various other use cases may be implemented using the network elements described previously for FIG. 1B according to techniques described herein. Such example use cases are enumerated herein as use cases 1 through 9. In use case 1, a position or estimated location of a mobile device may be determined and location-sensitive content (e.g., maps) may be displayed to a user via an application or browser on the mobile device. In use case 2, a position or estimated location of a mobile device may be determined and location-sensitive content may be provided to a user as in use case 1 but the user may choose to authorize or not authorize sharing of the position or estimated location of the mobile device with a third party, such as a venue owner, in order to enable the user of the mobile device to obtain his location and location-sensitive content. In use case 3, a position or estimated location of a mobile device and/or location-sensitive content may only be made available to a specific trusted application in a mobile device. In use case 4, a user may make an emergency call and then be located in response to a request from a public safety answering point (PSAP). In use case 5, a location of an asset may be tracked (and the asset may be potentially recovered). The tracked location may be forwarded to an inventory manager or asset tracking system. In use case 6, entry into or exit from an area bounded by a geofence may be detected to enable subsequent notification and action (e.g., when a user can only download a certain document while in an office and a geofence is used to detect entry into or departure from the office). In an alternative use case 7, entry into or departure from an area bounded by a relative geofence (e.g., entry into or departure from an area bounded by a geofence centered around another user) may be detected and subsequent action taken (e.g., a parent tracking the relative location of a child in a crowd with the parent acting as the relative geofence within which the child may move and with the parent being notified by an alarm if the relative geofence is breached by the child). In use case 8, location-enabled troubleshooting of WLAN connections may be performed. In use case 9, a user may determine his own position or estimated location and that of a third party provided that the third party grants permission to the user to receive the location of the third party.

Exemplary message communication flows that enable use cases 1 to 9 are now described referring to FIGS. 16B through 16M that show interactions between or among elements in the architectures described earlier with reference to FIGS. 1A and 1B. Elements in FIGS. 16B through 16M may correspond to elements in the architecture 200 of FIG. 1B, or to elements used in FIGS. 11, 12, 13, 14, 15A, 15B, 15C, 15D and 16A via the use of like names. The mobile device (or MS) in each of FIGS. 16B-16M is shown as comprising a modem, a location engine and an application (App) that may in some implementations be the true endpoints of certain interfaces supported by the mobile device (or MS). The sequence of events shown in and described for FIGS. 16B through 16M may occur in the order shown and described or may occur in some other order in some implementations. In addition, some events may occur concurrently in which case some events may start before other events and finish during or after these other events.

Figure 16B:
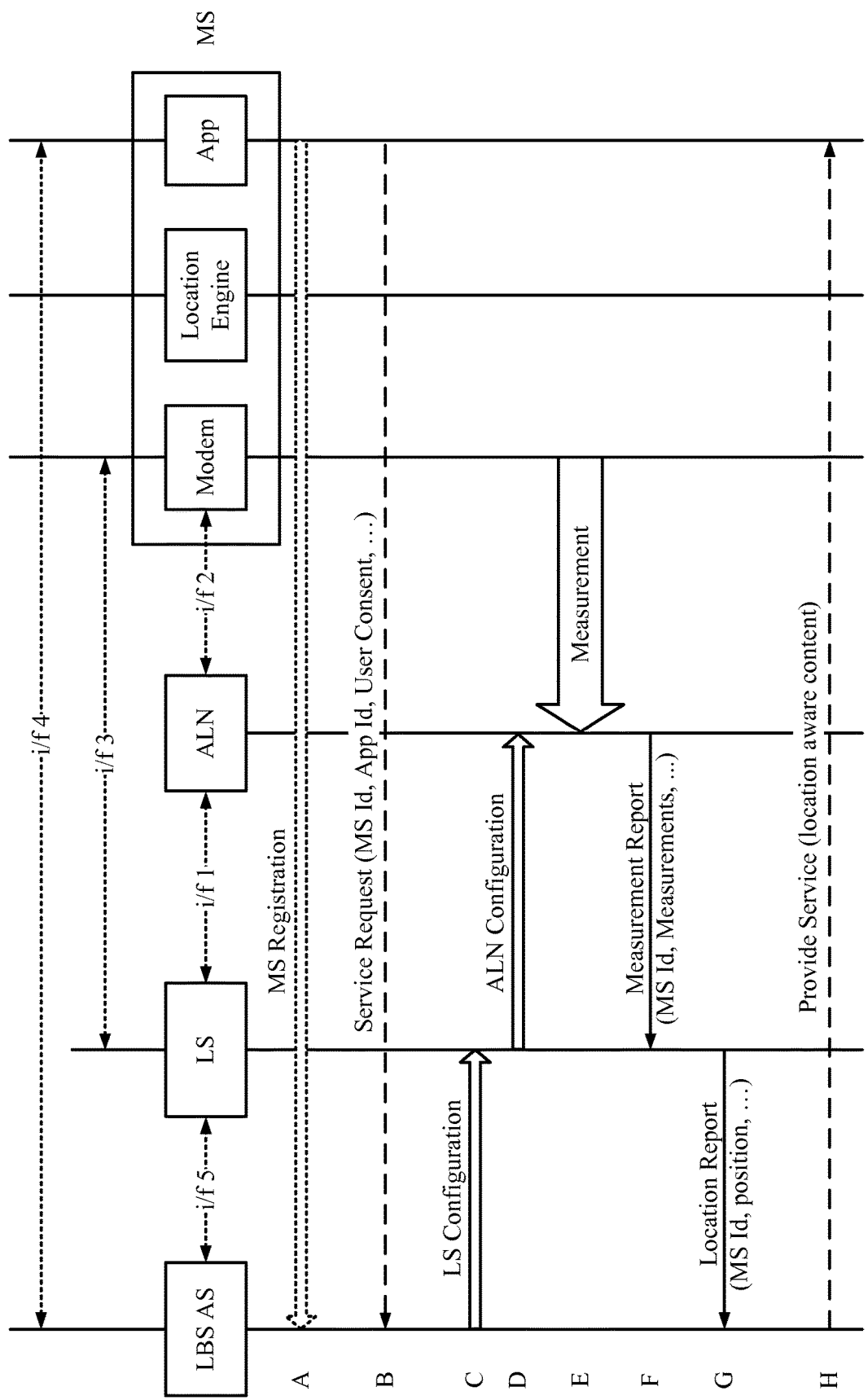
FIGS. 16B-16M are message flow diagrams illustrating processes that may be used to implement certain use cases.

FIG. 16B is a message flow diagram of a process that may be used to implement the aforementioned use cases 1, 2 and 3 using a network-based positioning approach. At event A, an App on the MS may register with the LBS AS (e.g., the App may support getting directions to a gate at an airport). At event B, in response to the user of the MS interacting with the App (e.g. to receive gate directions at an airport), the App may request from the LBS AS location-sensitive context (e.g., directions to the gate) and include identifiers of the MS and the App in its request. If applicable, the request may also indicate the user's consent that the LBS AS may share the user's position or estimated location with third parties (e.g., the venue owner). At event C, the LBS AS may send a request (e.g., LS Configuration message) for a single position fix for the MS to the LS. The request sent at event C may correspond to the request for location service sent at stage 802 for the method 800 in FIG. 8 or the request for location service sent at stage 1002 for the method 1000 in FIG. 10. At event D, the LS may send a request (e.g., ALN Configuration message) for a single position fix for the MS to the ALN. At event E, the ALN may detect the presence of the MS (e.g. following interaction by the MS with some access point in the ALN) and may perform access or location network measurements of the MS (e.g., of signals transmitted by the MS). At event F, the ALN may transmit the obtained access or location network measurements in a measurement report to the LS. At event G, the LS may calculate an estimated location of the user (e.g., MS) based, at least in part, on the access or location network measurements and may transmit the result to the LBS AS in a location report. The location report sent at event G may correspond to the response sent at stage 706 for the method 700 in FIG. 7 (e.g. as a consequence of the LS determining a trigger condition according to stage 704 of method 700) or the response sent at stage 904 for the method 900 in FIG. 9. At event H, the LBS AS may provide the location-sensitive content to the App on the MS (e.g. may provide directions to a gate at an airport based on the current MS location provided at event G). The App may then provide the location-sensitive content to the user.

Figure 16C:
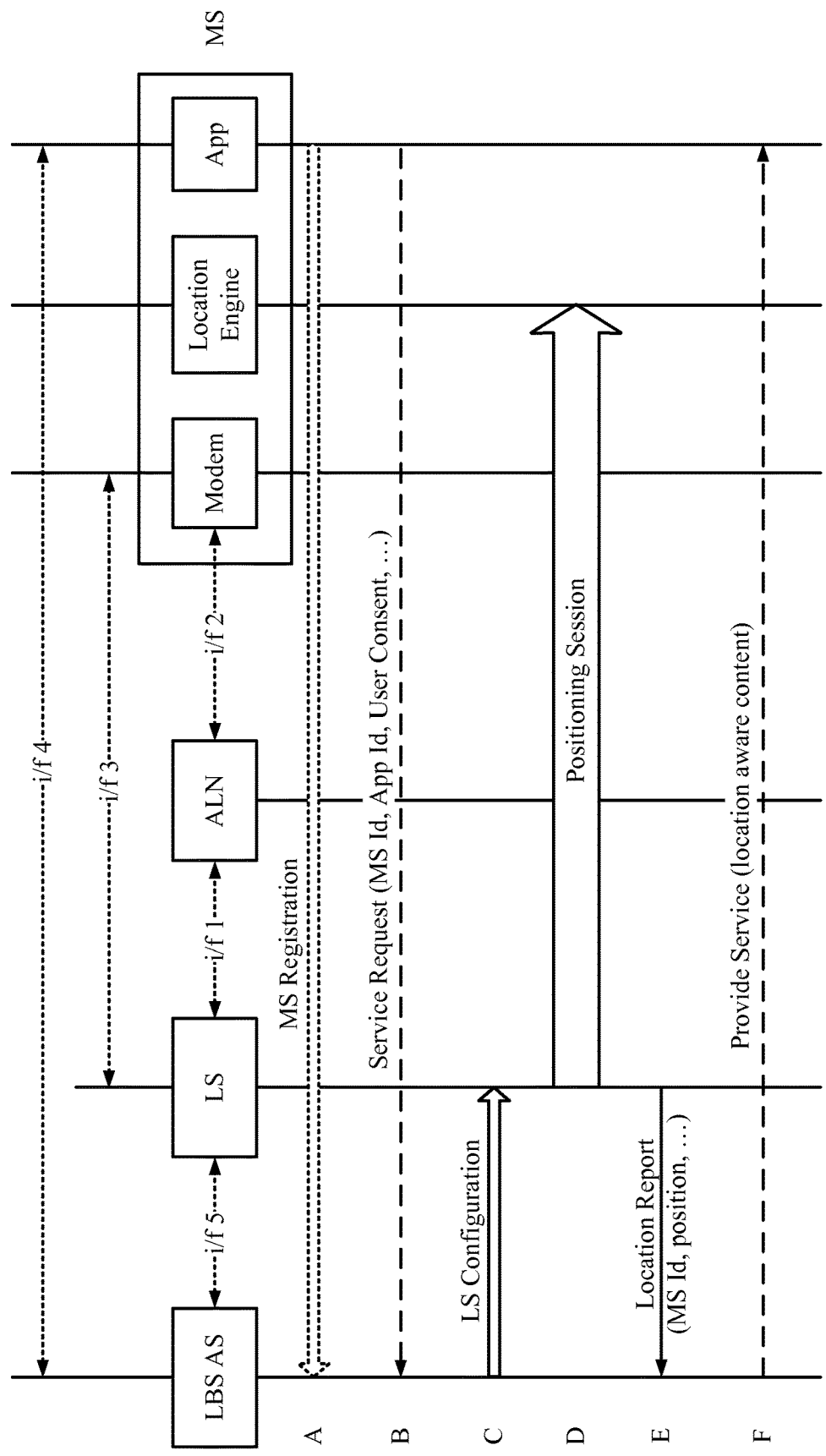

FIG. 16C is a message flow diagram of a process that may be used to implement the aforementioned use cases 1, 2 and 3 using a mobile based positioning approach. At event A, an App on the MS may register with the LBS AS (e.g., app for getting directions to the gate at an airport). At event B, the App may request location-sensitive content (e.g., directions to the gate) from the LBS AS and include identifiers of the MS and App in its request. If applicable, the request may also indicate a user's consent that the LBS AS may share its location with 3rd parties (e.g., venue owner, etc.). At event C, the LBS AS may transmit a request (e.g., LS Configuration message) for a single position fix for the MS to the LS. The request sent at event C may correspond to the request for location service sent at stage 802 for the method 800 in FIG. 8 or the request for location service sent at stage 1002 for the method 1000 in FIG. 10. At event D, the LS may instigate a positioning session with a location engine on the MS (e.g. using the SUPL location solution) at the end of which the LS may obtain an estimated location or position of the MS. At event E, the LS may transmit the estimated location to the LBS AS in a Location Report. The location report sent at event E may correspond to the response sent at stage 706 for the method 700 in FIG. 7 (e.g. as a consequence of the LS determining a trigger condition according to stage 704 of method 700) or the response sent at stage 904 for the method 900 in FIG. 9. At event F, the LBS AS may provide location-sensitive content to the App on the MS (e.g. may provide directions to a gate at an airport based on the current MS location provided at event E). The App may then provide the location-sensitive content to the user.

Figure 16D:
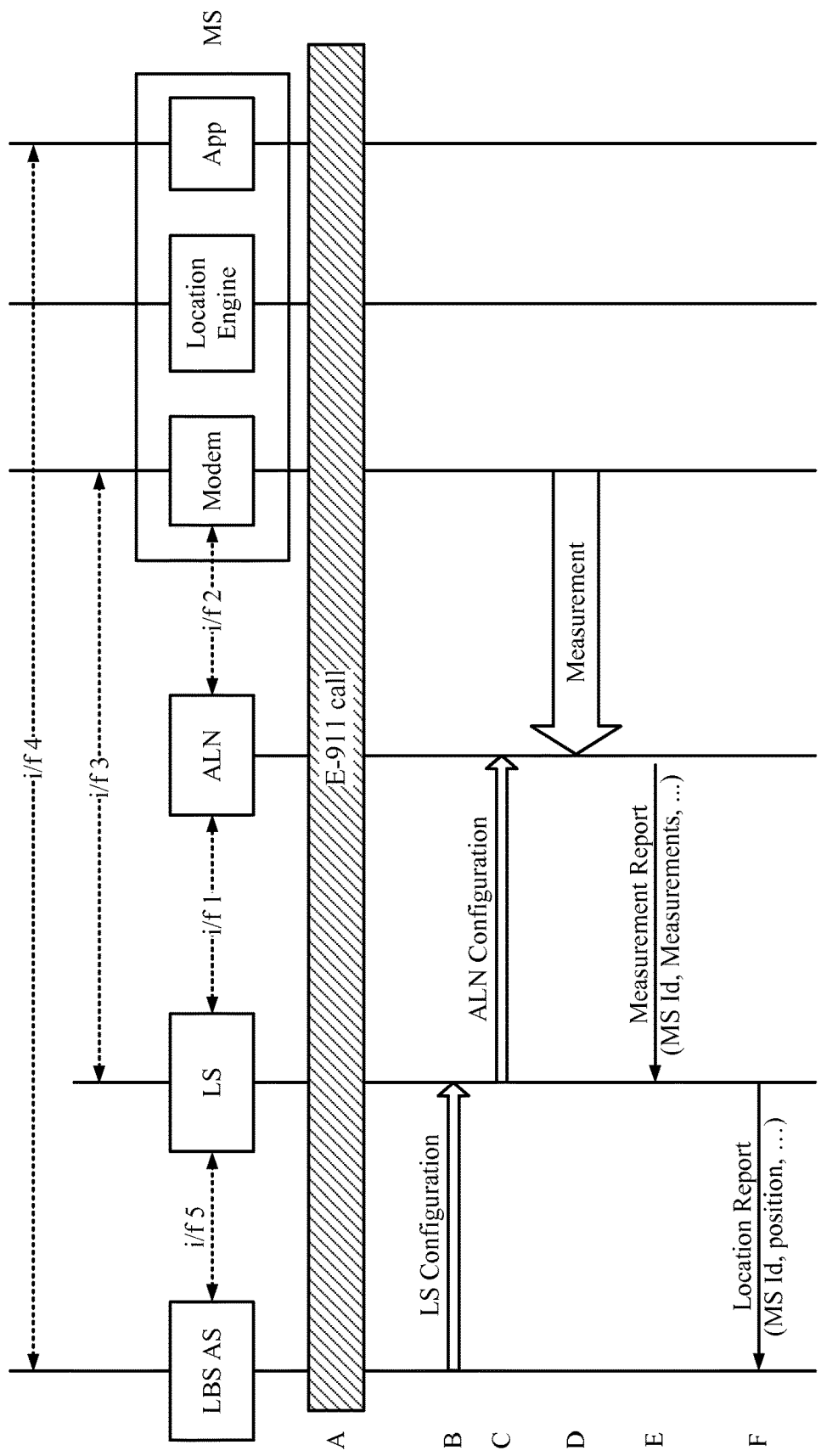

FIG. 16D is a message flow diagram of a process that may be used to implement the aforementioned use case 4 using a network-based positioning approach according to an embodiment. At event A, a user of an MS may place an emergency 911 call (E911 call). In response to the E911 call, at event B a public safety agency (e.g., represented by the LBS AS in this particular illustration) may submit a location request for the MS engaged in the E911 call to the LS (e.g., LS Configuration message). The location request sent at event B may correspond to the request for location service sent at stage 802 for the method 800 in FIG. 8 or the request for location service sent at stage 1002 for the method 1000 in FIG. 10. At event C, the LS may send a request (e.g., ALN Configuration message) for a single position fix for the MS to the ALN. At event D, the ALN may perform access or location network measurements of the MS. At event E, the ALN may transmit the access or location network measurements in a Measurement Report to the LS. At event F, the LS may calculate a position or estimated location of the MS based, at least in part, on the access or location network measurements, and transmit the result to the LBS AS in a Location Report. The location report sent at event F may correspond to the response sent at stage 706 for the method 700 in FIG. 7 (e.g. as a consequence of the LS determining a trigger condition according to stage 704 of method 700) or the response sent at stage 904 for the method 900 in FIG. 9.

Figure 16E:
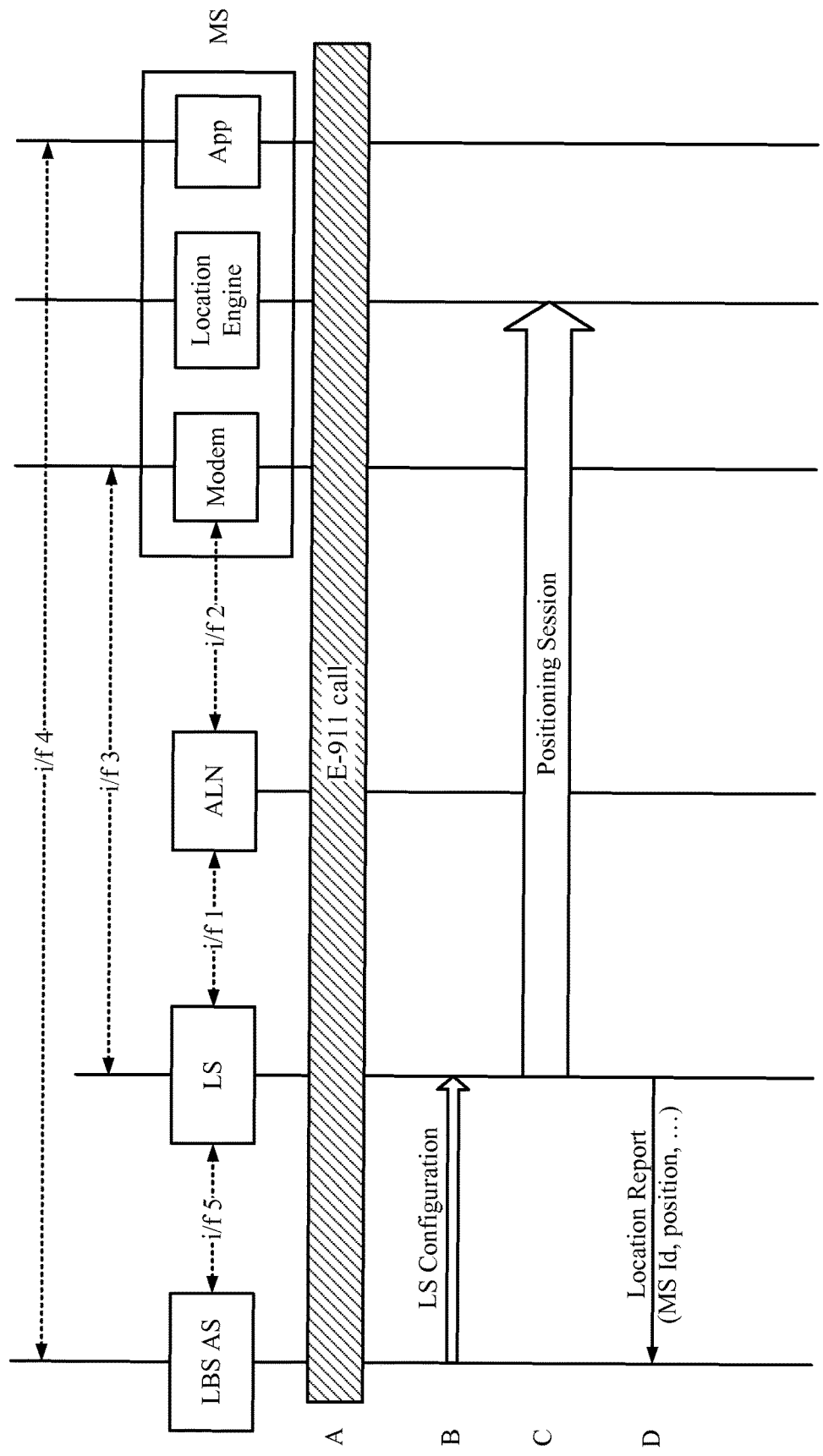

FIG. 16E is a message flow diagram of a process that may be used to implement the aforementioned use case 4 using a mobile-based positioning approach. At event A, a user of an MS may place an E911 call. In response to the E911 call, at event B, a public safety agency (represented by the LBS AS in this particular illustration) may submit a location request for the MS engaged in the E911 call to the LS (e.g., LS Configuration message). The location request sent at event B may correspond to the request for location service sent at stage 802 for the method 800 in FIG. 8 or the request for location service sent at stage 1002 for the method 1000 in FIG. 10. At event C, the LS may instigate a positioning session (e.g. using the SUPL location solution) with a location engine on the MS at the end of which the LS may obtain the MS's position. At event D, the LS may transmit the position result to the LBS AS in a Location Report. The location report sent at event D may correspond to the response sent at stage 706 for the method 700 in FIG. 7 (e.g. as a consequence of the LS determining a trigger condition according to stage 704 of method 700) or the response sent at stage 904 for the method 900 in FIG. 9.

Figure 16F:
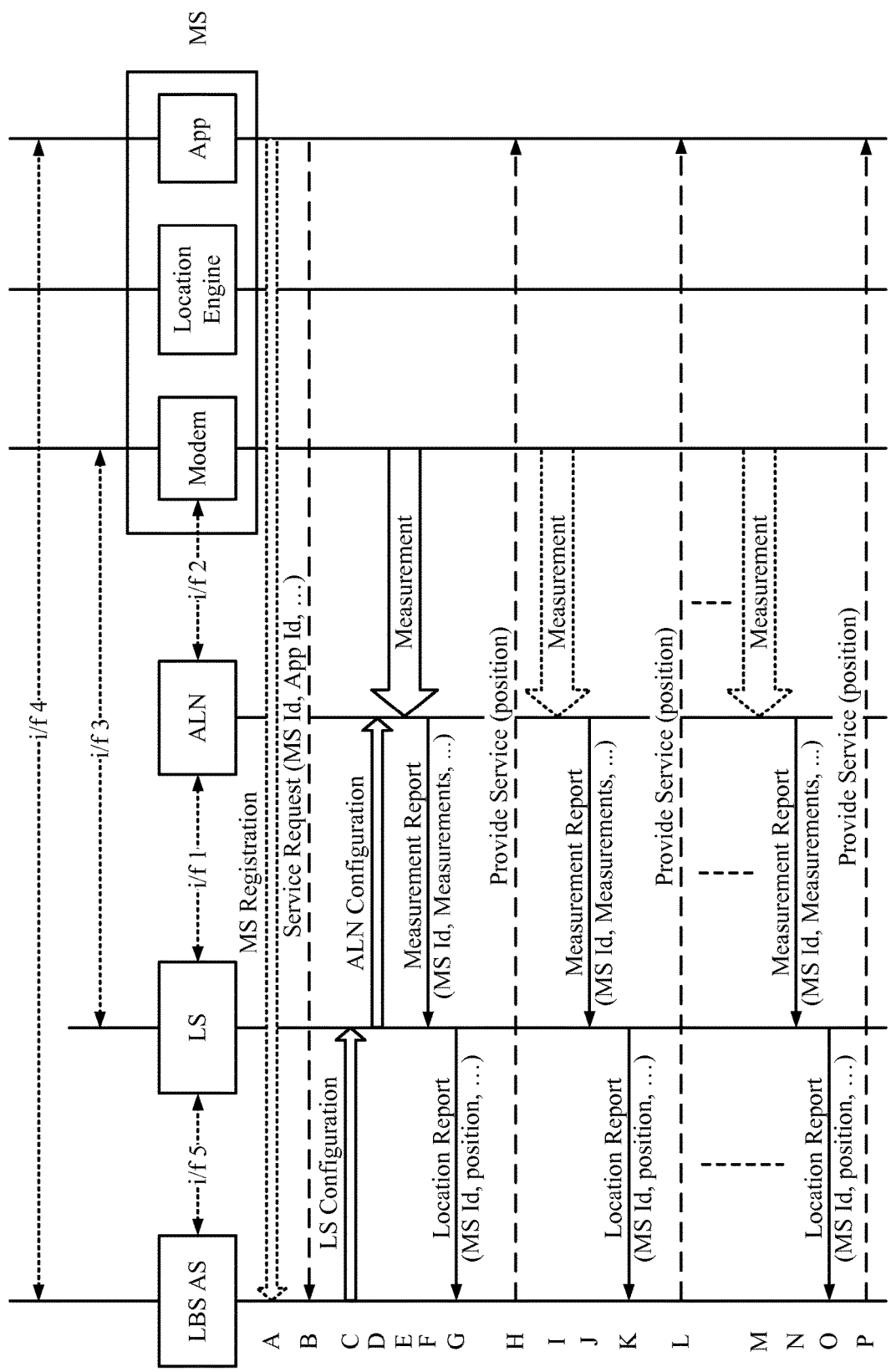

FIG. 16F is a message flow diagram of a process that may be used to implement the aforementioned use case 5 using a network-based positioning approach. At event A, an App on the MS may register with the LBS AS (in this case for asset tracking). At event B, the App may request asset tracking from the LBS AS and include identifiers of the MS and the App in its request. At event C, the LBS AS may transmit a request (e.g., LS Configuration message) for periodic position fixes for the MS to the LS. The request sent at event C may correspond to the request for location service sent at stage 802 for the method 800 in FIG. 8 or the request for location service sent at stage 1002 for the method 1000 in FIG. 10. At event D, the LS may transmit a request (e.g., ALN Configuration message) for periodic position fixes for the MS to the ALN. At event E, the ALN may perform access or location network measurements of the MS (e.g., measurements of signals transmitted by the MS). At event F, the ALN may send the access or location network measurements of the MS in a Measurement Report to the LS. At event G, the LS may calculate an estimated location of the MS based, at least in part, on the access or location network measurements received and send the position result to the LBS AS in a Location Report. The location report sent at event G may correspond to the response sent at stage 706 for the method 700 in FIG. 7 (e.g. as a consequence of the LS determining a trigger condition according to stage 704 of method 700) or the response sent at stage 904 for the method 900 in FIG. 9. At event H, the LBS AS may update an access tracking system with the MS's location (not shown). If the App on the MS is responsible for updating the asset tracking system with the MS's most recent position, the LBS AS may return the position result to the App on the MS at event H. Events I through L may comprise a repetition of events E through H, respectively, in which the position of the MS is obtained following some periodic time interval. Similarly, events M through P may comprise a repetition of events I through L, respectively, following a further periodic time interval. In a particular implementation, periodic positioning may be repeated until the end of an asset tracking session has been reached.

Figure 16G:
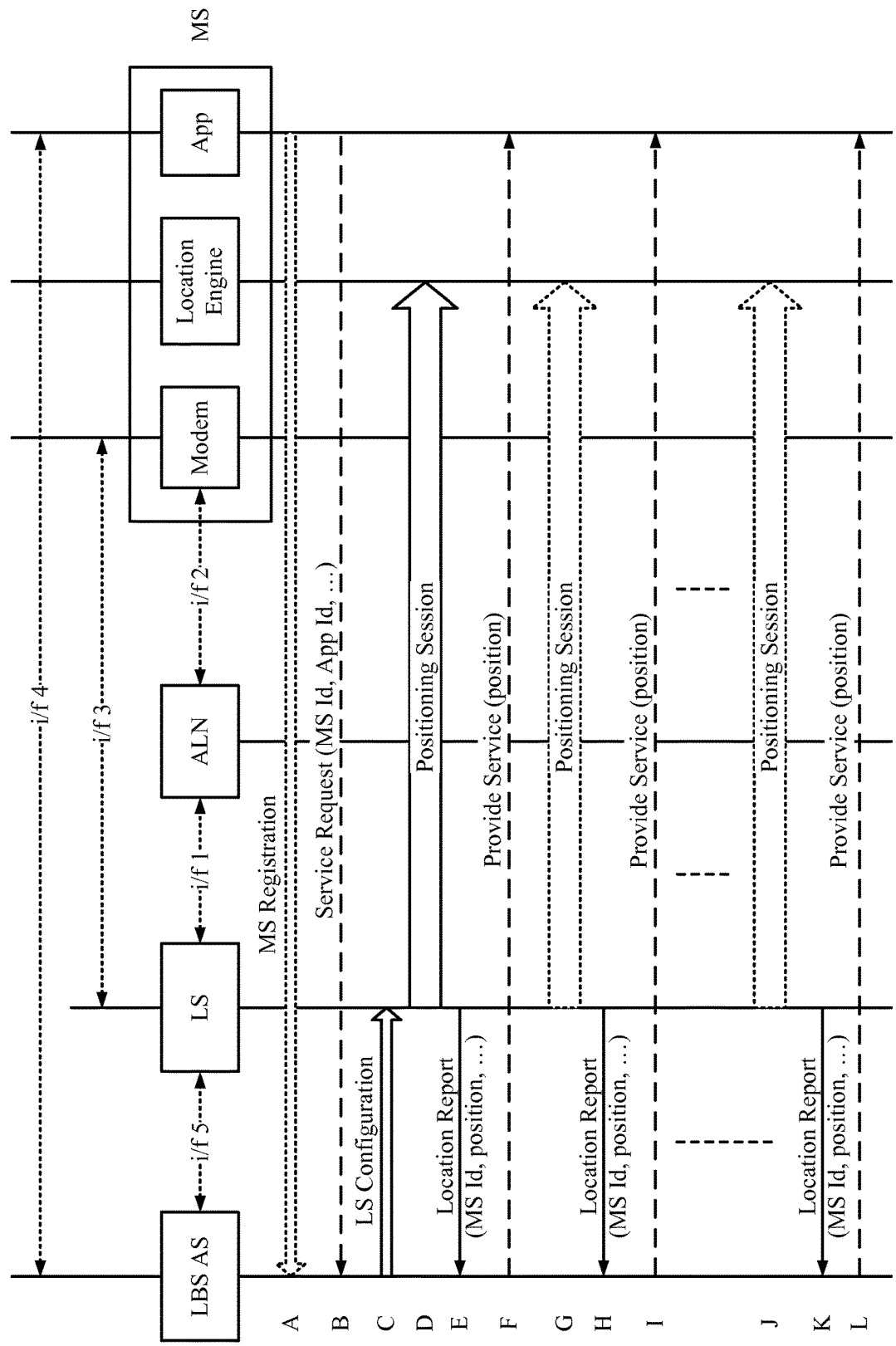

FIG. 16G is a message flow diagram of a process that may be used to implement the aforementioned use case 5 using mobile-based positioning. At event A, an App on the MS may register with an LBS AS (in this case for asset tracking). At event B, the App may request asset tracking from the LBS AS and include identifiers of the MS and App in its request. At event C, the LBS AS may send a request (e.g., LS Configuration message) for periodic position fixes for the MS to the LS. The request sent at event C may correspond to the request for location service sent at stage 802 for the method 800 in FIG. 8 or the request for location service sent at stage 1002 for the method 1000 in FIG. 10. At event D, the LS may instigate a positioning session (e.g. using SUPL) with a location engine on the MS at the end of which the LS may obtain the MS's position or estimated location. At event E, the LS may send the position result to the LBS AS in a Location Report. The location report sent at event E may correspond to the response sent at stage 706 for the method 700 in FIG. 7 (e.g. as a consequence of the LS determining a trigger condition according to stage 704 of method 700) or the response sent at stage 904 for the method 900 in FIG. 9. At event F, the LBS AS may update the access tracking system with the MS's location (not shown in FIG. 16G). If the App on the MS is responsible for updating the asset tracking system with the MS's most recent position, the LBS AS may return the position result to the App on the MS at event F. Events G through I may comprise a repetition of events D through F, respectively, following some periodic time interval. Events J through L may comprise a repetition of events G through I, respectively, following a further periodic time interval. Periodic positioning may be further repeated until the end of the asset tracking session has been reached.

Figure 16H:
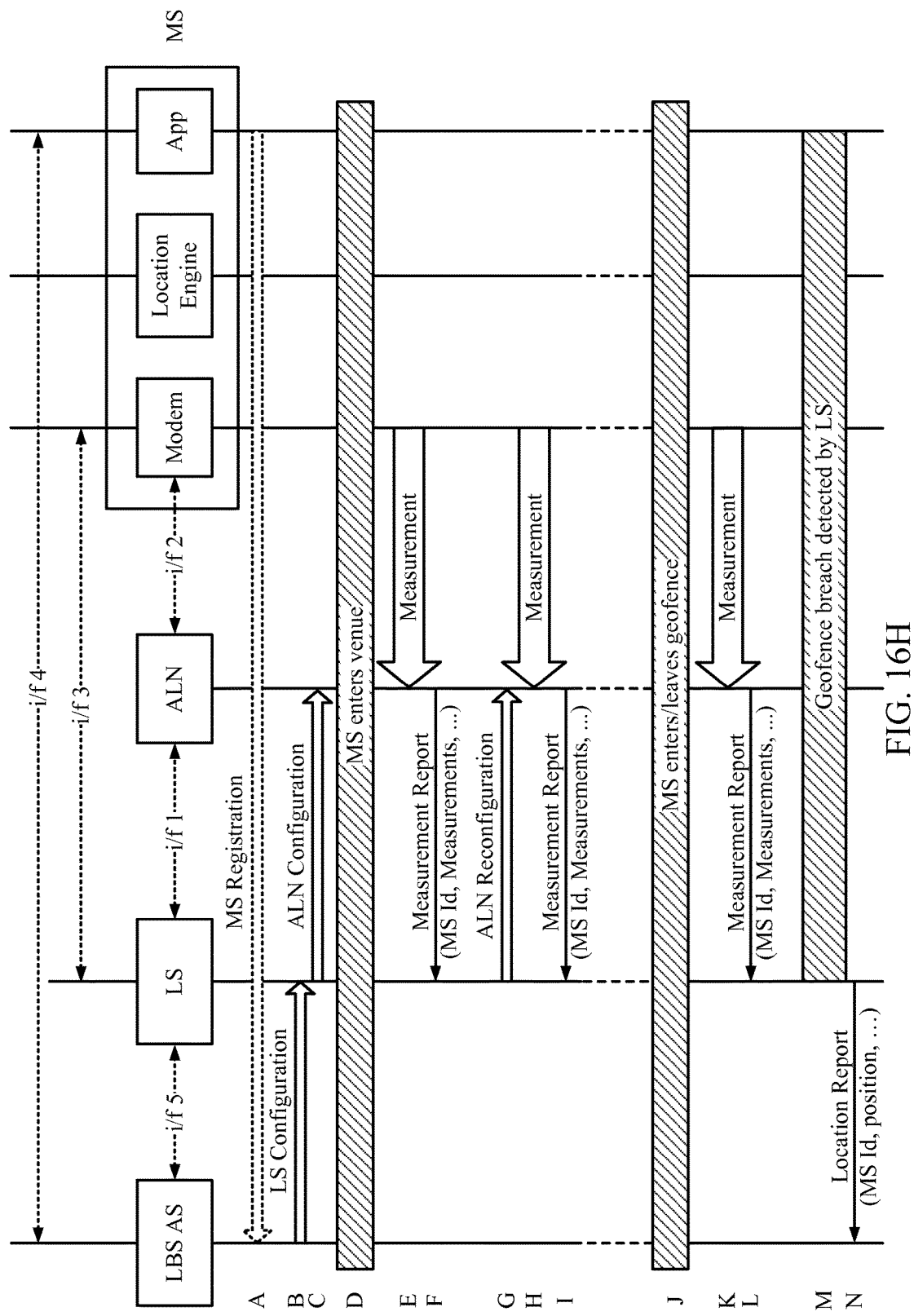

FIG. 16H is a message flow diagram of a process that may be used to implement the aforementioned use cases 6 or 7 using network-based positioning. At event A, an App on the MS may register with the LBS AS (in this case for support of an absolute or relative geofence) and may later send a service request to the LBS AS to instigate the geofence (not shown in FIG. 16H). At event B, the LBS AS may initiate the geofence by sending a request (e.g., LS Configuration message) for geofence positioning to the LS. The LBS AS may include a definition of the geofence (absolute or relative) and any relevant geofence parameters in its request (e.g. such as a request to report when the MS enters or leaves the geofence). The request sent at event B may correspond to the request for location service sent at stage 802 for the method 800 in FIG. 8 or the request for location service sent at stage 1002 for the method 1000 in FIG. 10. At event C, the LS may issue a detection request (e.g., ALN Configuration message) for the MS to the ALN. At event D, the MS may enter the venue. At event E, the ALN may detect a presence of the MS through access or location network measurements. At event F, the ALN may send the measurement results to the LS (e.g., Measurement Report) which may enable the LS to calculate the MS's position or estimated location. At event G, the LS may reconfigure the ALN to periodically obtain access or location network measurements of the MS. At event H, the ALN may perform access or location network measurements of the MS (e.g., measurements of signals transmitted by the MS). At event I, the ALN may send the measurement results to the LS based on which the LS may calculate the position or estimated location of the MS. Events H and I may be repeated to enable the LS to detect a geofence related event (e.g. such as the MS entering the geofence and/or leaving the geofence). At event J, the MS may breach the geofence by entry into or departure from an area bounded by the geofence. At event K, the ALN may perform access or location network measurements of the MS. At event L, the ALN may send measurement results to the LS based on which the LS may calculate a position of estimated location of the MS. At event M, the LS may detect that the geofence has been breached. At event N, the LS may inform the LBS AS that the geofence has been breached by sending a Location Report including the MS Id and the MS's position. The location report sent at event N may correspond to the response sent at stage 706 for the method 700 in FIG. 7 (e.g. as a consequence of the LS determining a trigger condition according to stage 704 of method 700) or the response sent at stage 904 for the method 900 in FIG. 9.

Figure 16I:
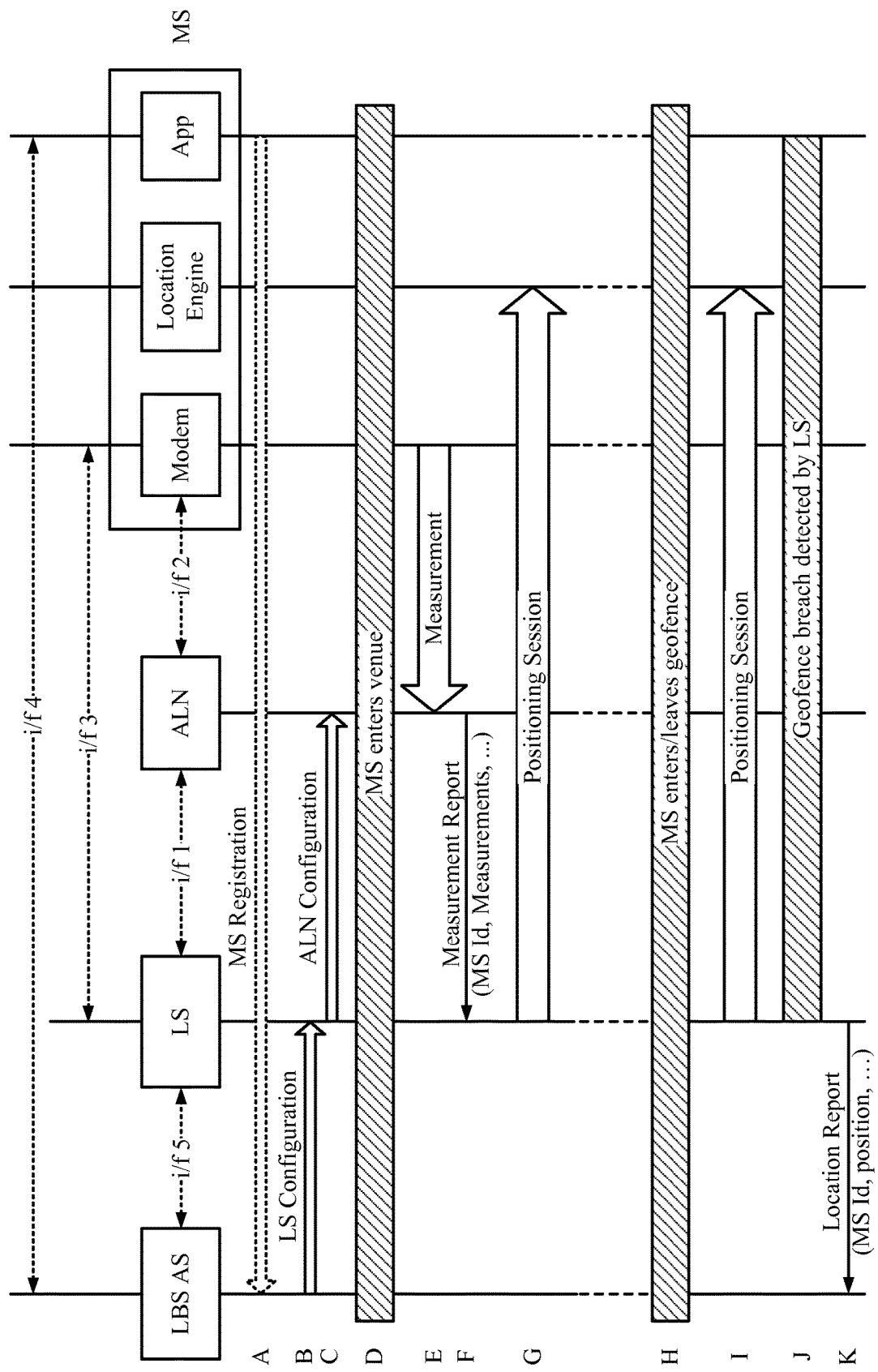

FIG. 16I is a message flow diagram a process that may be used to implement the aforementioned use cases 6 or 7 using mobile based positioning according to an embodiment. At event A, an App on the MS may register with the LBS AS (in this case for support of an absolute or relative geofence) and may later send a service request to the LBS AS to instigate the geofence (not shown in FIG. 16I). At event B, the LBS AS may initiate the geofence by transmitting a request (e.g., LS Configuration message) for geofence positioning to the LS. The LBS AS may include a definition of the geofence (absolute or relative) and any relevant geofence parameters in its request (e.g. such as a request to report when the MS enters or leaves the geofence). The request sent at event B may correspond to the request for location service sent at stage 802 for the method 800 in FIG. 8 or the request for location service sent at stage 1002 for the method 1000 in FIG. 10. At event C, the LS may issue a detection request (e.g., ALN Configuration message) for the MS to the ALN. At event D, the MS may enter the venue. At event E, the ALN may detect the presence of the MS through access or location network measurements. At event F, the ALN may send the measurement results to the LS (Measurement Report), which may enable the LS to calculate the MS's position or estimated location. At event G, the LS may commence a positioning session with a location engine on the MS (e.g. using SUPL) in mobile-centric mode in order to detect any geofence breach by the MS. The positioning session may simply deliver assistance data to the MS so that the MS can on its own detect any geofence breaches (a positioning session may also be used in order for the MS to report a geofence breach to the LS) or the positioning session may periodically calculate an estimated location or position of the MS and determine whether a geofence breach has occurred. The positioning session may use a network-initiated triggered SUPL session according to OMA SUPL version 2.0, 2.1 or 3.0. Positioning sessions may be conducted between the LS and the location engine on an as-needed basis and may form part of a single triggered positioning session in the case of SUPL. At event H, the MS may breach the geofence (entering or leaving). At event I, if the location engine on the MS detected the geofence breach on its own, a positioning session may be instigated by the location engine with the LS and used to report the geofence breach to the LS. Otherwise, the LS and the location engine on the MS may engage in a positioning session in order to detect at event J at the LS that the geofence has been breached. At event K, the LS may inform the LBS AS that the geofence has been breached by sending a Location Report including an identifier of the MS and the MS's position or estimated location. The location report sent at event K may correspond to the response sent at stage 706 for the method 700 in FIG. 7 (e.g. as a consequence of the LS determining a trigger condition according to stage 704 of method 700) or the response sent at stage 904 for the method 900 in FIG. 9.

Figure 16J:
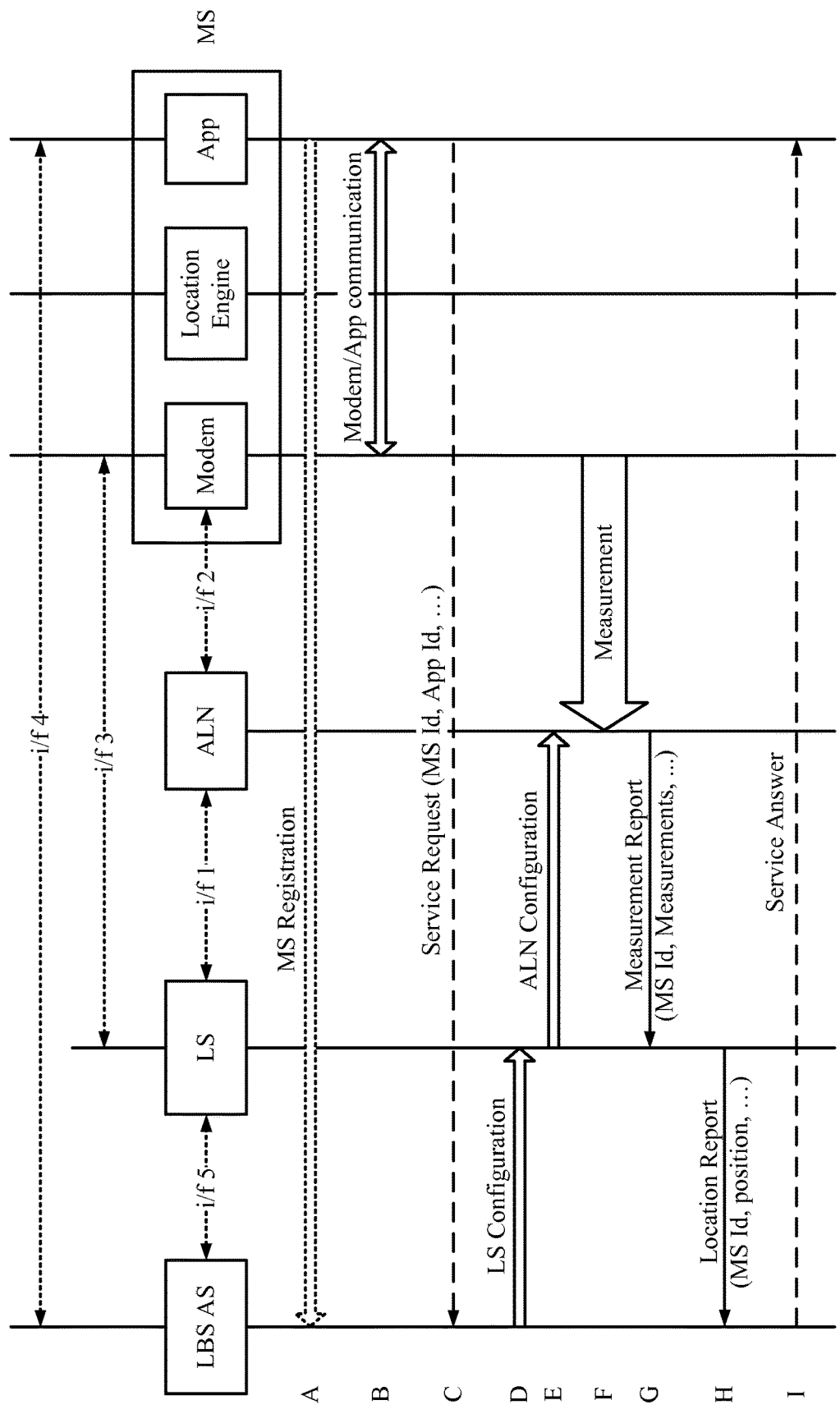

FIG. 16J is a message flow diagram of a process that may be used to implement the aforementioned use case 8 using network-based positioning. At event A, an App on the MS may register with the LBS AS (in this case for WLAN trouble shooting). At event B, a modem and App on the MS may communicate to register problems with a WLAN. At event C, the App on the MS may request estimation of a location of the MS to an LBS AS in order to locate the WLAN problem (e.g., may be possible as long as the MS can still establish a data connection to the LBS AS). At events D through H, a position or estimated location of the MS may be determined as discussed for example for events C through G in FIG. 16B. At event I, the LBS AS may send an acknowledgement (Service Answer) back to the App on the MS.

Figure 16K:
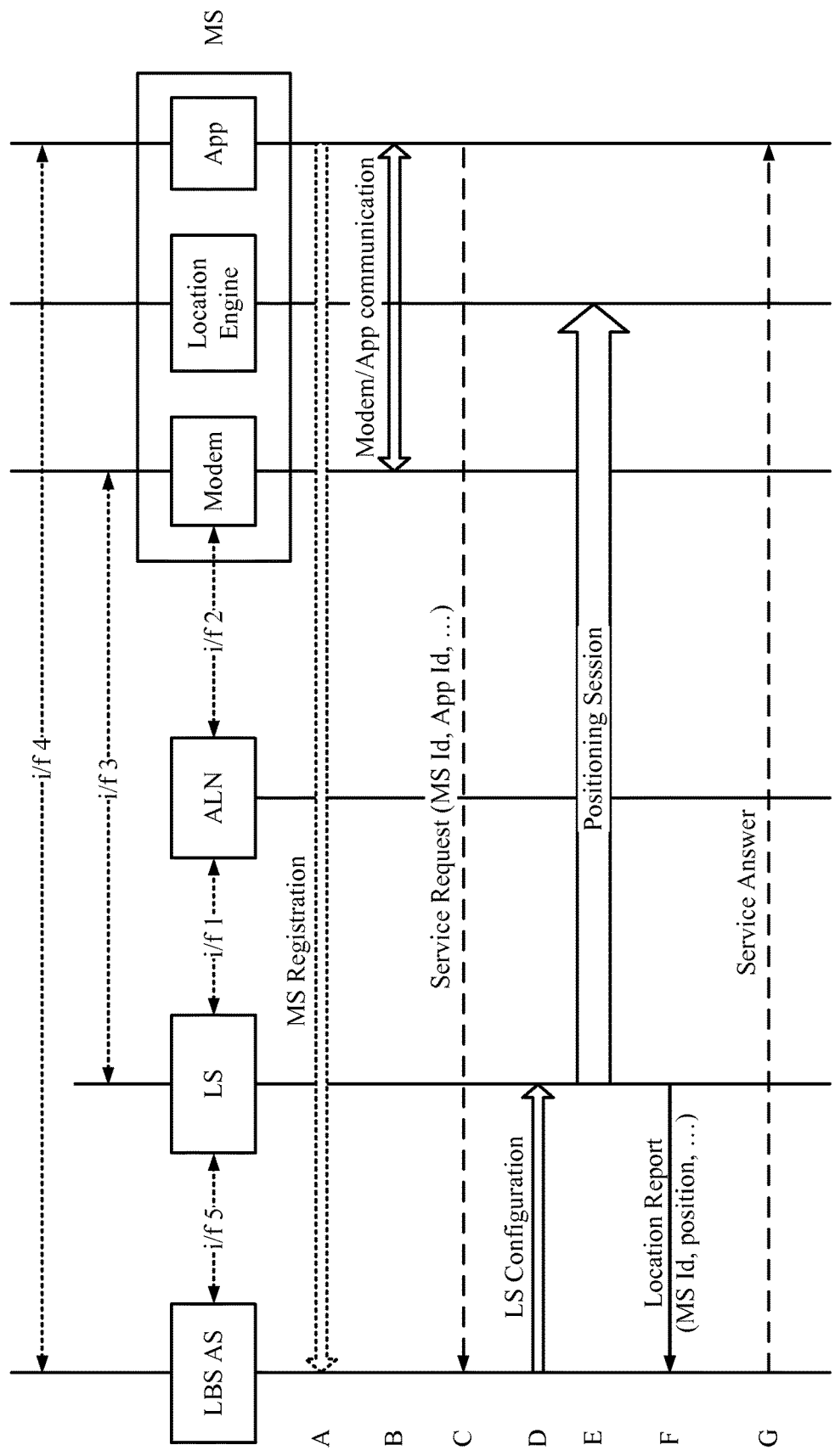

FIG. 16K is a message flow diagram of a process that may be used to implement the aforementioned use case 8 using mobile-based positioning. At event A, an App on an MS may register with an LBS AS (e.g., in this case for WLAN trouble shooting). At event B, the modem and App on the MS may communicate to register problems with the WLAN. At event C, the App on the MS may initiate determination at an LBS AS of a position or estimated location of the MS in order to locate the WLAN problem (e.g., possible as long as the MS can establish a data connection to the LBS AS). At events D through F a position or estimated location of the MS may be determined as described for example for events C through E in FIG. 16C. At event G, the LBS AS may send an acknowledgement (e.g., Service Answer) back to the App on the MS.

Figure 16L:
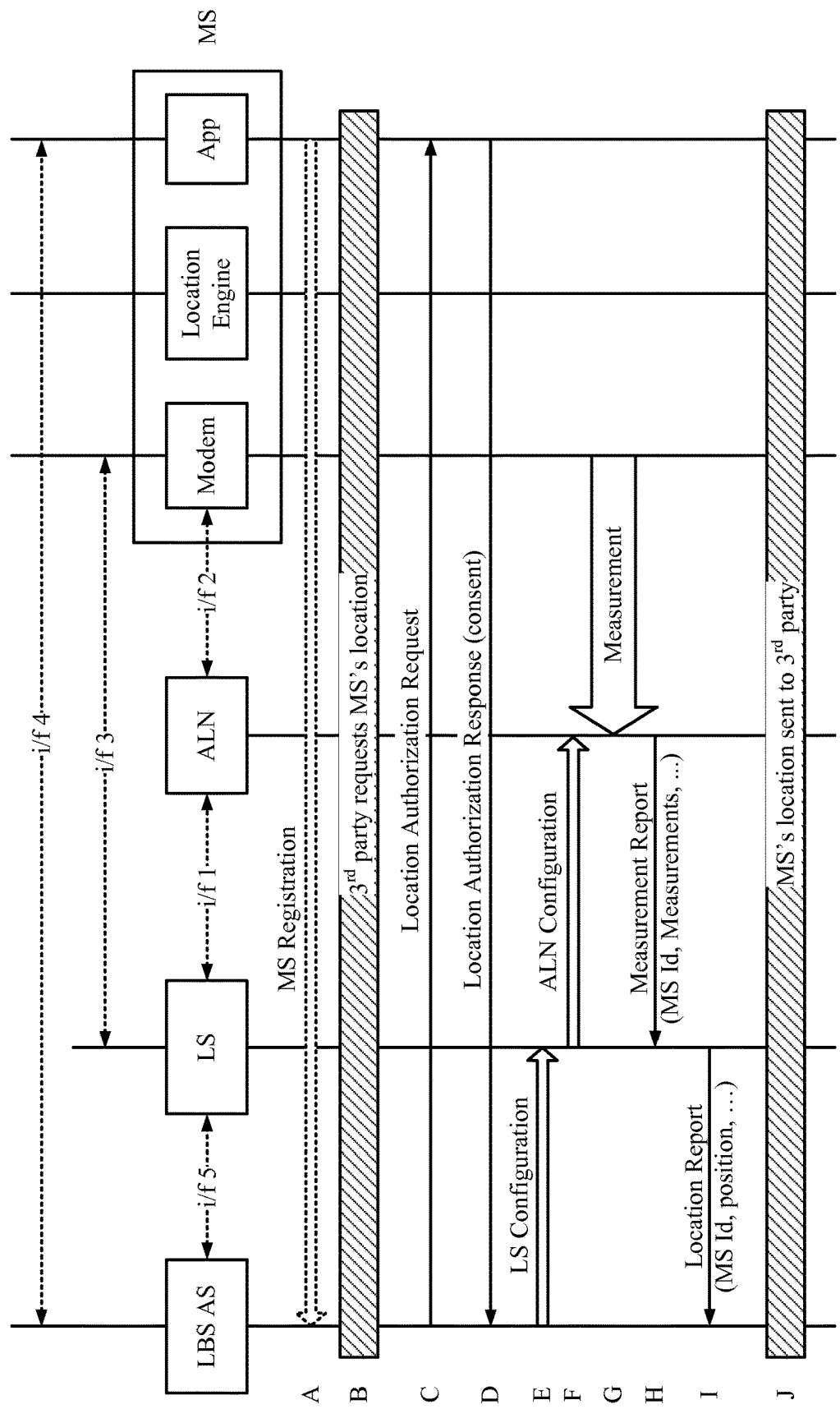

FIG. 16L is a message flow diagram of a process that may be used to implement the aforementioned use case 9 using network-based positioning. At event A, an App on an MS may register with an LBS AS (e.g., for a third-party location in this particular example). At event B, a third party may request the LBS AS for a position or estimated location of the MS. At event C, the LBS AS may request consent from the user (via the App) to provide the position of the user to the requesting third party. At event D, the user may give consent (via the App) to having the user's position or estimated location being determined on behalf of the third party. At events E through I, an estimated location or position of an MS may be determined as described for events C through G in FIG. 16B. At event J, the LBS AS may send a computed position or estimated location for the MS to the third party.

Figure 16M:
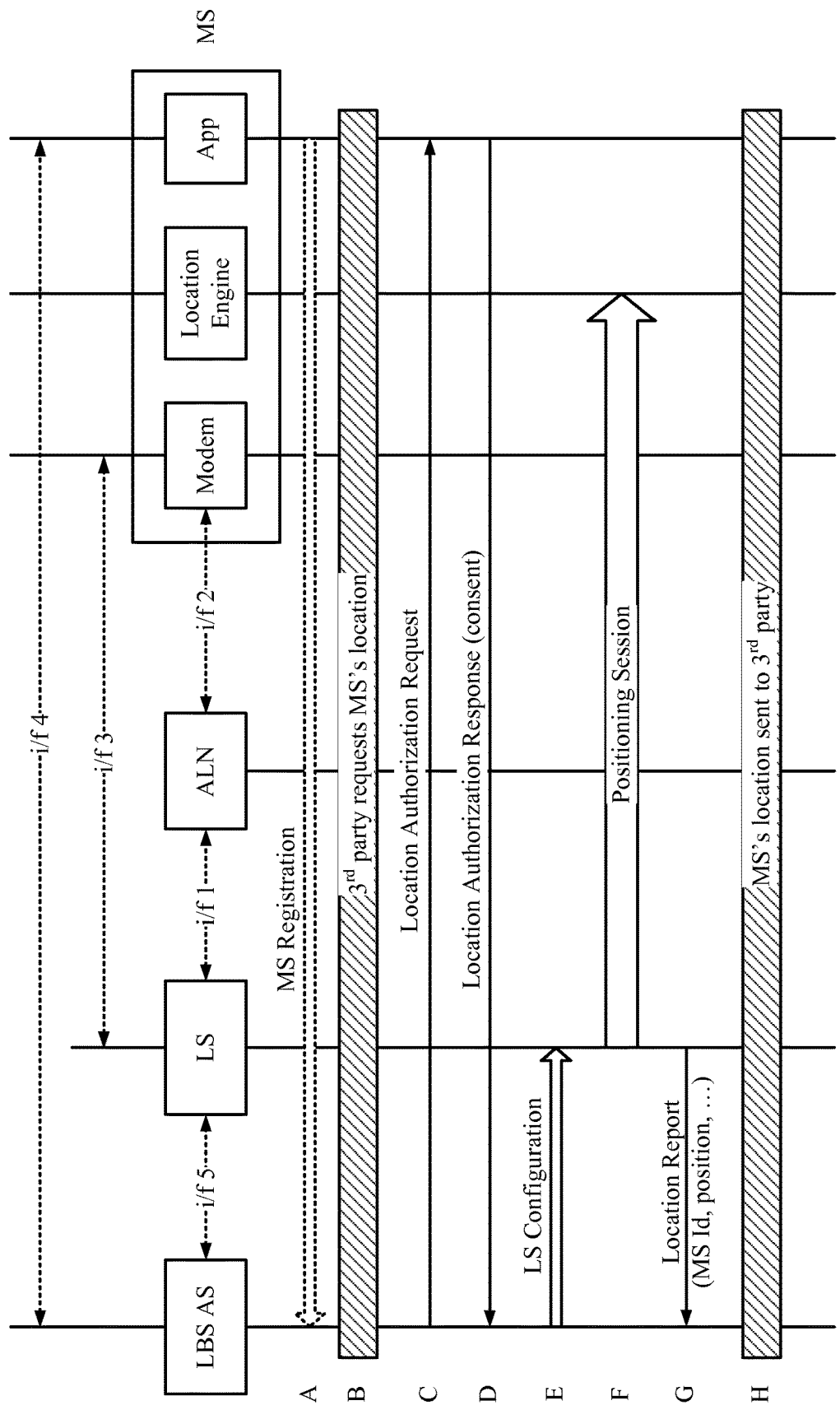

FIG. 16M is a message flow diagram of a process that may be used to implement the aforementioned use case 9 using mobile-based positioning. At event A, an App on an MS may register with an LBS AS (in this case for a third party location). At event B, a third party may request the LBS AS for a position or estimated location of the MS. At event C, the LBS AS may request consent from the user via the App. At event D, the user may give consent via the App to being located on behalf of the requesting third party. At events E through G, a position or estimated location of the MS may be determined as described for events C through E in FIG. 16C. At event H, the LBS AS may send a position or estimated location of the MS to the requesting third party.

Example Devices and Systems

Figure 17:
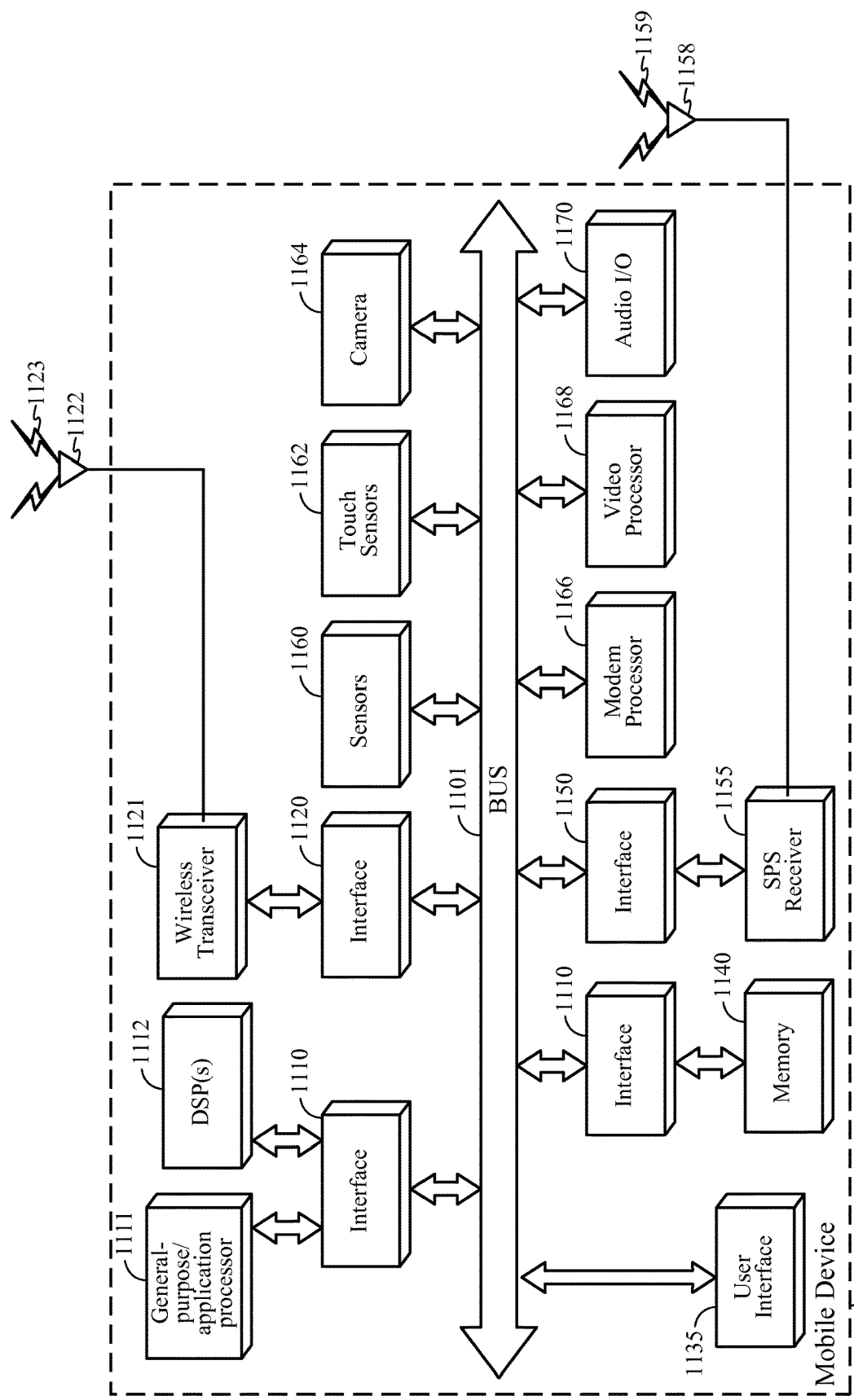
FIG. 17 is a schematic block diagram illustrating an exemplary device.

FIG. 17 is a schematic diagram of an example of a mobile device (e.g. mobile device 204). Mobile device 100 (FIG. 1A) may comprise one or more features of mobile device 1100 shown in FIG. 17. In certain embodiments, mobile device 1100 may also comprise a wireless transceiver 1121 which is capable of transmitting and receiving wireless signals 1123 via wireless antenna 1122 over a wireless communication network. Wireless transceiver 1121 may be connected to bus 1101 by a wireless transceiver bus interface 1120. Wireless transceiver bus interface 1120 may, in some embodiments, be at least partially integrated with wireless transceiver 1121. Some embodiments may include multiple wireless transceivers 1121 and wireless antennas 1122 to enable transmitting and/or receiving signals according to corresponding multiple wireless communication standards such as, for example, versions of IEEE Std. 802.11, CDMA, WCDMA, LTE, UMTS, GSM, AMPS, Zigbee and Bluetooth.

Mobile device 1100 may also comprise SPS receiver 1155 capable of receiving and acquiring SPS signals 1159 via SPS antenna 1158. SPS receiver 1155 may also process, in whole or in part, acquired SPS signals 1159 for estimating a location of mobile device 1000. In some embodiments, general-purpose processor(s) 1111, memory 1140, DSP(s) 1112 and/or specialized processors (not shown) may also be utilized to process acquired SPS signals, in whole or in part, and/or calculate an estimated location of mobile device 1100, in conjunction with SPS receiver 1155. Storage of SPS or other signals (e.g., signals acquired from wireless transceiver 1121) for use in performing positioning operations may be performed in memory 1140 or registers (not shown). As such, general-purpose processor(s) 1111, memory 1140, DSP(s) 1112 and/or specialized processors may provide a location engine for use in processing measurements to estimate a location of mobile device 1100.

Also shown in FIG. 17, mobile device 1100 may comprise digital signal processor(s) (DSP(s)) 1112 connected to a bus 1101 by a bus interface 1110, general-purpose processor(s) 1111 connected to the bus 1101 by the bus interface 1110 and memory 1140. Bus interface 1110 may be integrated with the DSP(s) 1112, general-purpose processor(s) 1111 and memory 1140. In various embodiments, functions may be performed in response to execution of one or more machine-readable instructions stored in memory 1140 such as on a computer-readable storage medium, such as RAM, ROM, FLASH, or disc drive. The one or more instructions may be executable by general-purpose processor(s) 1111, specialized processors, or DSP(s) 1112. Memory 1140 may comprise a non-transitory processor-readable memory and/or a computer-readable memory that stores software code (programming code, instructions, etc.) that are executable by processor(s) 1111 and/or DSP(s) 1112, and/or other processor(s) to perform functions described herein.

Also shown in FIG. 17, a user interface 1135 may comprise any one of several devices such as, for example, a speaker, a microphone, a display device, a vibration device, a keyboard, and/or a touch screen. In a particular implementation, user interface 1135 may enable a user to interact with one or more applications hosted on mobile device 1100. For example, devices of user interface 1135 may store analog or digital signals on memory 1140 to be further processed by DSP(s) 1112 or general purpose processor 1111 in response to action from a user. Similarly, applications hosted on mobile device 1100 may store analog or digital signals on memory 1140 to present an output signal to a user. In another implementation, mobile device 1100 may optionally include a dedicated audio input/output (I/O) device 1170 comprising, for example, a dedicated speaker, microphone, digital-to-analog circuitry, analog-to-digital circuitry, amplifiers and/or gain control. This, however, is merely an example of how an audio I/O may be implemented in a mobile device, and claimed subject matter is not limited in this respect. Mobile device 1100 may comprise touch sensors 1162 responsive to touching or pressure on a keyboard or touch screen device.

Mobile device 1100 may also comprise a dedicated camera device 1164 for capturing still or moving imagery. Camera device 1164 may comprise, for example, an imaging sensor (e.g., charge coupled device or CMOS imager), lens, analog to digital circuitry, and frame buffers. Additional processing, conditioning, encoding or compression of signals representing captured images may be performed at general purpose/application processor 1111 or DSP(s) 1112. A dedicated video processor 1168 may perform conditioning, encoding, compression or manipulation of signals representing captured images. A video processor 1168 may decode/decompress stored image data for presentation on a display device (not shown) on mobile device 1100.

Mobile device 1100 may also comprise sensors 1160 coupled to bus 1101 which may include, for example, inertial sensors and environment sensors that may enable mobile device 1100 to determine relative changes in location and/or current speed and heading. Inertial sensors of sensors 1160 may comprise, for example accelerometers (e.g., collectively responding to acceleration of mobile device 1100 in three dimensions), one or more gyroscopes or one or more magnetometers (e.g., to support one or more compass applications). Environment sensors of mobile device 1100 may comprise, for example, temperature sensors, barometric pressure sensors, ambient light sensors, camera imagers, or microphones. Sensors 1160 may generate analog or digital signals that may be stored in memory 1140 and processed by DPS(s) or general purpose application processor 1111 in support of one or more applications such as, for example, applications directed to positioning or navigation operations.

In a particular implementation, a digital map of an indoor area may be stored in a particular format in memory 1140. The digital map may have been obtained from messages containing navigation assistance data from a remote server. General purpose/application processor 1111 may execute instructions to process the stored digital map to identify and classify component areas bounded by a perimeter of structures indicated in the digital map. As pointed out above, these executed instructions may specify identifying and characterizing egress segments in structures forming a perimeter bounding a component area and classifying the bounded component area based, at least in part, on a proportionality of a size of at least one identified egress segment to a size of at least one dimension of the bounded component area. A mobile device may further apply crowd-sourced data (e.g., obtained from a location server) to confirm an inference of an egress segment. For example, if there is a history of mobile devices moving through a feature presumed to be an egress segment, the feature may be confirmed as providing an egress segment.

In a particular implementation, mobile device 1100 may comprise a dedicated modem processor 1166 capable of performing baseband processing of signals received and down-converted at wireless transceiver 1121 or SPS receiver 1155. Similarly, modem processor 1166 may perform baseband processing of signals to be up-converted for transmission by wireless transceiver 1121. In alternative implementations, instead of having a dedicated modem processor, baseband processing may be performed by a general purpose processor or DSP (e.g., general purpose/application processor 1111 or DSP(s) 1112). These, however, are merely examples of structures that may perform baseband processing, and claimed subject matter is not limited in this respect.

Figure 18:
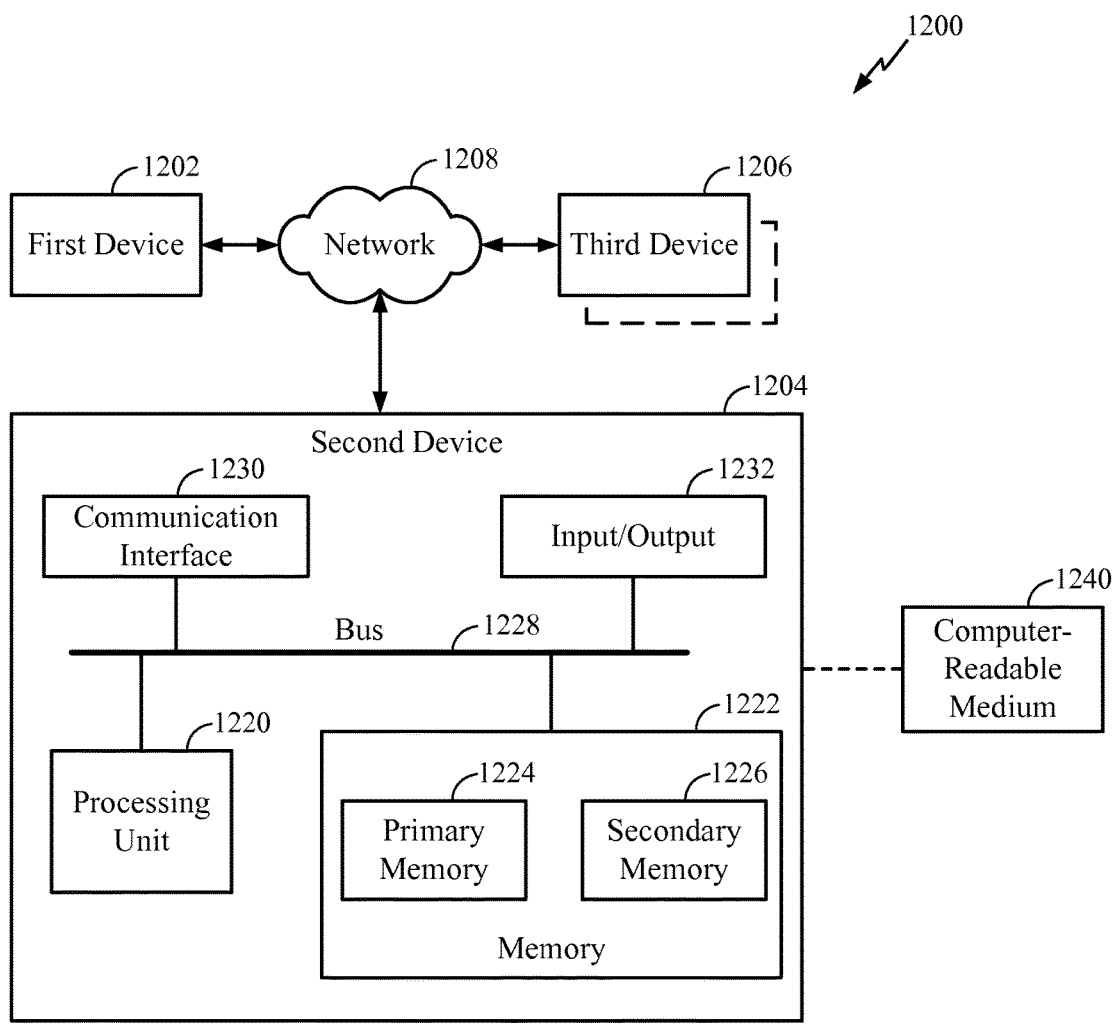
FIG. 18 is a schematic block diagram of an example computing platform.

FIG. 18 is a schematic diagram illustrating an example system 1200 that may include one or more devices configurable to implement techniques or processes described above, for example, in connection with FIG. 1A. System 1200 may include, for example, a first device 1202, a second device 1204, and a third device 1206, which may be operatively coupled together through a wireless communications network 1208. First device 1202 may comprise a server capable of providing positioning assistance data such as, for example, a base station almanac. Wireless communications network 1208 may comprise one or more wireless access points, for example. However, claimed subject matter is not limited in scope in these respects.

First device 1202, second device 1204 and third device 1206, as shown in FIG. 18, may be representative of any device, appliance or machine (e.g., such as local transceiver 115, servers 140, 150 or 155 as shown in FIG. 1A or LS 206, LBS AS 212, ALN DB 208, Map DB 210 and/or one or more APs or Femto cells in ALN 202 as shown in FIG. 1B) that may be configurable to exchange data over wireless communications network 1208. By way of example but not limitation, any of first device 1202, second device 1204, or third device 1206 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1202, 1204, and 1206, respectively, may comprise one or more of a base station almanac server, a base station, or a mobile device in accordance with the examples described herein.

Similarly, wireless communications network 1208 (e.g., in a particular of implementation of network 130 shown in FIG. 1A), may be representative of one or more communication links, processes, or resources configurable to support the exchange of data between at least two of first device 1202, second device 1204, and third device 1206. By way of example but not limitation, wireless communications network 1208 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured by third device 1206, there may be additional like devices operatively coupled to wireless communications network 1208.

All or part of the various devices and networks shown in system 1200, and the processes and methods as further described herein, may be implemented using or otherwise including hardware, firmware, software, or any combination thereof.

Thus, by way of example but not limitation, second device 1204 may include at least one processing unit 1220 that is operatively coupled to a memory 1222 through a bus 1228.

Processing unit 1220 is representative of one or more circuits configurable to perform at least a portion of a data computing procedure or process. By way of example but not limitation, processing unit 1220 may include one or more processors, controllers, microprocessors, microcontrollers, application specific integrated circuits, digital signal processors, programmable logic devices, field programmable gate arrays, and the like, or any combination thereof.

Memory 1222 is representative of any data storage mechanism. Memory 1222 may include, for example, a primary memory 1224 or a secondary memory 1226. Primary memory 1224 may include, for example, a random access memory, read only memory, etc. While illustrated in this example as being separate from processing unit 1220, all or part of primary memory 1224 may be provided within or otherwise co-located/coupled with processing unit 1220.

In a particular implementation, a digital map of an indoor area may be stored in a particular format in memory 1222. Processing unit 1220 may execute instructions to processes the stored digital map to identify and classify component areas bounded by a perimeter of structures indicated in the digital map. As pointed out above, these executed instructions may specify identifying and characterizing egress segments in structures forming a perimeter bounding a component area and classifying the bounded component area based, at least in part, on a proportionality of a size of at least one identified egress segment to a size of at least one dimension of the bounded component area.

Secondary memory 1226 may include, for example, the same or similar type of memory as primary memory or one or more data storage devices or systems, such as, for example, a disk drive, an optical disc drive, a tape drive, a solid state memory drive, etc. In certain implementations, secondary memory 1226 may be operatively receptive of, or otherwise configurable to couple to, a computer-readable medium 1240. Computer-readable medium 1240 may include, for example, any non-transitory medium that can carry or make accessible data, code or instructions for one or more of the devices in system 1200. Computer-readable medium 1240 may also be referred to as a storage medium.

Second device 1204 may include, for example, a communication interface 1230 that provides for or otherwise supports the operative coupling of second device 1204 to at least wireless communications network 1208. By way of example but not limitation, communication interface 1230 may include a network interface device or card, a modem, a router, a switch, a transceiver (e.g., a wired transceiver and/or a wireless transceiver including one or more antennas), and the like.

Second device 1204 may include, for example, an input/output device 1232. Input/output device 1232 is representative of one or more devices or features that may be configurable to accept or otherwise introduce human or machine inputs, or one or more devices or features that may be configurable to deliver or otherwise provide for human or machine outputs. By way of example but not limitation, input/output device 1232 may include an operatively configured display, speaker, keyboard, mouse, trackball, touch screen, data port, etc.

As mentioned above, second device 1204 may be a location server (e.g., LS 206) or a location services client such as a location based services application server (e.g. LBS AS 212). In either case, processing unit 1220 (which may be referred to as a processor) either alone or in combination with memory 1222 may comprise a processor configured to perform functions as described herein. For example, instructions stored in memory 1222 may be configured to cause processing unit 1220 to perform functions as described—for example functions to support the method 900 of FIG. 9 or the method 1000 of FIG. 10. Further, processing unit 1220 either alone or in combination with memory 1222 may comprise means for determining a response to a location service request including means for determining an analytics report as discussed above. Further still, communication interface 1230 and processing unit 1220 either alone or in combination with memory 1222 may comprise means for sending a location service request, means for sending a location service response, means for receiving a location service request, or means for receiving a location service response.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, microcontrollers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special-purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. All of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000 or Wideband-CDMA ("W-CDMA"). Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

A wireless transmitter or access point may comprise a femto cell, utilized to extend cellular telephone service into a business or home. In such an implementation, one or more mobile devices may communicate with a femto cell via a code division multiple access ("CDMA") cellular communication protocol, for example, and the femto cell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites," or a combination of SVs (satellite vehicles) and such terrestrial transmitters. Terrestrial transmitters may, for example, include ground-based transmitters that broadcast a PN code (pseudo noise code) or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, includes terrestrial transmitters acting as pseudolites, equivalents of pseudolites, and possibly others. The terms "SPS signals" and/or "SV signals," as used herein, include SPS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, means A, B, and C, here used in the inclusive sense, as well as A, B or C, here used in the exclusive sense. Reference throughout this specification to "one example" or "an example" means that a particular feature, structure, or characteristic described in connection with the example may be included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, various other modifications may be made, and equivalents may be substituted, without departing from claimed subject matter. Additionally, many modifications may be made to adapt a particular situation to the teachings of claimed subject matter without departing from the central concept described herein. Therefore, claimed subject matter is not limited to the particular examples disclosed, but that such claimed subject matter may also include all aspects falling within the scope of the appended claims, and equivalents thereof.

Example embodiments may include one or more of the following.

1. A location server comprising:
means for receiving a request for location service, wherein the request for location service comprises at least one of a first identification of at least one mobile device or an identification of a target area; and
means for sending a response, wherein the response comprises at least one of a second identification of at least one mobile device or an identification of a geographic area;
wherein at least one of the first identification of at least one mobile device, the second identification of at least one mobile device, the identification of the target area, or the identification of the geographic area comprises a venue-specific identification.

2. The location server of claim 1, wherein the identification of the target area or the identification of the geographic area comprises the venue-specific identification and the venue-specific identification comprises a civic location.

3. The location server of claim 2, wherein the civic location comprises a venue-specific portion and a global portion.

4. The location server of claim 1, wherein at least one of the first identification of at least one mobile device or the second identification of at least one mobile device comprises the venue-specific identification and the venue-specific identification comprises a venue-specific name.

5. The location server of claim 4, wherein the venue-specific name identifies an individual mobile device or a group of mobile devices.

6. The location server of claim 1, wherein the means for sending is further for sending an analytics report comprising at least one of a starting number of mobile devices, a number of entering mobile devices, a number of leaving mobile devices, a mean number of mobile devices, or a mean dwell time.

7. The location server of claim 1, wherein the request for location service and the response comprise messages for the Mobile Location Protocol (MLP) of the Open Mobile Alliance (OMA).

8. A processor-readable storage medium storing processor-readable instructions configured to cause a processor to:
receive a request for location service from a location services client; and
send a response toward the location services client;
wherein the request for location service comprises at least one of a first identification of at least one mobile device or an identification of a target area;
wherein the response comprises at least one of a second identification of at least one mobile device or an identification of a geographic area; and
wherein at least one of the first identification of at least one mobile device, the second identification of at least one mobile device, the identification of the target area, or the identification of the geographic area comprises a venue-specific identification.

9. The processor-readable storage medium of claim 8, wherein the identification of the target area or the identification of the geographic area comprises the venue-specific identification and the venue-specific identification comprises a civic location.

10. The processor-readable storage medium of claim 9, wherein the civic location comprises a venue-specific portion and a global portion.

11. The processor-readable storage medium of claim 8, wherein at least one of the first identification of at least one mobile device or the second identification of at least one mobile device comprises the venue-specific identification and the venue-specific identification comprises a venue-specific name.

12. The processor-readable storage medium of claim 11, wherein the venue-specific name identifies an individual mobile device or a group of mobile devices.

13. The processor-readable storage medium of claim 8, further comprising instructions configured to cause the processor to prepare and send an analytics report toward the location services client through the transceiver, the analytics report comprising at least one of a starting number of mobile devices, a number of entering mobile devices, a number of leaving mobile devices, a mean number of mobile devices, or a mean dwell time.

14. The processor-readable storage medium of claim 8, wherein the request for location service and the response comprise messages for the Mobile Location Protocol (MLP) of the Open Mobile Alliance (OMA).

15. A location services client comprising:
means for sending a request for location service, wherein the request for location service comprises at least one of a first identification of at least one mobile device or an identification of a target area;
means for receiving a response, wherein the response comprises at least one of second identification of at least one mobile device or an identification of a geographic area; and
means for providing a location service using the response;
wherein at least one of the first identification of at least one mobile device, the second identification of at least one mobile device, the identification of the target area, or the identification of the geographic area comprises a venue-specific identification.

16. The location services client of claim 15, wherein the identification of the target area or the identification of the geographic area comprises the venue-specific identification and the venue-specific identification comprises a civic location.

17. The location services client of claim 16, wherein the civic location comprises a venue-specific portion and a global portion.

18. The location services client of claim 15, wherein at least one of the first identification of at least one mobile device or the second identification of at least one mobile device comprises the venue-specific identification and the venue-specific identification comprises a venue-specific name.

19. The location services client of claim 18, wherein the venue-specific name identifies an individual mobile device or a group of mobile devices.

20. The location services client of claim 15, wherein the location services client is a location based services application server.

21. The location services client of claim 15, further comprising means for receiving an analytics report comprising at least one of a starting number of mobile devices, a number of entering mobile devices, a number of leaving mobile devices, a mean number of mobile devices, or a mean dwell time, wherein the means for providing the location service uses the analytics report to provide the location service.

22. The location services client of claim 15, wherein the request for location service and the response comprise messages for the Mobile Location Protocol (MLP) of the Open Mobile Alliance (OMA).

23. A processor-readable storage medium storing processor-readable instructions configured to cause a processor to:
send a request for location service toward a location server, wherein the request for location service comprises at least one of a first identification of at least one mobile device or an identification of a target area;
receive a response to the request from the location server, wherein the response comprises at least one of a second identification of at least one mobile device or an identification of a geographic area; and
provide a location service using the response;
wherein at least one of the first identification of at least one mobile device, the second identification of at least one mobile device, the identification of the target area, or the identification of the geographic area comprises a venue-specific identification.

24. The processor-readable storage medium of claim 23, wherein the identification of the target area or the identification of the geographic area comprises the venue-specific identification and the venue-specific identification comprises a civic location.

25. The processor-readable storage medium of claim 24, wherein the civic location comprises a venue-specific portion and a global portion.

26. The processor-readable storage medium of claim 23, wherein at least one of the first identification of at least one mobile device or the second identification of at least one mobile device comprises the venue-specific identification and the venue-specific identification comprises a venue-specific name.

27. The processor-readable storage medium of claim 26, wherein the venue-specific name identifies an individual mobile device or a group of mobile devices.

28. The processor-readable storage medium of claim 23, wherein the instructions configured to cause the processor to send the request and receive the response are configured to cause the processor to send the request and receive the response over interface 5 according to an In-Location Alliance architecture.

29. The processor-readable storage medium of claim 23, further comprising instructions configured to cause the processor to receive an analytics report, from the location server through the transceiver, comprising at least one of a starting number of mobile devices, a number of entering mobile devices, a number of leaving mobile devices, a mean number of mobile devices, or a mean dwell time, and wherein the instructions configured to cause the processor to provide the location service are configured to cause the processor to use the analytics report.

30. The processor-readable storage medium of claim 23, wherein the request for location service and the response comprise messages for the Mobile Location Protocol (MLP) of the Open Mobile Alliance (OMA).

31. A location server comprising:
means for receiving a request for location service for one or more mobile devices, wherein the request for location service comprises a trigger condition and at least one of a group condition or a persistence condition;
means for determining the occurrence of the trigger condition and the at least one of the group condition or the persistence condition; and
means for sending a response, wherein the response indicates the occurrence of the trigger condition and the at least one of the group condition or the persistence condition.

32. The location server of claim 31, wherein the one or more mobile devices comprises a plurality of mobile devices, and wherein the trigger condition combined with the group condition comprises a portion of the plurality of mobile devices entering a target area, leaving the target area, remaining within the target area, or remaining outside the target area.

33. The location server of claim 32, wherein the portion of the plurality of mobile devices is indicated by the group condition and comprises one of a minimum quantity of the plurality of mobile devices, a maximum quantity of the plurality of mobile devices, or all of the plurality of mobile devices.

34. The location server of claim 33, wherein the minimum quantity or the maximum quantity, whichever is used, is either an integer number or a percentage of the plurality of mobile devices.

35. The location server of claim 31, wherein the persistence condition comprises a minimum time period for continuous persistence of the trigger condition.

36. The location server of claim 31, wherein the response comprises at least one of an identity or a geographic location for at least one mobile device of the one or more mobile devices.

37. The location server of claim 31, wherein the request for location service and the response comprise messages for the Mobile Location Protocol (MLP) of the Open Mobile Alliance (OMA).

38. A processor-readable storage medium storing processor-readable instructions configured to cause a processor to:
receive, from a location services client, a request for location service for one or more mobile devices, wherein the request for location service comprises a trigger condition and at least one of a group condition or a persistence condition;
determine the occurrence of the trigger condition and the at least one of the group condition or the persistence condition; and
send a response toward the location services client, wherein the response indicates the occurrence of the trigger condition and the at least one of the group condition or the persistence condition.

39. The processor-readable storage medium of claim 38, wherein the one or more mobile devices comprises a plurality of mobile devices, and wherein the trigger condition combined with the group condition comprises a portion of the plurality of mobile devices entering a target area, leaving the target area, remaining within the target area, or remaining outside the target area.

40. The processor-readable storage medium of claim 39, wherein the portion of the plurality of mobile devices is indicated by the group condition and comprises one of a minimum quantity of the plurality of mobile devices, a maximum quantity of the plurality of mobile devices, or all of the plurality of mobile devices.

41. The processor-readable storage medium of claim 40, wherein the minimum quantity or the maximum quantity, whichever is used, is either an integer number or a percentage of the plurality of mobile devices.

42. The processor-readable storage medium of claim 38, wherein the persistence condition comprises a minimum time period for continuous persistence of the trigger condition.

43. The processor-readable storage medium of claim 38, wherein the response comprises at least one of an identity or a geographic location for at least one mobile device of the one or more mobile devices.

44. The processor-readable storage medium of claim 38, wherein the request for location service and the response comprise messages for the Mobile Location Protocol (MLP) of the Open Mobile Alliance (OMA).

45. A location services client comprising:
means for sending a request for location service for one or more mobile devices, wherein the request for location service comprises a trigger condition and at least one of a group condition or a persistence condition;
means for receiving a response to the request, wherein the response indicates the occurrence of the trigger condition and the at least one of the group condition or the persistence condition; and means for providing a location service using the response.

46. The location services client of claim 45, wherein the one or more mobile devices comprises a plurality of mobile devices, and wherein the trigger condition combined with the group condition comprises a portion of the plurality of mobile devices entering a target area, leaving the target area, remaining within the target area, or remaining outside the target area.

47. The location services client of claim 46, wherein the portion of the plurality of mobile devices is indicated by the group condition and comprises one of a minimum quantity of the plurality of mobile devices, a maximum quantity of the plurality of mobile devices, or all of the plurality of mobile devices.

48. The location services client of claim 47, wherein the minimum quantity or the maximum quantity, whichever is used, is either an integer number or a percentage of the plurality of mobile devices.

49. The location services client of claim 45, wherein the persistence condition comprises a minimum time period for continuous persistence of the trigger condition.

50. The location services client of claim 45, wherein the response comprises at least one of an identity or a geographic location for at least one mobile device of the one or more mobile devices.

51. The location services client of claim 45, wherein the location services client is a location based services application server.

52. The location services client of claim 45, wherein the request for location service and the response comprise messages for the Mobile Location Protocol (MLP) of the Open Mobile Alliance (OMA).

53. A processor-readable storage medium storing processor-readable instructions configured to cause a processor to:
send, toward a location server, a request for location service for one or more mobile devices, wherein the request for location service comprises a trigger condition and at least one of a group condition or a persistence condition;
receive, from the location server, a response to the request through the transceiver, wherein the response indicates the occurrence of the trigger condition and the at least one of the group condition or the persistence condition; and
provide a location service using the response.

54. The processor-readable storage medium of claim 53, wherein the one or more mobile devices comprises a plurality of mobile devices, and wherein the trigger condition combined with the group condition comprises a portion of the plurality of mobile devices entering a target area, leaving the target area, remaining within the target area, or remaining outside the target area.

55. The processor-readable storage medium of claim 54, wherein the portion of the plurality of mobile devices is indicated by the group condition and comprises one of a minimum quantity of the plurality of mobile devices, a maximum quantity of the plurality of mobile devices, or all of the plurality of mobile devices.

56. The processor-readable storage medium of claim 55, wherein the minimum quantity or the maximum quantity, whichever is used, is either an integer number or a percentage of the plurality of mobile devices.

57. The processor-readable storage medium of claim 53, wherein the persistence condition comprises a minimum time period for continuous persistence of the trigger condition.

58. The processor-readable storage medium of claim 53, wherein the response comprises at least one of an identity or a geographic location for at least one mobile device of the one or more mobile devices.

59. The processor-readable storage medium of claim 53, wherein the instructions configured to cause the processor to send the request and receive the response are configured to cause the processor to send the request and receive the response over interface 5 according to an In-Location Alliance architecture.

60. The processor-readable storage medium of claim 53, wherein the request for location service and the response comprise messages for the Mobile Location Protocol (MLP) of the Open Mobile Alliance (OMA).

What is claimed is:

1. A method of providing location services at a location server, the method comprising:
receiving a request for location service for a plurality of mobile devices, wherein the request for location service comprises a trigger condition, a group condition, and a persistence condition, wherein the trigger condition comprises a target area and an event related to the target area wherein the group condition comprises an indication of a portion of the plurality of mobile devices to meet the trigger condition before the occurrence of the trigger condition will be reported, and wherein the persistence condition comprises a threshold time period for persistence of the trigger condition by the portion of the plurality of mobile devices;
determining the occurrence of the trigger condition, the group condition, and the persistence condition; and
sending a response, wherein the response indicates the occurrence of the trigger condition, the group condition, and the persistence condition.

2. The method of claim 1, the trigger condition combined with the group condition comprises the portion of the plurality of mobile devices remaining within the target area or remaining outside the target area.

3. The method of claim 2, wherein the portion of the plurality of mobile devices is indicated by the group condition and comprises one of a minimum quantity of the plurality of mobile devices, a maximum quantity of the plurality of mobile devices, or all of the plurality of mobile devices.

4. The method of claim 3, wherein the minimum quantity or the maximum quantity, whichever is used, is either an integer number or a percentage of the plurality of mobile devices.

5. The method of claim 1, wherein the response comprises at least one of an identity or a geographic location for at least one mobile device of the plurality of mobile devices.

6. The method of claim 1, wherein the request for location service and the response comprise messages for the Mobile Location Protocol (MLP) of the Open Mobile Alliance (OMA).

7. The method of claim 1, wherein:
the trigger condition comprises a first trigger condition and a second trigger condition, and
the persistence condition comprises a first persistence condition associated with the first trigger condition and a second persistence condition associated with the second trigger condition.

8. The method of claim 1, wherein the group condition identifies one or more particular mobile devices in the portion of the plurality of mobile devices.

9. A location server comprising:
a transceiver configured to send communications to, and receive communications from, a location services client; and
a processor communicatively coupled to the transceiver and configured to:
receive, from the location services client through the transceiver, a request for location service for a plurality of mobile devices, wherein the request for location service comprises a trigger condition, a group condition, and a persistence condition, wherein the trigger condition comprises a target area and an event related to the target area, wherein the group condition comprises an indication of a portion of the plurality of mobile devices that are required to meet the trigger condition before the occurrence of the trigger condition will be reported, and wherein the persistence condition comprises a threshold time period for persistence of the trigger condition by the portion of the plurality of mobile devices;
determine the occurrence of the trigger condition, the group condition, and the persistence condition; and
send a response toward the location services client through the transceiver, wherein the response indicates the occurrence of the trigger condition, the group condition, and the persistence condition.

10. The location server of claim 9, wherein the trigger condition combined with the group condition comprises the portion of the plurality of mobile devices remaining within the target area or remaining outside the target area.

11. The location server of claim 10, wherein the portion of the plurality of mobile devices is indicated by the group condition and comprises one of a minimum quantity of the plurality of mobile devices, a maximum quantity of the plurality of mobile devices, or all of the plurality of mobile devices.

12. The location server of claim 11, wherein the minimum quantity or the maximum quantity, whichever is used, is either an integer number or a percentage of the plurality of mobile devices.

13. The location server of claim 9, wherein the response comprises at least one of an identity and a geographic location for at least one mobile device of the plurality of mobile devices.

14. The location server of claim 9, wherein the request for location service and the response comprise messages for the Mobile Location Protocol (MLP) of the Open Mobile Alliance (OMA).

15. The location server of claim 9, wherein:
the trigger condition comprises a first trigger condition and a second trigger condition, and
the persistence condition comprises a first persistence condition associated with the first trigger condition and a second persistence condition associated with the second trigger condition.

16. A method of providing location services at a location services client, the method comprising:
sending a request for location service for a plurality of mobile devices, wherein the request for location service comprises a trigger condition, a group condition, and a persistence condition, wherein the trigger condition comprises a target area and an event related to the target area wherein the group condition comprises an indication of a portion of the plurality of mobile devices that are required to meet the trigger condition before the occurrence of the trigger condition will be reported, and wherein the persistence condition comprises a threshold time period for persistence of the trigger condition by the portion of the plurality of mobile devices;
receiving a response to the request, wherein the response indicates the occurrence of the trigger condition, the group condition, and the persistence condition; and
providing a location service using the response.

17. The method of claim 16, wherein the trigger condition combined with the group condition comprises a portion of the plurality of mobile devices remaining within the target area or remaining outside the target area.

18. The method of claim 17, wherein the portion of the plurality of mobile devices is indicated by the group condition and comprises one of a minimum quantity of the plurality of mobile devices, a maximum quantity of the plurality of mobile devices, or all of the plurality of mobile devices.

19. The method of claim 18, wherein the minimum quantity or the maximum quantity, whichever is used, is either an integer number or a percentage of the plurality of mobile devices.

20. The method of claim 16, wherein the response comprises at least one of an identity and a geographic location for at least one mobile device of the plurality of mobile devices.

21. The method of claim 16, wherein the location services client is a location based services application server.

22. The method of claim 16, wherein the request for location service and the response comprise messages for the Mobile Location Protocol (MLP) of the Open Mobile Alliance (OMA).

23. The method of claim 16, wherein:
the trigger condition comprises a first trigger condition and a second trigger condition, and
the persistence condition comprises a first persistence condition associated with the first trigger condition and a second persistence condition associated with the second trigger condition.

24. A location services client comprising:
a transceiver configured to send communications to, and receive communications from, a location server; and
a processor communicatively coupled to the transceiver and configured to:

send, toward the location server through the transceiver, a request for location service for a plurality of mobile devices, wherein the request for location service comprises a trigger condition, a group condition, and a persistence condition, wherein the trigger condition comprises a target area and an event related to the target area, wherein the group condition comprises an indication of a portion of the plurality of mobile devices that are required to meet the trigger condition before the occurrence of the trigger condition will be reported, and wherein the persistence condition comprises a threshold time period for persistence of the trigger condition by the portion of the plurality of mobile devices;

receive, from the location server through the transceiver, a response to the request through the transceiver, wherein the response indicates the occurrence of the trigger condition, the group condition, and the persistence condition; and provide a location service using the response.

25. The location services client of claim 24, wherein the trigger condition combined with the group condition comprises the portion of the plurality of mobile devices remaining within the target area or remaining outside the target area.

26. The location services client of claim 25, wherein the portion of the plurality of mobile devices is indicated by the group condition and comprises one of a minimum quantity of the plurality of mobile devices, a maximum quantity of the plurality of mobile devices, or all of the plurality of mobile devices.

27. The location services client of claim 26, wherein the minimum quantity or the maximum quantity, whichever is used, is either an integer number or a percentage of the plurality of mobile devices.

28. The location services client of claim 24, wherein the response comprises at least one of an identity and a geographic location for at least one mobile device of the plurality of mobile devices.

29. The location services client of claim 24, wherein the location services client is a location based services application server.

30. The location services client of claim 24, wherein the request for location service and the response comprise messages for the Mobile Location Protocol (MLP) of the Open Mobile Alliance (OMA).

31. The location services client of claim 24, wherein:
the trigger condition comprises a first trigger condition and a second trigger condition, and
the persistence condition comprises a first persistence condition associated with the first trigger condition and a second persistence condition associated with the second trigger condition.

* * * * *